(12) United States Patent
Clark et al.

(10) Patent No.: US 10,409,935 B2
(45) Date of Patent: Sep. 10, 2019

(54) MODELING A BUS FOR A SYSTEM DESIGN INCORPORATING ONE OR MORE PROGRAMMABLE PROCESSORS

(71) Applicant: Synopsys, Inc., Mountain View, CA (US)

(72) Inventors: Neville A. Clark, Quorroboling (AU); James R. Torossian, Whale Beach (AU)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/096,207

(22) Filed: Apr. 11, 2016

(65) Prior Publication Data

US 2017/0293702 A1 Oct. 12, 2017
US 2019/0095547 A9 Mar. 28, 2019

Related U.S. Application Data

(60) Continuation of application No. 14/171,716, filed on Feb. 3, 2014, now Pat. No. 9,311,437, which is a
(Continued)

(51) Int. Cl.
*G06F 17/50* (2006.01)
*G06F 13/00* (2006.01)

(52) U.S. Cl.
CPC .......... *G06F 17/5022* (2013.01); *G06F 13/00* (2013.01); *G06F 2217/68* (2013.01)

(58) Field of Classification Search
CPC ............. G06F 11/3636; G06F 11/3656; G06F 11/261; G06F 13/40; G06F 17/5022; G06F 11/27; G06F 11/3652; G06F 17/5027; G06F 17/5045; G06F 17/5031; G06F 1/04; G06F 2217/14; G06F 2217/62; G06F 2217/84
(Continued)

(56) References Cited

U.S. PATENT DOCUMENTS 6,188,975 B1 *  2/2001  Gay ..................... G06F 11/3664
                                              703/22
7,340,386 B2 *  3/2008  Pal ........................ G06F 11/261
                                              703/13
(Continued)

*Primary Examiner* — Nghia M Doan
(74) *Attorney, Agent, or Firm* — HIPLegal LLP; Judith Szepesi

(57) ABSTRACT

Systems and methods for modeling a bus for a system design are provided. In an embodiment, the method operates by accepting a virtual bus model, wherein the model simulates behavior for a bus master and slave device, such that the model accurately simulates the timing and behavior of the transfer of data from master to slave, and, from slave to master devices. The method routes a transaction issued by the master device to the slave device. The transaction has storage for transaction data, or a pointer to transaction data, to be transferred through the transaction. The transaction data is transferred in one or more data payloads and the sender of data sets the length of data payloads to be returned. The data payloads are sent from the sender of data to the receiver of data and may contain one or more bus data beats. This method accurately models the bus timing and behavior of the delivery of one or more data beats as one data payload.

17 Claims, 24 Drawing Sheets

Merged Bus Configuration

Split Bus Configuration

Related U.S. Application Data division of application No. 12/017,939, filed on Jan. 22, 2008, now Pat. No. 8,644,305.

(60) Provisional application No. 60/886,031, filed on Jan. 22, 2007.

(58) Field of Classification Search
USPC ............... 716/106–108, 111–113, 136, 138; 703/13–14, 23–28
See application file for complete search history.

(56) References Cited

U.S. PATENT DOCUMENTS

| | | | | |
|---|---|---|---|---|
| 8,250,545 B2 * | 8/2012 | Satoh | ................... | G06F 11/261 716/108 |
| 2006/0282233 A1 * | 12/2006 | Pasricha | ............. | G06F 17/5022 703/1 |
| 2014/0019942 A1 * | 1/2014 | Suevern | .............. | G06F 11/3664 717/124 |
| 2014/0052430 A1 * | 2/2014 | Suresh | ................ | G06F 17/5045 703/14 |

* cited by examiner

Sample slave device module

MODELING A BUS FOR A SYSTEM DESIGN INCORPORATING ONE OR MORE PROGRAMMABLE PROCESSORS

CROSS-REFERENCE TO RELATED APPLICATIONS

The present application is a continuation of U.S. patent application Ser. No. 14/171,716, filed Feb. 3, 2014, issuing as U.S. Pat. No. 9,311,437, on Apr. 12, 2016, which is divisional of U.S. patent application Ser. No. 12/017,939, filed Jan. 22, 2008, now U.S. Pat. No. 8,644,305, issued on Feb. 4, 2014, which claims the benefit of U.S. Provisional Appl. No. 60/886,031, filed Jan. 22, 2007, all of which are incorporated by reference herein in their entirety. The present application is related to U.S. application Ser. No. 11/315,683 to Torossian et al., titled CLOCK SIMULATION SYSTEM AND METHOD, filed Dec. 20, 2005, and incorporated in its entirety herein by reference.

FIELD OF THE INVENTION

This application relates generally to the simulation of complex circuit designs and specifically to the efficient simulation of bus structures. This application is related to modifying a provided virtual circuit bus model for use in simulating a target processor running target software in hardware/software simulation.

BACKGROUND OF THE INVENTION

The continued need for increasingly complex electronic circuits has lead to corresponding demands for simulators that can quickly simulate, to a high degree of accuracy, the complex interactions occurring within a complex circuit. Circuits are growing more and more complex with "System On Chip" (SoC) designs implemented that contain hundreds of millions of logic circuits.

Systems on a chip (SoCs) that include programmable processors are in widespread use, and using a virtual processor model is particularly advantageous in designing such SoCs. The bus design for such circuits is often obtained as part of a pre-defined design for use in designing a SoC.

Virtual bus models for circuits containing one or more programmable processors are detailed and therefore non-trivial to design. As a result, vendors such as VaST Systems Technology Corporation of Sunnyvale, Calif., provide pre-defined virtual processor models for many popular processors.

Many SoCs, however, are designed to include one or more custom, programmable processors, e.g., processors that might be similar to an available processor design, but have different word lengths, different operations, and so forth.

Various methods are currently used for the simulation of complex electronic circuits. The circuit to be simulated is normally described in a top down manner using a hardware description language (HDL) such as VHDL or Verilog. VHDL is described, for example, in IEEE Computer Society "IEEE Standard VHDL Language Reference Manual" New York, USA, June 1994, and Verilog is described, for example, in IEEE Computer Society, "IEEE Standard Hardware Description Language Based on the Verilog Hardware Description Language, New York, USA, 1996, each of which are incorporated by reference herein in pertinent parts. These are commonly referred to as synthesis based approaches as the same circuit description may also be used in the generation of the physical circuit layout. As circuit complexity continues to increase, there is a trend to move away from these synthesis-based approaches to ones using higher level hardware descriptions usually based on languages such as behavioral VHDL, Verilog with behavioral extensions, C and C++. An example of such a high-level simulation language is SystemC which uses C++ as a system description language.

Once a circuit to be simulated is described in one of the above languages, simulators are available for simulating operation of the hardware device. For example, standard C++ compilers together with SystemC libraries can be used to simulate SystemC coded models. Complex circuits are often constructed using a high level language such as Verilog, SystemC, VHDL, or the like, and extensively simulated using cycle accurate simulators to verify operation. Subsequently, after satisfactory verification, the model, if coded using a synthesizable HDL, may be directly synthesized into lower level circuit designs. The model is extremely useful in allowing verification of the design and target software to proceed long before and even after the design has been implemented.

Bus structures are used in digital systems to connect processors with memory, peripheral devices, etc. There are many standard bus protocols known for bus structures, e.g., PCI and the AMBA bus protocols by ARM Holdings PLC of Cambridge, England including AMBA AHB, AMBA APB, AMBA AHB_Lite, IbBus, U-Bus, and others. There are many interconnect protocols, such as the Sun Host to PCI Bridge protocol (HPB) by Sun Microsystems, Inc. of Menlo Park, Calif.

New bus protocols have become available that provide for much more complex behavior than older bus systems. Such more complex behaviors include the ability of a master device to execute several transactions at a time, and for slave devices to receive and process several transactions at a time. Furthermore, bus protocols have recently been developed for incorporating complex interconnects between devices, e.g., interconnects that include switching fabrics. In such an architecture, several master devices and several slave devices may connect to an interconnect circuit each using, for example, a bus structure that supports several transactions at once. The interconnect includes switching elements, buffers, etc., that provide for interconnecting the master devices and slave devices, including issuing and/or processing several transactions at once.

One example of such a bus structure is the AMBA® AXI Protocol (hereinafter AXI protocol, or simply AXI) as defined, for example, in the published specification of AXI, titled "AMBA® AXI Protocol Specification, V1.0, by ARM Ltd., also known as the AMBA specification.

Accordingly, there is a need for methods, systems, and computer program products for simulating bus structures. What is also needed are methods, systems, and computer program products to model such bus structures and their connections to interconnect circuits.

Some programmable processor types, however, contain many structures in common. Furthermore, programmable processors tend to fall into families that have aspects in common. Accordingly, what is needed are methods, systems, and computer program products which are able to simulate and model bus structures for system designs incorporating one or more programmable processors.

Thus there is a need for a customizable virtual bus model for system designs including one or more programmable processors, and for a method and apparatus for modifying a provided virtual bus model.

SUMMARY

Described herein are methods, computer program products, and systems operative to model a system that incorporates a bus, e.g., to model a bus to which other device models are connectable. The bus allows a plurality of transactions at a time, e.g., concurrent read and write without arbitration, such as a bus that conforms to the AXI specification.

In one embodiment, the model provides backward compatibility with a more conventional bus. In another embodiment, the bus model is connectable to a master device model that includes a read port and a separate write port. According to an embodiment, the bus model is connectable to a slave device model that includes a read port and a separate write port. One feature of so splitting the bus model to read and write ports is to provide backward compatibility. For example, for a complex bus, having separate read and write ports provides for concurrent reads and writes with no arbitrations. When modeling with a more conventional bus, reads to the bus pass via the read port, and writes to the bus pass via the write port.

One method embodiment includes signaling of data payloads between a sender of data and a receiver of data where data within a bus transaction comprises one or more data beats. The entire sequence of data beats within the bus transaction may be broken into one or more data payloads.

In one method embodiment, the sender of data signals the availability of "committed" beats in the form of a data payload to the receiver, including the following information:

The number of "committed" beats, either directly, or indirectly as a value which may be calculated from other parameters; the data contained in these "committed" beats; the clock cycle edge at which the first "committed" beat is made available.

In one method embodiment, the receiver signals acceptance of the "committed" beats forming the data payload to the sender, including the following information: the clock edge at which the last of the "committed" beats was accepted.

In one embodiment, clock edges, e.g., clock edges of events, can be communicated via one or more of: the absolute time; a relative time ahead of some other event; a number of clock edges; and a relative number of clock edges ahead of some other event.

In another embodiment, data payloads can be communicated via a pointer to a buffer containing data, and one or more of: the offsets within the buffer of the start and end of the payload; the offset to the start of the payload within the buffer, and the number of beats in the payload; the offset to the start of the payload within the buffer, and the number of bytes in the payload.

One result of this is a method wherein a sender of a sequence of data beats can send data ahead of simulation time to a receiver of data without compromising cycle accuracy of the data. By committing to a number of data beats in the form of a data payload, and breaking up the data transfer into a sequence of data payloads, the sender of data is able to significantly improve data transfer simulation performance. In one embodiment, the sender is only allowed to "commit" to a data payload if there is no circumstance which could occur which would cause the sender to "de-commit" one or more data beats within the payload.

In another embodiment, transmissions of data, from either a sender that is a slave device to a receiver that is a master device, e.g., as is the case for a bus read transaction, or from a sender that is a master device to a receiver that is a slave device, e.g., as in a bus write transaction, include the following.

The sender decides how many data beats to commit to supply to the receiver. The deciding is in one embodiment on the basis of factors including one or more of: availability of the data, data channel, current simulation time, transaction time, total number of beats, size of data to be transferred, and the states of all pending transactions. If this number of data beats to commit is not 0, in an embodiment, the sender indicates the intention to supply the number of beats either directly in the transaction or indirectly through some other mechanism and proceeds to the marking of the data channel as busy (see step (B) below), otherwise, the sender waits for some other event to occur and repeats the deciding of this step (A).

The sender marks the data channel busy.

The sender indicates, either directly in the transaction or indirectly through some other mechanism, the simulated time, which may be in future simulation time, at which the first of the committed data beats is being made available.

The sender either moves the committed data beats into a buffer associated with the transaction or creates an association between the transaction and the committed data beats in an existing buffer.

The sender then signals the receiver, either directly through a call to the receiver's function or indirectly through some other mechanism, that the number of data beats is available.

The receiver then calculates, either during the receipt of such signal from the sender, or at some later point in the execution of the simulation model, on the basis of time of availability of the data payload, current simulation time, transaction time, total number or beats in the payload, size of data to be transferred and other factors, at what point in simulation time the last of the beats within the data payload will be accepted. The receiver indicates the point in simulation time that the last of the beats with the data payload will be accepted either directly in the transaction or indirectly through some other mechanism.

The receiver then signals the sender, either directly through a call to the receiver's function or indirectly through some other mechanism, the acceptance of the data payload.

On receipt of such signal, and on the basis of the time at which the last data payload has been accepted, the sender marks the data channel not busy, and, if there are remaining beats to be transferred, proceeds to step (A) above.

One embodiment of the invention includes dynamic transaction event stitching between master and slave devices communicating through a transaction channel.

One embodiment of the invention includes a combination of bus decoders to provide a model of a bus that includes automatic bus routing.

One embodiment operates on a simulation platform that includes a scheduler that schedules operation of the various models.

In one embodiment, the mechanisms for specifying the interface between a master device and a slave device provide a mechanism wherein a bus is modeled such that no excess synchronization is required for any event that requires synchronization. The modeled bus is able to handle multiple simultaneous transactions, and further is able to handle multiple master devices issuing these multiple simultaneous transactions.

In another embodiment, a sender, e.g., a master device as sender, passes to a receiver, e.g., a slave device as receiver, access to functions that are the receiver's (e.g., slave's)

function(s), such that the receiver, e.g., the slave, can operate, including calling such functions, thus not requiring synchronization.

These functions each provide the timing of the event they represent such that, for example, a receiver, e.g., a slave as receiver, can process the sender's event at the timing of that event without requiring synchronization between the sender, e.g., the master, and the receiver, e.g., the slave.

In this manner, embodiments of the invention provide for signaling an event in so called "negative" time, i.e., before "now." For example, the invention provides for modeling a bus wherein a write data channel is allowed to issue the data for a transaction before that transaction's command and address are issued in the respective channels.

Other embodiments, aspects, features, and advantages will be clear from the description and claims provided herein.

Figure 1:
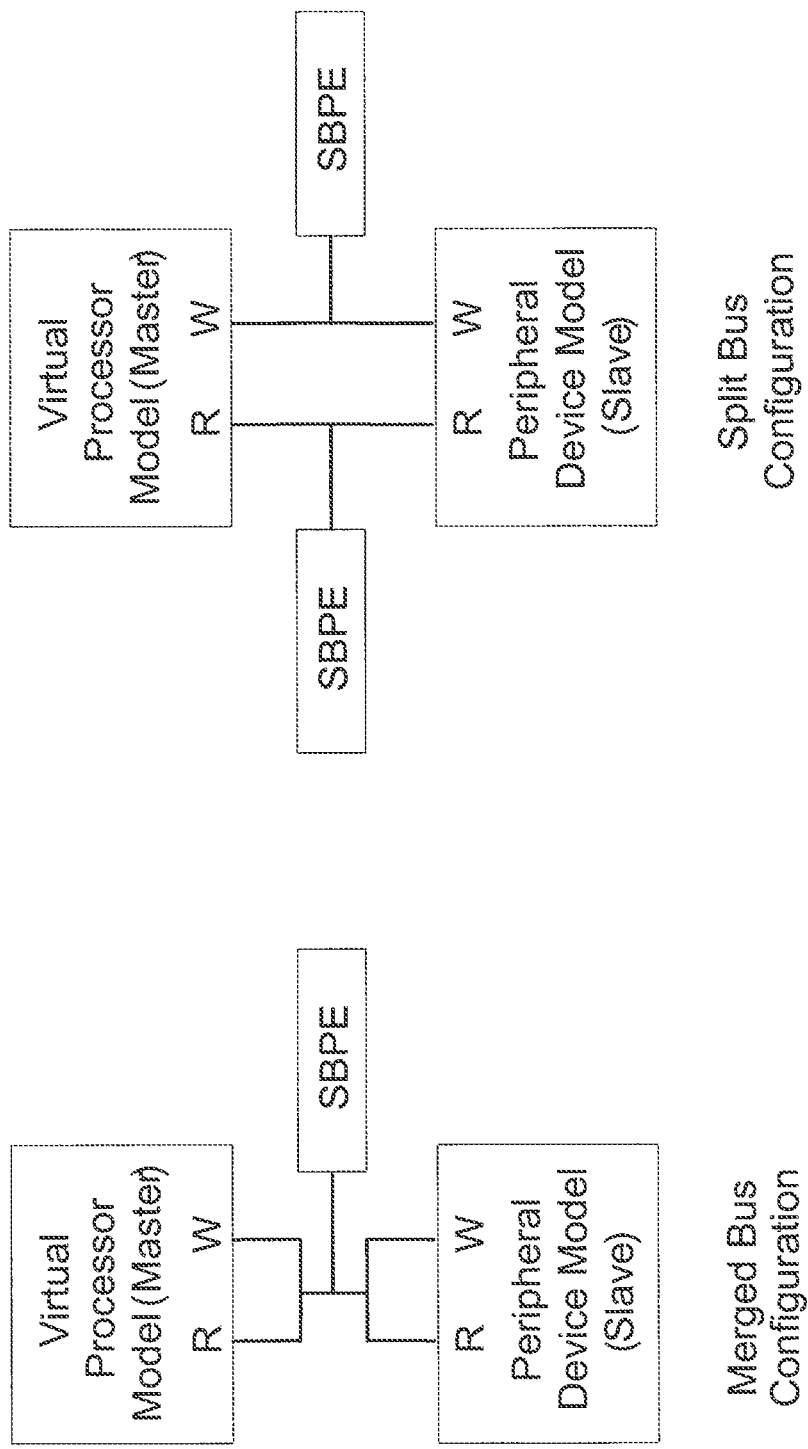
FIG. 1 depicts in simplified block diagram form two possible bus configurations with the StdBus protocol engine (SBPE), according to an embodiment of the invention.

DETAILED DESCRIPTION OF THE INVENTION 1.0 Structural Embodiments

Briefly, as described in U.S. patent application Ser. No. 11/830,435, filed Jul. 30, 2007 and titled METHOD AND APPARATUS FOR MODIFYING A VIRTUAL PROCESSOR MODULE FOR HARDWARE/SOFTWARE SIMULATION, which is incorporated by reference herein in its entirety, a 'virtual system prototype' is a set of software instructions, e.g., a software system, that when executing (running) on a host processing system simulate a hardware/software system that includes a processor ("target processor") and target processor memory, with the target processor memory including instructions ("target software") that are for execution on the target processor. By a hardware/software system is meant a system that includes a programmable processor, and the instructions—the target software—for operating that target processor. A hardware/software system, for example, may include a device, such as a mobile telephone, or a discrete component contained within a device. A hardware/software system may also include an installation, for example a mobile telephone base station. One aspect of the invention is for a virtual system prototype to provide a highly accurate and responsive model of such hardware/software systems, in particular a model of a bus structure. One can also develop a virtual system prototype to model the entire system, e.g., the mobile telephone together with the mobile telephone base station, and the communication pathway between them.

A virtual system prototype may be used to analyze the performance of the hardware architecture, develop and test target software, and examine the interaction between the hardware and software subsystems, before one builds the actual hardware.

Running a virtual system prototype is sometimes called hardware/software co-design, or simply co-design.

The elements of a virtual system prototype include device models. A device model is a virtual representation—a representation as software executing on the host processor system—of a hardware unit that is capable of providing input to a system or of receiving output from the system, or both. Examples of device models include timers, controllers, memories, and virtual processor models. Devices may be connected by buses, and a bus is represented by a bus model. Embodiments of the present invention deal with bus models.

The models described herein are behavioral models that are timing accurate. A behavioral model provides the function of the device being modeled without necessarily providing accurate timing. Models can also be clock cycle accurate. Such a cycle accurate model is able to provide the state of the processor elements at any clock tick. For this, each clock cycle is simulated, and the model replicates the structures that are in the processor.

One of the challenges of simulating a hardware/software system is to have timing-accurate models that execute relatively fast on the host processing system. Behavioral models that do not provide timing accuracy can be relatively fast. On the other hand, clock cycle accurate models, e.g., structural models, are either not particularly detailed in what they simulate, or run relatively slowly in order to simulate a significant number of structural elements.

The models, in particular the bus models described herein that include aspects of the present invention, provide full functionality, e.g., are full behavioral models, and further are timing accurate. For example, when combined with virtual processor models that can execute target code that is in a memory model with instruction and transaction time accuracy, providing bus transaction modeling is useful, for example, in simulating bus and other interactions with other models. However, running such models does not necessarily include simulating all clock cycles. For example, one feature of the way we simulate is that if no significant events occur for a number of clock cycles, there is no need to simulate each and every one of those clock cycles.

In the case of some virtual processor models and some devices, some methods for achieving such behavioral and timing accuracy with such speed are described in U.S. Pat. No. 6,230,114 titled HARDWARE AND SOFTWARE CO-SIMULATION INCLUDING EXECUTING AN ANALYZED USER PROGRAM, U.S. Pat. No. 6,263,302 titled HARDWARE AND SOFTWARE CO-SIMULATION INCLUDING SIMULATING THE CACHE OF A TARGET PROCESSOR, U.S. Pat. No. 6,584,436 titled HARDWARE AND SOFTWARE CO-SIMULATION INCLUDING EXECUTING AN ANALYZED USER PROGRAM, and U.S. Pat. No. 6,751,583 titled HARDWARE AND SOFTWARE CO-SIMULATION INCLUDING SIMULATING A TARGET PROCESSOR USING BINARY TRANSLATION. See also U.S. Patent Appl. Publ. No. 2006/0149526 titled CLOCK SIMULATION SYSTEM AND METHOD. The contents of each patent and patent application are incorporated herein by reference.

As used herein, a virtual system prototype has no ports, external connections, or behavior. It is the top-level container for other modules. A virtual system prototype is the equivalent to what is called a test bench in a VHDL simulation system.

A virtual system prototype contains one or more virtual platforms, which in turn contain models of the actual devices or components contained within the system. All elements within the virtual system prototype are arranged in a hierarchy that generally reflects the structure of the actual hardware/software system.

Virtual platforms are the building blocks of a virtual system prototype, and contain the underlying models of the system. A simple virtual system prototype usually includes a single virtual platform, containing one or more virtual devices; however, virtual platforms can have arbitrary complexity. Virtual platforms can include many hierarchies of subsystems, including other virtual platforms; virtual processor models that model the actual processor(s) and execute software embedded within the product, peripheral device models that emulate the functionality of the peripheral hardware devices, and interconnections. Virtual platforms can be interconnected.

In the present disclosure, a standard Bus (StdBus) protocol engine (StdBus protocol engine, SBPE) is the main component of a generic bus model that can be used for device and module interconnect. In this disclosure, the term StdBus is sometimes used without the words protocol engine, and is used to mean the generic bus model, that is, the StdBus protocol engine.

The StdBus protocol engine provides an interface to virtual processor models, peripheral device models, and memory models, and represents the standard concept of address and data phases along with associated control and timing in a bus transaction. The StdBus net can be considered to be a single net type containing all information needed for inter-communication between modules via a bus.

The StdBus protocol engine is also provided with a set of configuration parameters to allow users to control aspects such as monitoring, debugging etc.

Tasks and Callback Functions

In the example embodiments described herein, a C-Language modeling environment includes a set of functions, some of which are described herein below. Some of the primitives described herein are for tasks and for callback functions that are written in the C-language and that a user can use in building the model to implement bus structures and for other clock-scheduled event scheduling.

A distinction is made herein between a "task" and a "callback function." Each of these refers to a part of a model, e.g., a function that is coded in one example using the C-language or its derivates, e.g., C++. A task herein refers to a section of an actual model. In an embodiment, when an instance of a model is set up during initialization, instances of any tasks in the model are also created. Thus, a task is a part of a coded model that operates as a separate process with its own timeline. A task can suspend operation of itself at a point in simulation time of the hardware model it is contained in, and resume operation at some future point in simulation time of that hardware model. The operation of the task thus can consume hardware simulation time.

A callback function herein refers to a section of a model that operates at a single instant in simulation time of the overall model. The section is typically coded in C-language or its derivatives. A callback function cannot suspend or resume operation of the hardware model, so a callback function exits at the same instant in simulation time at which it is invoked. A callback function may be directly invoked from a task. A callback function may also be directly invoked from a callback function. Similarly, a callback function may be scheduled to be invoked by a task, or scheduled to be invoked by a callback function.

Callback functions are in one embodiment registered at initialization time to be associated with a particular clock signal for scheduling according to one or more attributes of the clock signal. Registering is also called "installing." When a callback function associated with a particular clock signal is registered, e.g., for later scheduling, a handle or identifier for that callback function associated with a clock signal is generated and provided as a result of the registering. The handle provides a mechanism for scheduling an event, e.g., a callback to that callback function. If that event is in reference to a clock net, the handle specifying the clock net will have been provided during registration, so the handle for the callback function implicitly includes the handle for the associated clock signal.

For example, a callback function may be scheduled by an event scheduler in the environment as a consequence of a simulation event, e.g., a logic signal or a clock signal, to which that callback function has been registered.

A task need not be registered with the system (e.g., to provide a handle for a task), since the task is part of a section of a model and separate instances of a task are generated for each instance of the section of the model.

Both tasks and callback functions can cause the event scheduler to schedule simulation events to occur. A simulation event can resume a task or invoke a callback function.

Callback functions disclosed herein provide increased flexibility and efficiency as compared to methods and systems currently in use. According to an embodiment, anything that can be implemented by a task can alternately be implemented by a callback function.

While one embodiment includes tasks and functions to provide for the modeling described herein, an alternate implementation extends Verilog or other HDL to handle clock nets and bus nets by providing native language primitives.

For the event scheduling function, and for description of clock nets and how time is specified, and further, for a description of how the scheduler is included, see U.S. Patent Appl. Publ. No. 2006/0149526 titled CLOCK SIMULATION SYSTEM AND METHOD, incorporated herein by reference.

An example of hardware/software simulation and modeling is described in U.S. patent application Ser. No. 11/830,435, filed Jul. 30, 2007 titled METHOD AND APPARATUS FOR MODIFYING A VIRTUAL PROCESSOR MODEL FOR HARDWARE/SOFTWARE SIMULATION, which is incorporated herein by reference.

By way of example, this disclosure describes an embodiment of a standard bus (StdBus) protocol engine and its interface, when configured to operate in AXI Mode, that is, when configured to simulate the AMBI AXJ bus protocol. Detailed information about the StdBus protocol engine is not provided herein, but a detailed description of the AXI interface is provided in order to explain how device models capable of communicating using the AXI protocol extensions to StdBus can be developed, according to an embodiment of the invention.

The AXI protocol is used herein only as an example. The present invention is not limited to the AXI protocol. Those in the art will understand, from the description herein, how to modify and how to build bus models that model according to other bus structures, including complex structures that allow for several transactions at once. Other bus structures include, for example, Opencore's Wishbone bus, Sonic's Silicon Backplane (Motorola, Inc.), IBM's CoreConnect, and so forth. Features described herein are applicable to point-to-point, many-to-many (i.e. the classic bus system), hierarchical buses, and/or even switched fabrics such as crossbar buses, and how to modify the description herein for such other application would be clear to those in the art.

Furthermore, the specific implementation herein is for the modeling environment marketed by VaST Systems Technology Corp. of Sunnyvale, Calif., and the invention is not limited to such a modeling environment. That is, features of the present invention are described in terms of what is called a System Engineering Environment (SEE) that is called COMET and marketed by VaST Systems Technology Corp. The SEE includes a graphical user interface which one uses to design, build, and test virtual system prototypes. A typical SEE such as COMET includes a workspace, an output window, a source file editor, and tools for building, configuring, executing (or simulating), and debugging virtual system prototypes. The invention, of course, is not limited to such an environment.

The following is a glossary of some of the terms used to describe embodiments of the present invention.

AMPI: Architecture modeling application programming interface (API).

Architecture: A term applied to both the process and outcome of designing and creating a specific technological product, including its overall structure, behavior, logical components, and logical interrelationships. An architecture may contain instances of other architectures. By comparison, the term design has less scope than architecture. An architecture is a design, but most designs are not architectures. A single sub-system or a new function has a design that has to fit within the overall architecture. A similar term, framework, can be thought of as the structural part of an architecture.

CIF: Communications and Infrastructure Fabric: a methodology that allows one to design and specify fully executable virtual system prototypes (virtual models of a hardware system) that have desirable performance and accuracy.

Bus master: A model that can generate transactions to the StdBus, but cannot receive transactions via the StdBus. A virtual processor model (VPM) is a typical example of a bus master although a VPM may also act as a bus master/slave.

Bus slave: A model that can receive transactions via the StdBus, but cannot generate transactions to the StdBus.

Bus master/slave: A model that is capable of both receiving from and generating transactions to the StdBus protocol engine.

Device: A hardware unit that is capable of providing input to a system or of receiving output from the system, or both.

Device model: A virtual representation of a hardware unit that is capable of providing input to a system or of receiving output from the system, or both. Device models (for example VPMs, timers, controllers, and memory) are connected to the bus. Any device model that is driven by target code must be connected to the bus. A device model that does not connect to the bus, such as a console or a test bench, is called an auxiliary device.

Fabric module: A Communications and Infrastructure Fabric module. See module.

Hardware constant: A fundamental entity of a module. The value of a hardware constant cannot change.

Hardware value: The value of a hardware variable or hardware constant.

Hardware variable: A fundamental entity of a module, such as a register, wire, or integer. The value of a hardware variable can change. Its value is the value last assigned to it.

Instantiation: The creation of an instance of an object (module).

Latency: In a network, a synonym for delay, that is an expression of how much time it takes for a packet of data to get from one designated point to another. In a computer system, latency is often used to mean any delay or waiting that increases real or perceived response time beyond the response time desired. Specific contributors to computer latency include mismatches in data speed between the microprocessor and input/output devices and inadequate data buffers.

Model: A self-contained module, such as a platform or peripheral device. See module.

Module: The definition of a hardware element within a virtual system prototype such as a virtual platform, a VPM, a virtual bus, or a peripheral device. A module describes hardware behavior, functionality, interconnection and hierarchical structure. Modules represent hardware elements and interconnections, and can be instantiated within other modules. Each module generally (but not necessarily) describes a single hardware subsystem.

Peripheral device: Any device that is not part of the essential system (the processor, memory, and data paths) but is situated relatively close by. See device.

Ports: The connection points of a module. All modules (including virtual platforms, VPMs, peripheral devices, and virtual buses) communicate using ports.

Project: A set of files from which one builds a virtual system prototype. A project may include source files, header files, pre-built modules, DLL's, include files, libraries, and target software files.

Register: One of a small set of data holding places that are part of a system and that provide a place for storing variable data. Registers can have arbitrary names.

Software Development Environment (SDE): A graphical user interface in which one can build interactive real-time embedded software for target system architectures.

StdBus: The standard bus (StdBus) protocol engine is the main component of a generic bus model that can be used for device and module interconnect. The StdBus does not represent a specific proprietary bus protocol. It provides a generic StdBus protocol, and emulation of proprietary protocols including AHB, AHB_Lite, and PCI.

System Engineering Environment (SEE): The graphical user interface, in which one designs, builds and tests virtual system prototypes. The present description is written in terms of a System Engineering Environment that is marketed by the assignee of the present invention, and that is called COMET. A typical SEE such as COMET includes a workspace, an output window, a source file editor, and tools for building, configuring, executing (or simulating), and debugging virtual system prototypes.

Task function: A function written using the C language that invokes architecture modeling API functions in order to interact with module elements and interconnections.

Virtual hardware platform: See virtual platform.

Virtual platform (VP): The building block of a virtual system prototype. A virtual platform may include one or more virtual processors (that executes software embedded within the product), peripheral devices, and interconnections, such as buses. Virtual platforms can also contain other virtual platforms in a hierarchical structure. Virtual platforms may be interconnected.

Virtual processor model (VPM): A device model that simulates the functionality of a hardware processor (CPU).

Virtual system prototype (VSP): The virtual representation (or executable specification) of a hardware product that incorporates subsystem design together with the environment that drives the execution (or simulation) of the virtual product. A virtual system prototype includes one or more virtual platforms, and (optionally) a test bench and performance and analysis tools.

Workspace: The design area within the SEE being used, e.g., the called COMET marketed by VaST Systems Technology, Inc., the assignee of the present invention, where one creates virtual system prototypes.

1.1 StdBus AXI Model

In the embodiments described herein, the StdBus protocol engine when configured to use the AXI protocol connects a single AXI bus master to a single AXI bus slave via a StdBus net. The StdBus protocol engine can be considered as a controller of this net and handles requests to and from the models in this virtual platform.

The StdBus net can be considered as a communications pathway containing address and data, along with control and timing, information to be used in conjunction with the StdBus protocol engine.

According to an embodiment, a single AXI port is represented by a read (R) and a write (W) port, so each AXI master and slave device connects to the StdBus net using 2 separate bus ports as shown in the following diagram. Two possible bus configurations are shown in FIG. 1 where SBPE denotes the StdBus protocol engine The Merged bus configuration connects both the read and write ports to a single instance of the StdBus protocol engine. The SBPE is responsible for routing the read/write transactions issued by the master to the appropriate slave read/write port. This is the recommended bus configuration when using StdBus AXI.

The split bus configuration uses a separate instance of the SBPE for the read and write ports. Although this configuration is compatible with StdBus1 protocols (AHB_Lite for example), it is not recommended for SBPE instances configured as AXI.

Both port configurations are backwards compatible with StdBus1 protocols such as StdBus, AHB, and AHB_Lite—assuming that the master and slave devices are capable of connecting to a bus configured for one of these protocols. According to an embodiment of the present invention, the methods, systems, and computer program products disclosed herein ensure that the slave properly handles exclusive bus accesses when using the split bus configuration.

Figure 2:
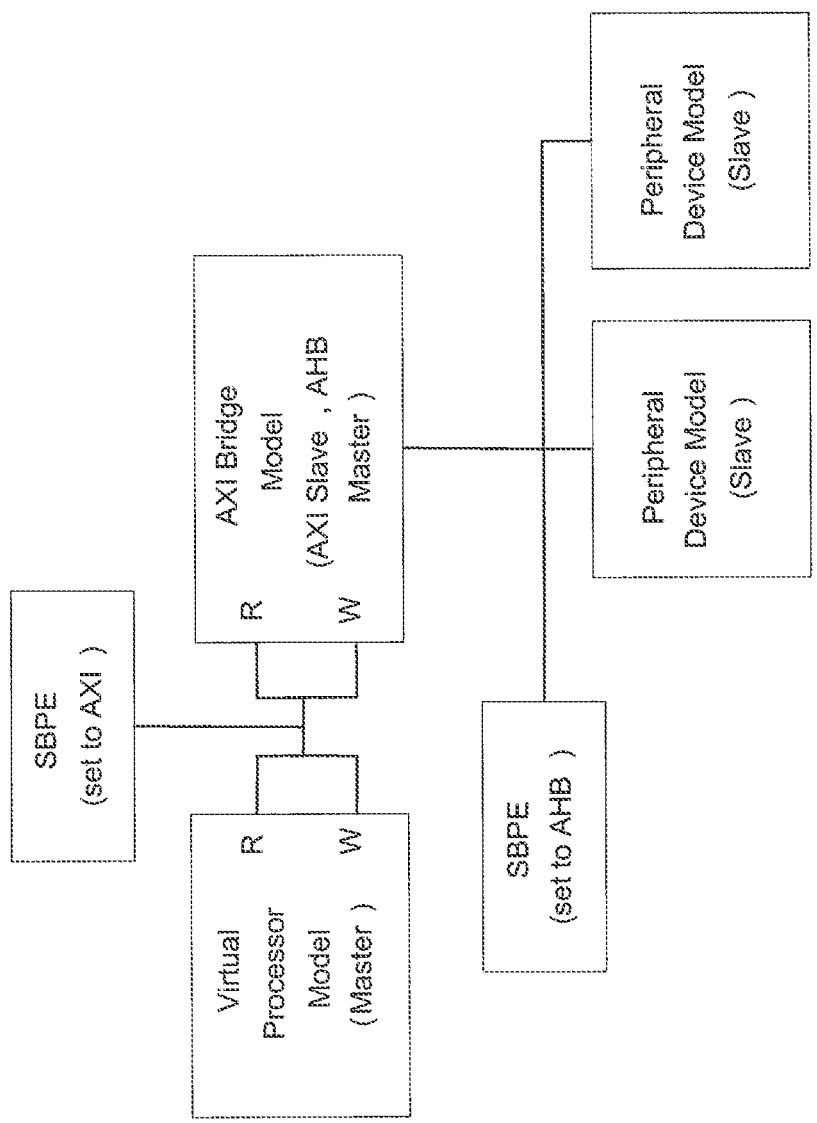
FIG. 2 shows in simplified block diagram form a virtual system prototype that includes a virtual platform that has a virtual processor model, an AXI to AHB Bridge model, and AHB peripheral device models, according to an embodiment of the present invention.

According to some embodiments of the invention, a bridge model can also be inserted between two instances of the StdBus protocol engine to perform protocol translation as shown in FIG. 2. This allows devices of different bus protocols to communicate with each other.

Figure 3:
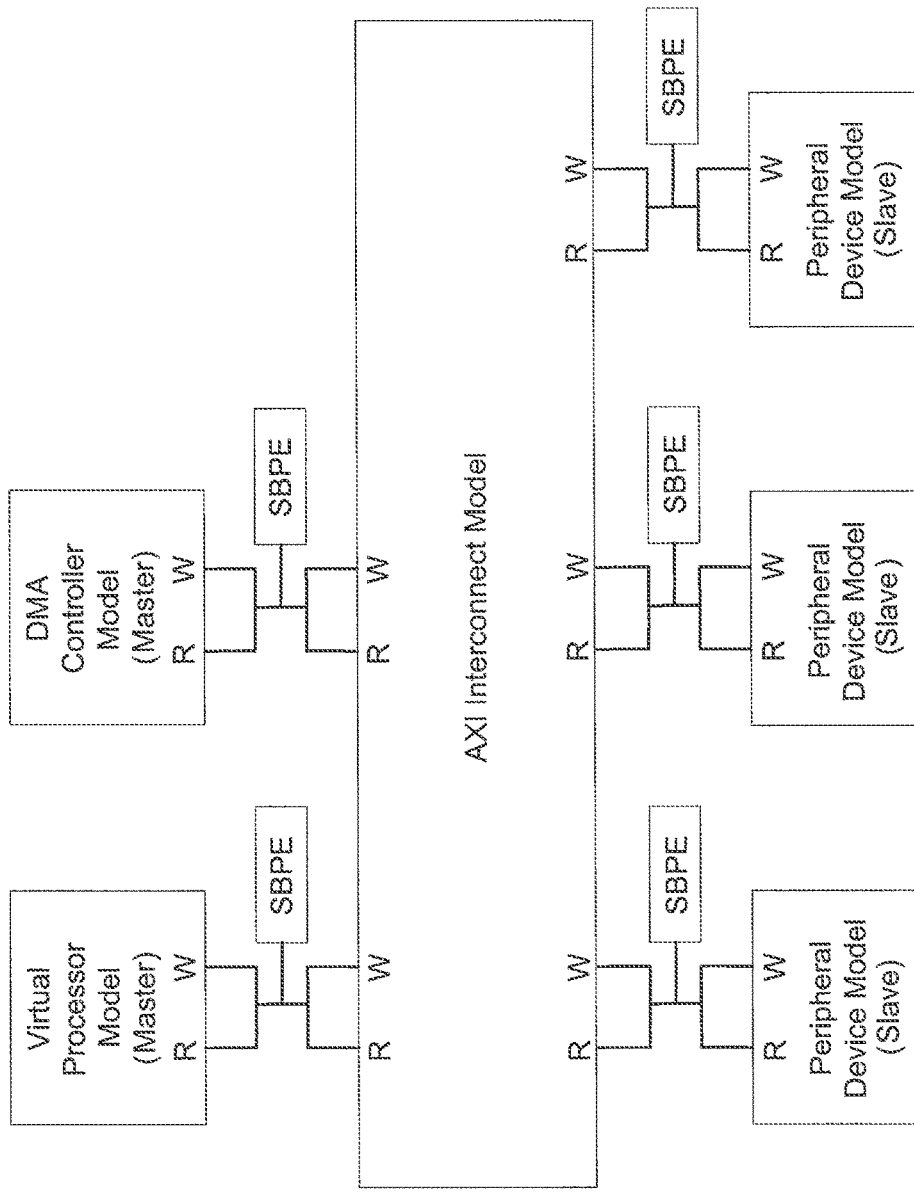
FIG. 3 shows in simplified block diagram form a virtual system prototype that includes a virtual platform that has an AXI Bus virtual processor model, an AXI Bus DMA Controller model, an AXI Interconnect model, and AXI Bus peripheral device models, according to an embodiment of the present invention.

One of the most common configurations makes use of an AXI interconnect to route transactions between multiple masters and multiple slaves as shown in FIG. 3.

1.2 StdBus Protocol Engine

In embodiments described herein, the StdBus protocol engine (SBPE) controls the operation of the StdBus net, and manages the communication path between the device models connected to the StdBus net. The convention of bus master is used when a model can generate transactions to the StdBus (such as a virtual processor model) and bus slave is used when a model can receive transactions via the StdBus. In keeping to the AMBA AXI protocol, the StdBus AXI protocol does not support combined master/slave AXI bus ports on devices.

When configured as AXI protocol, in an embodiment, the StdBus protocol engine does not perform any address decoding for timed transactions. When a master issues a timed transaction on the bus, the only transaction decoding performed by the SBPE is to determine whether to route the transaction to the slave's read or write bus port.

In one embodiment, the SBPE performs the following functions: the SBPE handles the routing of transactions generated by a master device to the appropriate slave device read or write AXI bus port; the SBPE handles registration of device decode regions by slave devices for the purpose of passing this information to master devices which may then use this information to automatically initialize and maintain their internal address decoding of transactions to the master device port. This decoding is also used internally by the SBPE for routing untimed StdBus transactions.

The SBPE also: handles the registration of slave callback functions to handle various transaction types on the bus such as read, write, and fetch etc; optionally intercepts master and slave callback functions to check for StdBus AXI protocol compliance; supports StdBus Metrix For the AXI protocol events; and supports StdBus debug transaction Tracing for the AXI protocol.

In addition to the above, in one embodiment, the StdBus AXI model implements the AXI read address, write address, read data, write data, and write response channels using master and slave callbacks embedded in each transaction.

The timed bus protocols supported by the SBPE may be separated into two groups; StdBus type 1 (StdBus1) and StdBus type 2 (StdBus2), as shown in table 1.

TABLE 1

Timed Bus Protocols Supported by the SBPE

| StdBus Protocol Name | StdBus Protocol Type |
| --- | --- |
| StdBusProtocol | StdBus1 |
| PciProtocol | StdBus1 |
| AhbProtocol | StdBus1 |
| ApbProtocol | StdBus1 |
| IBusProtocol | StdBus1 |
| HpbProtocol | StdBus1 |
| AxiProtocol | StdBus2 |

In table 1, the protocol names suggest the type of protocol. Therefore AxiProtocol is the AXI protocol, PciProtocol is the PCI protocol, etc.

In accordance with an embodiment of the present invention, the operation of the SBPE is quite different for the two protocol types. Certain embodiments of the present invention focus primarily on developing devices for the AXI protocol, called AxiProtocol in table 1, but devices that can connect to an instance of SBPE configured as either AXI or one of the StdBus1 protocols are also disclosed herein.

In accordance with an embodiment of the present invention, all untimed transactions follow the same StdBus untimed transaction protocol, regardless of the protocol setting used for timed transactions.

1.3 StdBus Protocol Engine Interface for Type 2 Protocols

According to an embodiment of the present invention, the StdBus protocol engine (SBPE) interface, along with the StdBus net, provides the communication path between a pair of devices (one master, one slave) in a particular virtual platform and includes the following:

A set of API functions, which can be used within the slave and master device models to request services from the SBPE.

A set of callback functions, which the SBPE uses to notify the slave and master device models about the progress of the StdBus transactions.

A bus transaction data structure which includes the address, data, control and timing information which is used by both the master and the slave device models to execute the transaction.

In one embodiment, the SBPE communicates via StdBus ports connected to a StdBus net type to the appropriate ports on the slave and master device models. The SBPE can be considered a model in itself and is shown in FIG. 4.

1.4 StdBus Protocol Engine Model

Figure 4:
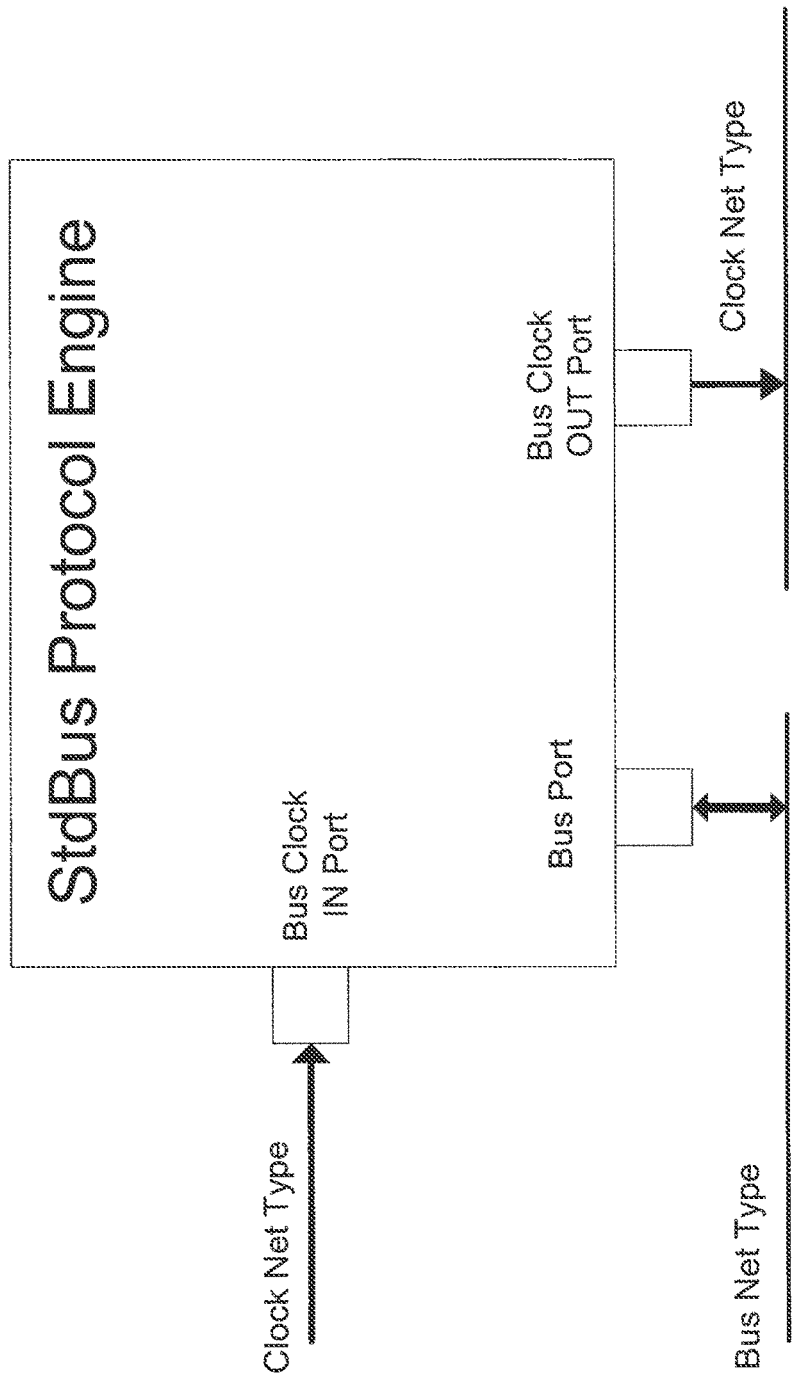
FIG. 4 shows the architecture of a StdBus Protocol engine that includes a set of port connections, according to an embodiment of the present invention.

In accordance with an embodiment of the present invention, the port connections "Bus Port" and "Bus Clock OUT Port," shown in FIG. 4, represent the common connection ports of the master and slave devices connected to this particular instance of the StdBus. Effectively the master and the slave connected to the bus must provide a means of connection to these ports and must be connected via an appropriate net type.

1.5 Device Models

In one embodiment, a StdBus AXI device model connects to a single instance of a StdBus net via separate read and write StdBus ports. Each connection to a StdBus net may be of the form master or slave—this detail is established in the structural description of the model.

The following sections describe device models from either a master device model or a slave device model perspective.

1.6 Master Device Model

As used herein, a master device model is a device model capable of issuing transactions on to a StdBus net. It provides the transaction data structure and issues the request for a transaction to the StdBus protocol engine. Master device connections are typically established by virtual processor models (VPMs), DMA devices and bus bridges. The master device may be responsible for:

Creating the bus transaction data structure which includes the CommandUsed, DataAvailable or DataUsed and ResponseAvailable call back functions for use by the slave device.

Requesting (or issuing) a transaction to the StdBus protocol engine. This includes initiating the timeline for the transaction by initializing the command available and Now TickStamp fields in the bus transaction data structure.

Responding to callbacks from the slave device (e.g., command used, Response available) and updating the transaction data structure as necessary.

In addition, a master device model may register with the StdBus protocol engine a call back function to receive notification, for automatic routing purposes, of the address decode regions registered by the connected slave StdBus ports.

1.7 Slave Device Model

As used herein, a slave device model is a device model capable of receiving and processing transactions from a StdBus net. It receives transactions issued by a master device model and routed via the StdBus protocol engine. Device slave connections are typically established by bus bridges, memory, and I/O devices. The slave device model may be responsible for:

Registration of its address decode regions onto the bus (protocol engine).

Registration of various call back functions to be called by the StdBus protocol engine when a transaction is to be passed to the slave device.

Responding via these registered call back functions to a transaction which is received from the StdBus protocol engine and processing the transaction.

Updating the transaction timing associated with the access timing of the slave device.

Invoking the appropriate callback functions within the transaction data structure to facilitate the command, data or response handshaking process with the initiating master device.

2.0 StdBus AXI Transaction Data Structure

In an embodiment, the main communication mechanism between modules on a StdBus is the StdBus transaction data structure. An overview of this structure is now presented. More details are provided in subsequent parts of the description.

Figure 5:
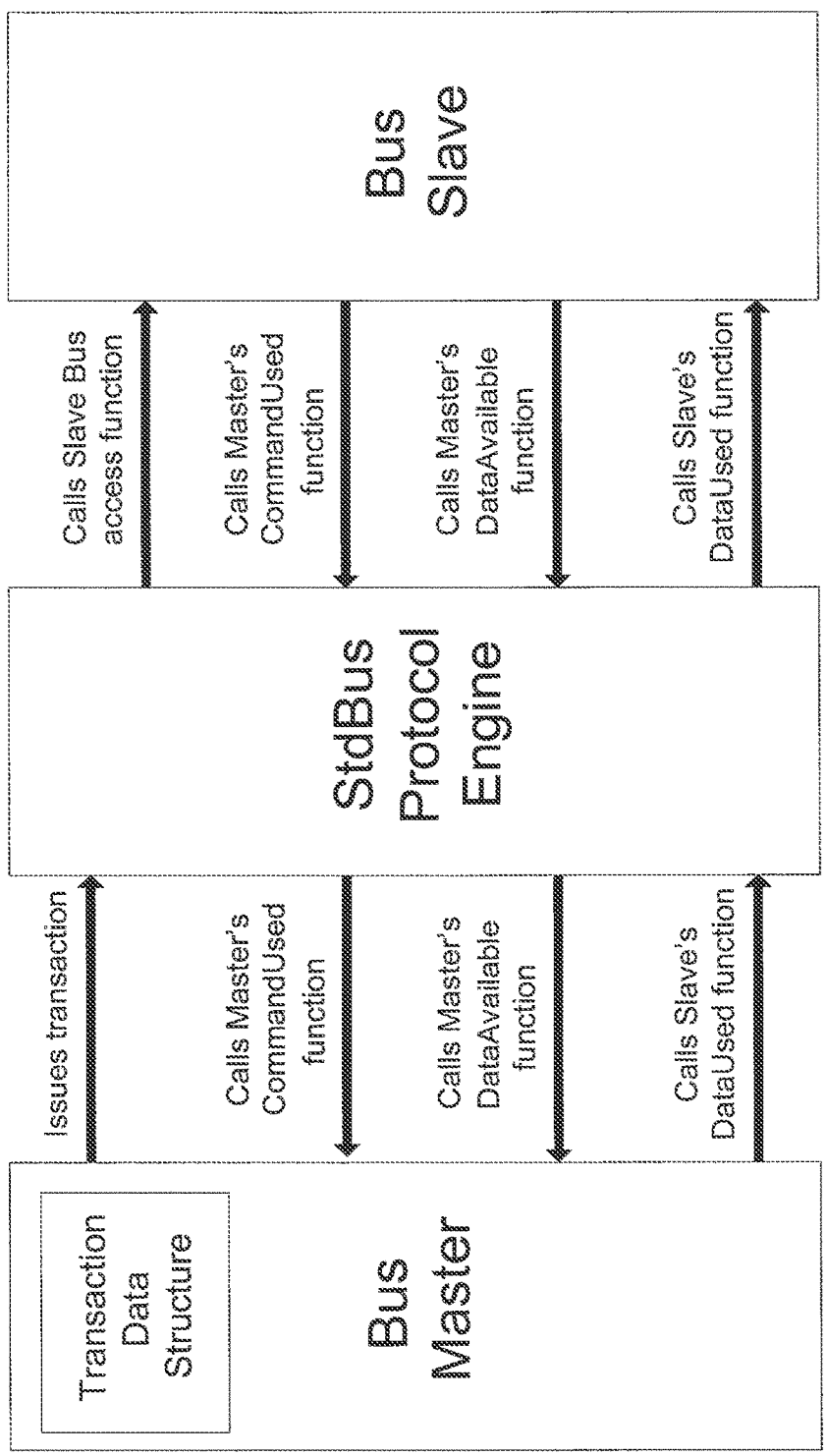
FIG. 5 depicts in block diagram form, a mechanism for the StdBus AXI protocol, single data payload read transaction processing, according to an embodiment of the present invention.
Figure 6:
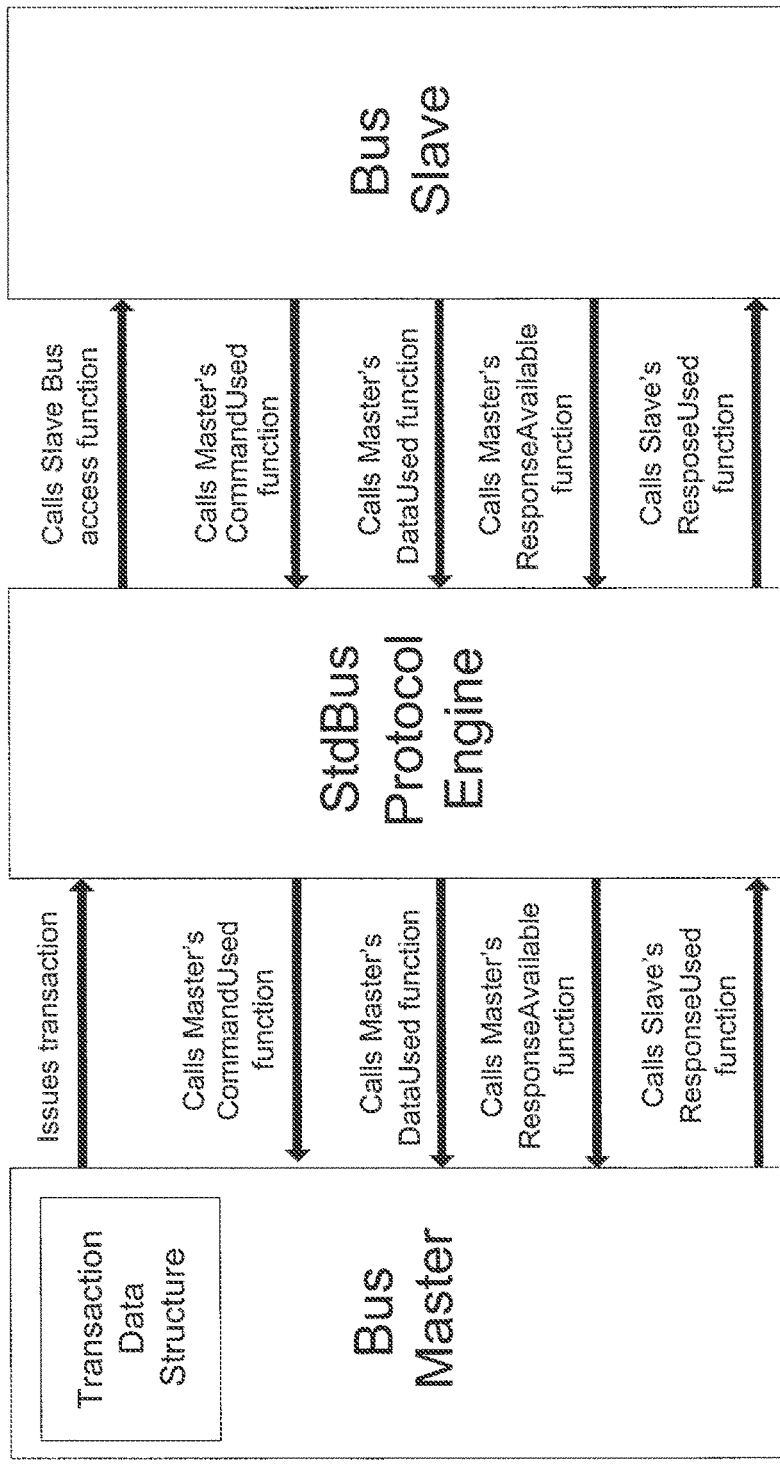
FIG. 6 depicts in block diagram form, another basic mechanism for the StdBus AXI protocol, single data payload early data write transaction processing, according to an embodiment of the present invention.

In another embodiment, the transaction data structure is "owned" by the bus master and is updated and modified as and when required by the bus protocol engine and the slave. FIGS. 5 and 6 depict the basic mechanism for StdBus AXI protocol, single data payload, read and (early data) write transactions.

2.1 Transaction Data Structure Detail

According to an embodiment of the present invention, the master module on the bus "owns" the data structure and effectively passes a pointer to the StdBus protocol engine which in turn passes this pointer to the slave module. Tick stamps in the transaction data structure are bus clock periods relative to the bus clock input of the StdBus protocol engine module.

How each of the fields are modified and used in a bus transaction sequence in one embodiment, is described in some detail in later sections of this disclosure.

2.2 Typical Timed Bus Transactions

Figure 7:
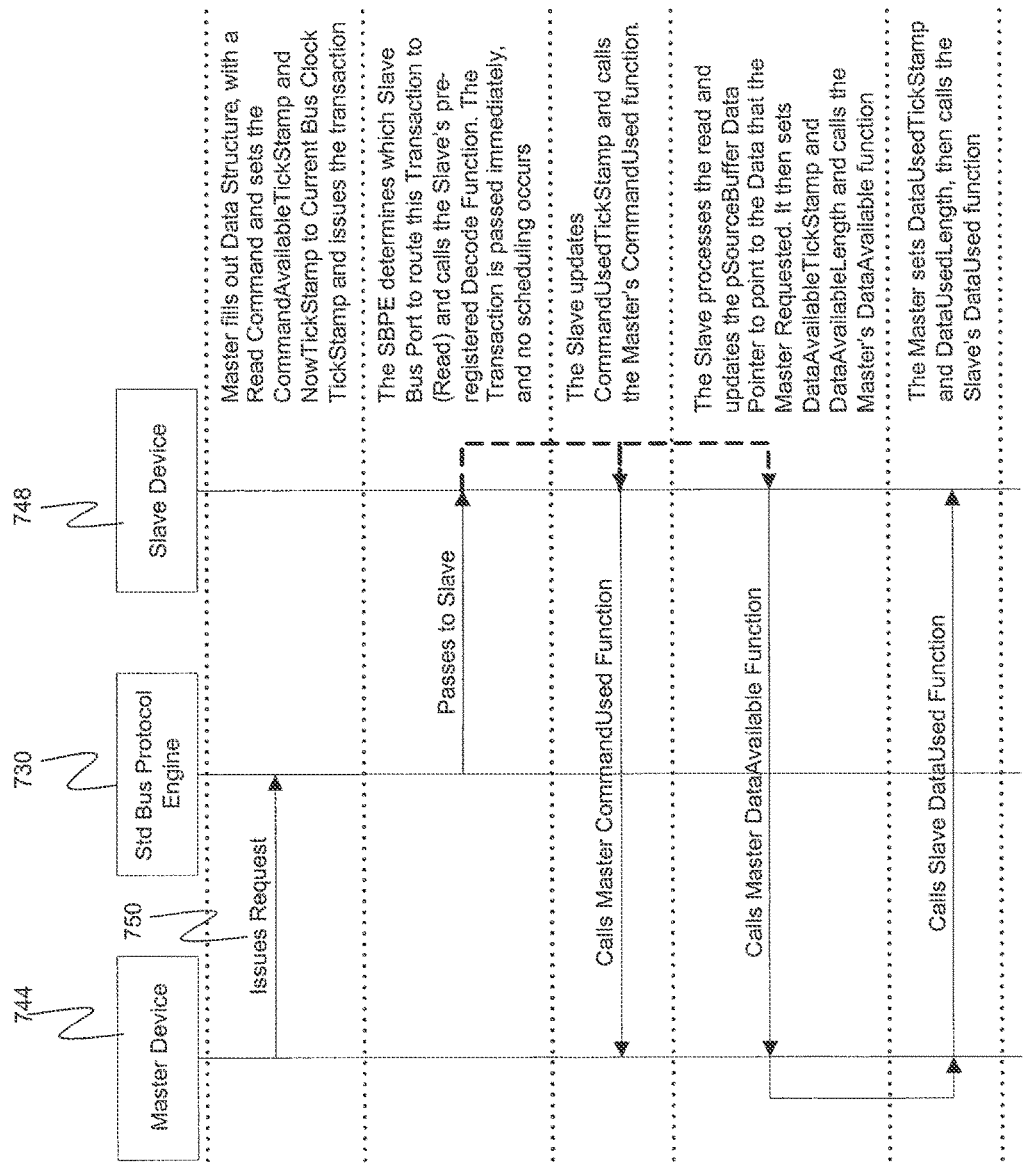
FIG. 7 illustrates the flow of a StdBus (type 2 protocol) single data payload read transaction, according to an embodiment of the present invention.

FIG. 7 shows a typical AXI protocol timed bus transaction 700. In this case a 'read' transaction is issued by master device 744 as request 750 to slave device 748 and the FIG. 7 depicts the interaction of StdBus protocol engine 730 as well as the handling of the Tick stamps to reflect timing of the transaction. In this particular example, slave device 748 returns all the data as a single data payload.

FIG. 7 illustrates the flow of a single transaction. In accordance with an embodiment of the present invention, a single transaction may include multiple data payloads, each in turn including one or more data beats forming a burst transaction.

2.3 Typical Untimed Bus Transactions

In one embodiment, for the purpose of supporting target debugging, the StdBus protocol engine, the bus master and the bus slave support untimed transactions. These types of transactions are very similar to the timed transactions shown in the previous sections. The main difference is that they have no requirement for timing updates and do not involve invocations of callback functions.

Figure 8:
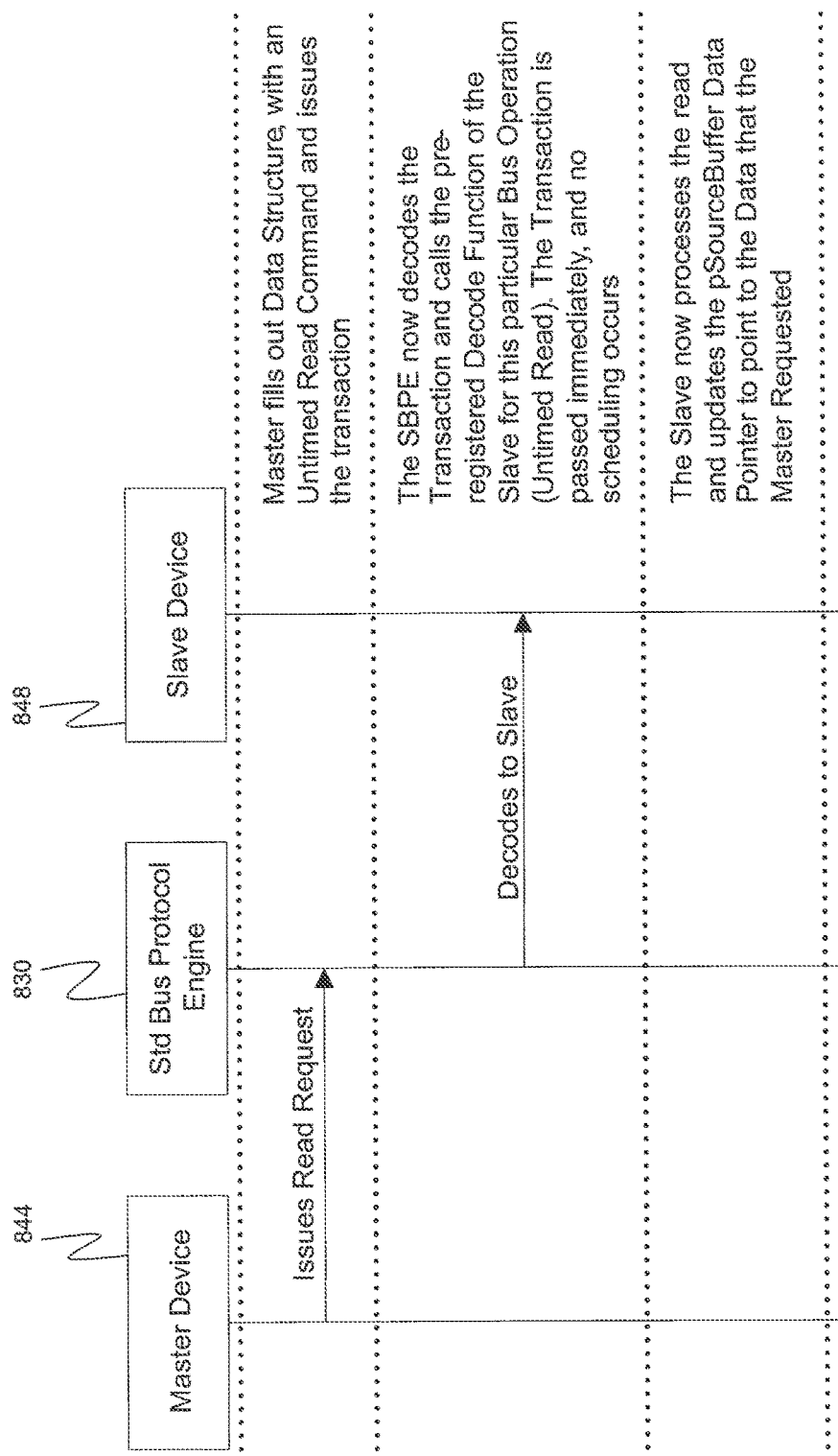
FIG. 8 shows an un-timed read transaction in one embodiment of the invention, according to an embodiment of the present invention.

FIG. 8 shows an example untimed read transaction 800, according to an embodiment of the invention. As depicted in FIG. 8, no timing information is required for this transaction, and no handshaking (via available/used callbacks) occurs between the master device 844 and slave device 848. Untimed StdBus transactions are protocol independent. During an untimed transaction, the data length may be variable from the target debugger; therefore slave device's 848 registered untimed functions should be able to handle variable length transactions. This is discussed further in the following sections.

Although in this embodiment, the Standard Bus Protocol Engine 830 (SBPE) (configured for AXI) does not perform address decoding for timed transactions, address decoding is performed for untimed transactions. According to this embodiment, to remove ambiguity, AXI slave read and write ports should not both register for the same read, write, load or fetch decode regions as only the first one decoded will be passed the untimed transaction. Other alternate embodiments can deal with address decoding in other situations.

3.0 StdBus AXI Slave Device Modeling

Figure 9:
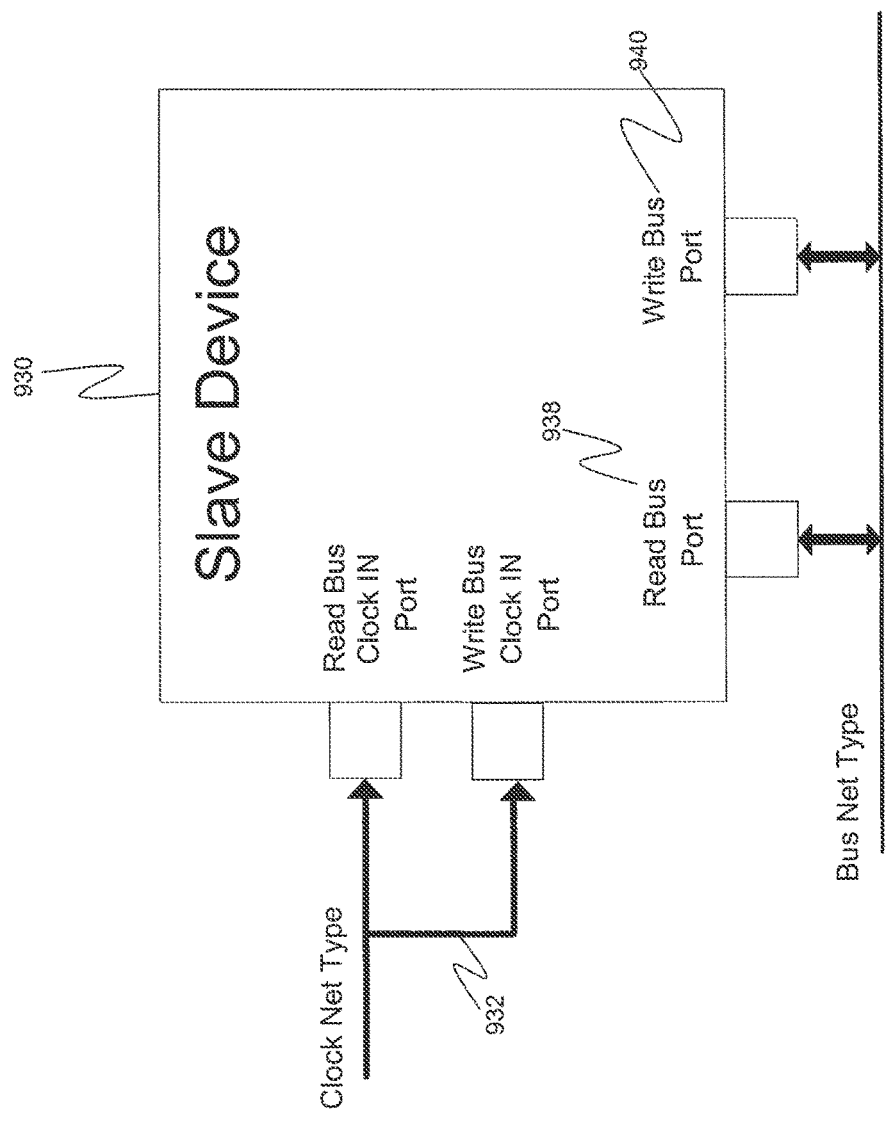
FIG. 9 shows a representation of a typical slave device showing StdBus ports and the architecture modeling API port connections necessary to achieve communications with the StdBus AXI protocol engine, according to an embodiment of the present invention.

This section describes how, in one embodiment, a bus interface can be created on a slave device from initialization through to the API function registration and callback mechanisms involved. FIG. 9 shows a representation 900 of slave device 930 showing some StdBus ports such as read bus port 938 and write bus port 940. A typical slave device 948 is represented in FIG. 9 showing the architecture modeling API port connections necessary to achieve communications with the StdBus AXI protocol engine. Only one set of AXI slave related ports 932 of the slave device are shown here for the purpose of demonstration, but slave device 930 may have many other ports such as Reset, Logic Drivers, and others not depicted in FIG. 9.

3.1 Slave Device Bus Interface

Figure 10:
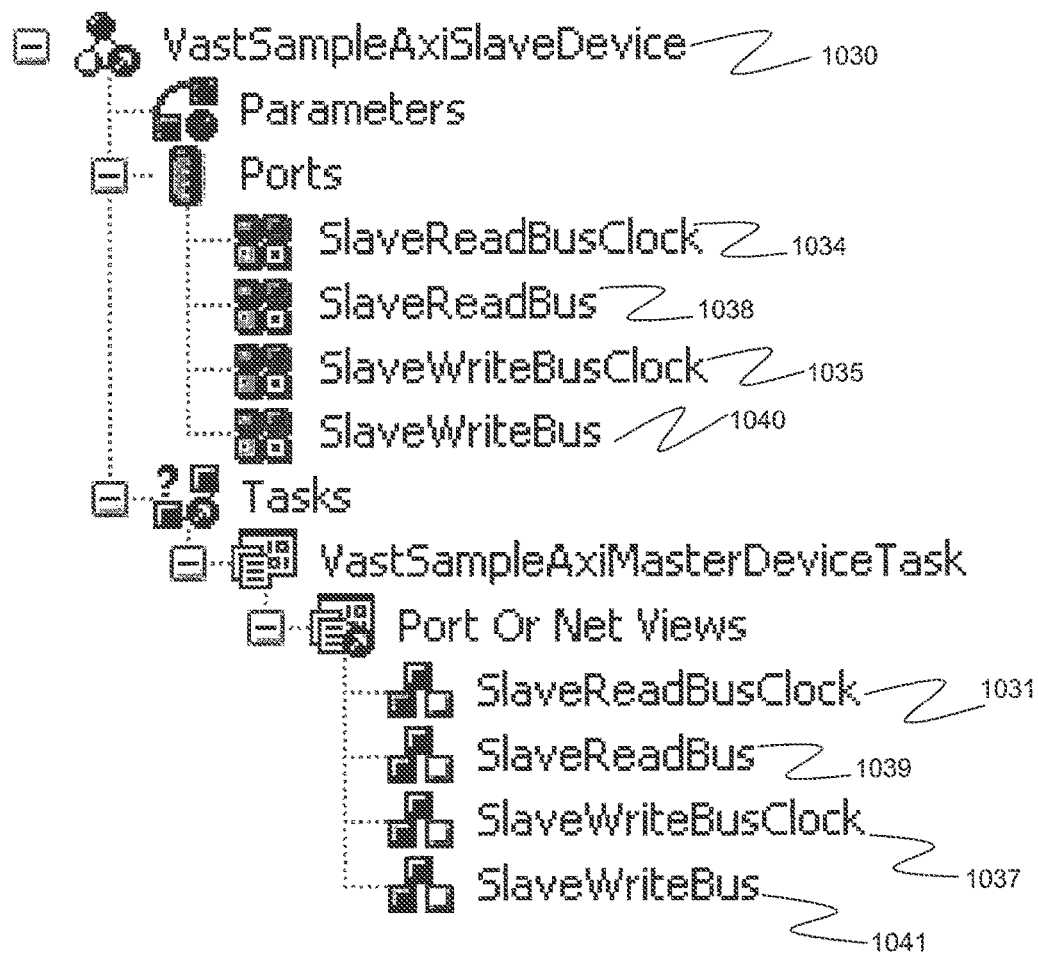
FIG. 10 shows, a slave device bus interface using some of the tools that are included in the COMET System Engineering Environment, according to an embodiment of the present invention.

In an embodiment, the slave device bus interface may be described using some of the tools that are included in the COMET System Engineering Environment. FIG. 10 shows such a description 1000. Description 1000 is illustrated is in terms of a high level view of the connections available to other modules. The necessary connections and properties are described below in this example of slave device 1030. This by no means represents a comprehensive list but is for demonstration purposes only, and for the COMET implementation described herein as an example.

The following list breaks slave device 1030 down into its constituent parts in the example implementation described herein and depicted in FIG. 10:

Parameters:
StartAddress: user-defined name of the base address of the slave device which forms the start of the decode region for this device on the bus.

Timing: user-defined names for the read and write timing in bus clock ticks, for the slave to complete a bus width of data in a transaction.

Ports:
SlaveReadBusClock 1034: user-defined name of the input used for the read bus clock signal SlaveReadBus 1038: user-defined name of the slave input for the read StdBus net type signal SlaveWriteBusclock 1035: user-defined name of the input used for the write bus clock signal SlaveWriteBus 1040: user-defined name of the slave input for the write StdBus net type signal Tasks:
SlaveReadBusclock 1031: Declaration of the slave view on the read bus clock net input port SlaveReadBus 1039: Declaration of the slave view on the read StdBus net port SlaveWriteBusClock 1037: Declaration of the slave view on the write bus clock net input port SlaveWriteBus 1041: Declaration of the slave view on the write StdBus net port

3.2 Slave Device Instance Structure

As part of the module modeling methodology used in the example embodiments described herein, a model has an instance structure associated with it. This instance structure represents a view of the device and data storage elements. In one embodiment, it is in this instance structure that handles are created and stored for each of the architecture modeling API ports on the module interface. An example of this is shown below.

```
/*
**
*/
struct sInstanceData
{
....
....
tWord32                          SlaveReadBusWidth;
tWord32                          SlaveWriteBusWidth;
const tAmpiClockHandleSlave      *pSlaveReadBusClock;
const tAmpiClockHandleSlave      *pSlaveWriteBusClock;
const tAmpiStdBusHandleSlave     *pSlaveReadBus;
const tAmpiStdBusHandleSlave     *pSlaveWriteBus;
tVastSampleAxiSlaveDeviceParameters   Config;
}
```

According to an embodiment of the present invention, the handles created and stored in the instance structure are then used in the model as references to the bus connections.

3.3 Initialization

In an embodiment, the initialization of the model is in essence where the connection is made between the user-defined software handle and the user-defined architecture modeling API port names that represent the hardware connections. In one embodiment, the initialization of the module task is defined in the model function: <modelname>InitTaskInstance. The following example shows how in one embodiment, the handles connect to the hardware variable name.

```
IP->pSlaveReadBusClock =
AmpiClockInitSlavePortView("SlaveReadBusClock", "All");
IP->pSlaveWriteBusClock =
AmpiClockInitSlavePortView("SlaveWriteBusClock", "All");
IP->pSlaveReadBus = AmpiStdBusInitSlavePortView("SlaveReadBus",
"All");
IP->pSlaveWriteBus = AmpiStdBusInitSlavePortView("SlaveWriteBus",
"All");
```

The first two lines use the architecture modeling API function, AmpiClockInitSlavePortView, to define the clock as an input to the slave device for the read and write buses. The actual name of the hardware architecture modeling API port defined in the model structure is used to reference the handle which is then stored in the instance structure. The third and fourth lines use the architecture modeling API function, AmpiStdBusInitSlavePortView, to define the read/write buses as slave connections to the slave device and the actual name of the hardware architecture modeling API port defined in the model structure is used to reference the handle which is then stored in the instance structure. Only some of the Architecture modeling programming interface functions are described herein.

3.4 Registration of StdBus Connection

In order to connect to a StdBus, one embodiment includes gathering some information about the bus connections available. When connected in a platform, in an embodiment, it is possible to establish the data width of the slave port StdBus connections using the following architecture modeling API function call, AmpiStdBusSlaveGetDataWidth.

```
IP->SlaveReadBusWidth = AmpiStdBusSlaveGetDataWidth(IP->
pSlaveReadBus) / 8;
IP->SlaveWriteBusWidth = AmpiStdBusSlaveGetDataWidth(IP->
pSlaveWriteBus) / 8;
```

This can be used by the model to establish valid connection parameters or to calculate timing for multiple data phase transactions. In the case of the function above, the function will return the bit width of the data portion of the buses referenced by their handles and the user variables SlaveReadBusWidth and SlaveWriteBusWidth will store the width of the buses in bytes in the instance structure.

In one particular embodiment, the StdBus, set to AXI, is only capable of connecting to AXI slave device models at the same data width. While other embodiments can be made that are different, having the same data width follows the AXI protocol which requires that the AXI master and slave devices share a connection at a known data width. In accordance with the limitations of the AXI protocol, one embodiment of StdBus also constrains the possible slave AXI connection data widths to between 1 and 128 bytes.

In one embodiment, the AXI slave connects to the bus using the correct type (read or write) and data width. The following example code demonstrates the use of the AmpiStdBusSlaveSetConnectType architecture modeling API function call to connect the read and write buses.

```
switch (IP-> SlaveReadBusWidth)
{
case 128: AmpiStdBusSlaveSetConnectType(IP->pSlaveReadBus,
    AxireadD1024V1connecttype); break;
case 64: AmpiStdBusSlaveSetConnectType(IP->pSlaveReadBus,
    AxireadD512V1connecttype); break;
case 32: AmpiStdBusSlaveSetConnectType(IP->pSlaveReadBus,
    AxireadD256V1connecttype); break;
case 16: AmpiStdBusSlaveSetConnectType(IP->pSlaveReadBus,
    AxireadD128V1connecttype); break;
case 8: AmpiStdBus SlaveS etConnectType(IP->pSlaveReadBus,
    AxireadD64V1connecttype); break;
case 4: AmpiStdBusSlaveSetConnectType(IP->pSlaveReadBus,
    AxireadD32V1connecttype); break;
case 2: AmpiStdBusSlaveSetConnectType(IP->pSlaveReadBus,
    AxireadD16V1connecttype); break;
case 1: AmpiStdBusSlaveSetConnectType(IP->pSlaveReadBus,
    AxireadD8V1connecttype); break;
}
switch (IP-> SlaveWriteBusWidth)
{
case 128:AmpiStdBusSlaveSetConnectType(IP->pSlaveWriteBus,
    AxiwriteD1024V1connecttype); break;
case 64: AmpiStdBusSlaveSetConnectType(IP->pSlaveWriteBus,
    AxiwriteD512V1connecttype); break;
case 32: AmpiStdBusSlaveSetConnectType(IP->pSlaveWriteBus,
    AxiwriteD256V1connecttype); break;
case 16: AmpiStdBusSlaveSetConnectType(IP->pSlaveWriteBus,
    AxiwriteD128V1connecttype); break;
case 8: AmpiStdBusSlaveSetConnectType(IP->pSlaveWriteBus,
    AxiwriteD64V1connecttype); break;
case 4: AmpiStdBusSlaveSetConnectType(IP->pSlaveWriteBus,
    AxiwriteD32V1connecttype); break;
case 2: AmpiStdBusSlaveSetConnectType(IP->pSlaveWriteBus,
    AxiwriteD16V1connecttype); break;
```

```
case 1: AmpiStdBusSlaveSetConnectType(IP->pSlaveWriteBus,
   AxiwriteD8V1connecttype); break;
}
```

This function call indicates to the SBPE that the slave device wants to connect to it using the AXI read or write protocol, and uses the bus widths determined earlier to determine the AXI data width.

To design a slave device that can connect to either an AXI or a StdBus1 protocol net, according to an embodiment, the slave should check the return code of AmpiStdBusSlaveSetConnectType and attempt to connect using another protocol as shown below.

```
Status = AmpiStdBusSlaveSetConnectType(IP->pSlaveWriteBus,
   AxiwriteD32V1 connecttype); if (Status == AmpiStatusFail)
{
Status = AmpiStdBusSlaveSetConnectType(IP->pSlaveWriteBus,
   StdBusV1 connecttype);
}
```

The above code example shows a device that can connect to either a 4 byte wide AXI protocol or any width StdBus protocol configured StdBus net. In another embodiment, it is up to the slave to note which connection succeeds and to then store the protocol of the StdBus instance that it connected to, and if also variable, the bus width connection at which the connection was established, so that it may respond appropriately to transactions when they are received.

3.5 Registrations of StdBus Callbacks

In accordance with an embodiment of the invention, StdBus transactions take the form of callbacks to the slave from the master either directly, or, via the StdBus protocol engine.

In one embodiment, when a bus master device makes a request for a transaction to the StdBus protocol engine, the protocol engine interrogates the type of transaction and routes it to the appropriate slave read or write bus port. In another embodiment, the SBPE does not perform address decoding for timed AXI transactions. Pre-registered callbacks by the slave enable the protocol engine to call the appropriate functions in the slave so that the transaction may proceed and data can be transferred.

In one embodiment, this callback registration is handled via architecture modeling API function calls from the task Initialization function <modelname>InitTaskInstance of the slave device model. The following example shows how to register the callbacks with the StdBus protocol engine.

```
AmpiStdBusRegisterCommand(IP->pSlaveReadBus, ...
   _slavetimedreadaccess, IP, readOP);
AmpiStdBusRegisterCommand(IP->pSlaveWriteBus, ...
   _slavetimedwriteaccess, IP, writeOP);
AmpiStdBusRegisterCommand(IP->pSlaveReadBus, ...
   _slaveuntimedreadaccess, IP, readUntimedOP);
AmpiStdBusRegisterCommand(IP->pSlaveWriteBus, ...
   _slaveuntimedwriteaccess, IP, writeUntimedOP);
```

In one embodiment, slave devices that provide regions from which instructions may be executed must also register callbacks for the fetch decoder. Fetch transactions are routed to the same bus port as read transactions, and in the simplest case can be handled by the slave in the same way as a data read.

```
AmpiStdBusRegisterCommand(IP->pSlaveReadBus,
   _slavetimedreadaccess, IP, fetchOp);
AmpiStdBusRegisterCommand(IP->pSlaveReadBus,
   _slaveuntimedreadaccess, IP, fetchUntimedOp);
```

In another embodiment, the architecture modeling API function, AmpiStdBusRegisterCommand, performs the callback registration. The first parameter passes the StdBus slave handle (or pointer) that this slave device is referencing (IP.fwdarw.pSlaveReadBus or IP.fwdarw.pSlaveWriteBus). The next parameter is the user-defined slave function responsible for handling a particular type of command that can be issued on the StdBus. The instance pointer for this slave is also passed and the final parameter is the decode command which is associated with the slave function.

In order for the slave device model to handle a target debugger interface, in one embodiment, the untimed functions are also required to be registered with the SBPE. Only some architecture modeling API functions are described herein.

According to an embodiment, each slave callback function is associated with a StdBus command during the registration process, and each StdBus command has one associated decoder. More than one StdBus command may use the same decoder. Below is a list of commands which are associated with the commonly used device decoders:

Read decoder (readdecodeMask) has associated Read Operation (readOp); Untimed read Operation (readUntimedOp). Write decoder (writedecodeMask) has associated Write Operation (writeOp); Untimed write Operation (writeUntimedOp). Instruction fetch decoder (fetchdecodeMask) has associated Fetch Operation (fetchOp); and Untimed fetch Operation (fetchUntimedOp).

In one embodiment, if a slave device registers to accept transactions from a particular decoder, then it must also register the appropriate callbacks to handle each of the StdBus commands which utilize that decoder.

The following steps outline how in one embodiment, the SBPE uses the decoder embedded within a transaction to route the transaction issued by a master to a slave.

Master issues a command in the form of a transaction. The type of command is set in the command subfield of the transaction data structure (e.g., readOp, writeUntimedOp, fetchOp, etc).

The SBPE uses the command subfield to determine which decoder to use for this transaction. The decoder and command type determine the slave callback function for this transaction, which is ultimately called by the SBPE.

For timed StdBus type 1 protocol transactions and untimed transactions, the decoder is also used with the registered slave device regions to perform address decoding of the transaction to a particular slave.

For timed AXI (StdBus type 2) protocol transactions, any transactions issued by the connected AXI master's read or write master StdBus ports are issued to the corresponding connected AXI read or write slave port. No address decoding is performed.

3.6 Registrations of Slave Device Decoders

According to an embodiment, the addressable region of the slave device is registered with the StdBus protocol engine. Although in one embodiment, the SBPE in AXI protocol mode does not perform address decoding, slave devices should still register their decode range for various reasons. For example:

To maintain backwards compatibility if the slave device is to connect to a bus net representing a more conventional bus protocol, e.g., a non AXI protocol.

To support untimed accesses. In one embodiment, the SBPE performs address decoding for untimed accesses.

Masters can set up a callback to be notified when a slave registers a decode region. This allows masters to perform automatic address decoding and routing.

In another embodiment, decoder registration is handled via an architecture modeling API function call from the task Initialization function <modelname>InitTaskInstance of the slave device model. The following example shows how to achieve this in one embodiment.

```
AmpiStdBusRegisterDecodeRange(IP->pSlaveReadBus,
  readdecodeMask, IP->Config.StartAddress, DEVICE_SIZE);
AmpiStdBusRegisterDecodeRange(IP->pSlaveWriteBus,
  writedecodeMask, IP->Config.StartAddress, DEVICE_SIZE);
```

Slave devices that provide regions from which instructions may be executed must also register a decode range for the fetch decoder as shown below.

```
AmpiStdBusRegisterDecodeRange(IP->pSlaveReadBus,
  fetchdecodeMask, IP->Config.StartAddress, DEVICE_SIZE);
```

In an embodiment, the architecture modeling API function, AmpiStdBusRegisterDecodeRange, performs the decoder registration. The first parameter passes the StdBus handle (or pointer) of the bus port connection that this slave device is referencing (IP.fwdarw.pSlaveReadBus or IP.fwdarw.pSlaveWriteBus). The next parameter selects one or more decoders by OR-ing together their respective bit masks. In this case, the read decoder is used on the slavereadBus, and the write decoder is used on the slavewriteBus. The various decoder Masks are to be used for both decoder registrations and are defined in a file called ampi_stdbus_types.h in one specific implementation.

The third and fourth parameters are the base address and length of the address region to be decoded by the selected decoders to the slave device. In this case, in an embodiment, the StartAddress parameter is retrieved and passed from the model configuration parameters in the interface. This allows the base address of the device to be modified at configuration time to facilitate repositioning of the slave device within the memory Map.) Multiple address ranges can be registered if required by the slave device architecture.

In one embodiment, timed transactions are routed by the SBPE as follows:

If the bus connection is merged, and the protocol set to AXI, then transactions received from the master's read and write ports are routed, through the appropriately registered slave port function, to the slave's read and write ports respectively, regardless of the decode region registrations.

If the bus connection is merged, and protocol is not set to AXI, then the destination of each transaction depends entirely on the decode region registrations—which are not allowed to overlap.

Similarly, if the bus connection is split (and hence should not be set to AXI protocol), then the transactions are always routed based entirely on the decode region registrations.

Untimed transactions are always routed based entirely on the decode region registrations.

3.7 AXI Subcommand Handling

According to an embodiment of the invention, with reference to the TransProtocol field in the transaction data structure, this can be verified for each transaction to ensure that the correct protocol has been adhered to. According to an embodiment, it is the responsibility of the master device to set this and can be verified as each transaction is received by the slave.

In an embodiment, contained within the Command32 variable in the transaction data structure is the SubCommand structure which indicates information specific to the protocol type of the transaction about to commence. When the SBPE calls the AXI slave device bus access function, it is at this point that the slave device can interrogate the transaction and respond appropriately. The SubCommand field of Command32 can be accessed specifically as follows.

pBusTransaction.fwdarw.SubCommand

In brief, in an embodiment, the SubCommand field in an AXI transaction contains the following information.

AXI burst Size, which determines the size of the transfer per beat of the burst.

AXI burst type, which determines the address changes for each beat of the burst. AXI burst Length, which determines the number of beats in the burst.

These values are encoded and the actual values may be determined from a header file, called ampi_stdbus_types.h in the specific COMET implementation, which details the appropriate enumerations, masks, and offsets.

3.8 AXI Burst Size

In one embodiment, the SubCommand field contains information about the AXI burst Size of the transaction. These enumerated values are listed below.

```
AxiSize8Bits = 0,   /* 8 bit wide transfer */
AxiSize16Bits =1 ,  /* 16 bit wide transfer */
AxiSize32Bits = 2,  /* 32 bit wide transfer */
AxiSize64Bits = 3,  /* 64 bit wide transfer */
AxiSize128Bits = 4, /* 128 bit wide transfer */
AxiSize256Bits = 5, /* 256 bit wide transfer */
AxiSize512Bits = 6, /* 512 bit wide transfer */
AxiSize1024Bits =7 /* 1024 bit wide transfer */
```

The following Code Fragment demonstrates how to extract the size in bytes from the SubCommand field.

```
AxiSize = ((tWord8)(pBusTransaction->SubCommand &
    AxiSubCommandSizeMask)) >> AxiSubCommandSizeOffset;
TransferSize = 1 << AxiSize;
```

The AxiSize variable contains the enumerated code for the transfer size. In this case the TransferSize value is calculated from the enumerated type, and represents the size of each beat in bytes.

In the example implementation, not all slave device models may be able to process all sizes of transactions. It is up to the implementation as to what action to take when the size of the transaction has been established. Also, depending on the bus connection width certain combinations may result in illegal conditions and should be reported as an error condition if generated by a master device.

3.9 AXI Burst Type

The SubCommand field also contains information about the AXI burst type. These enumerated values are listed below.

```
AxiBurstIncrOrWrap = 0, /* Incrementing or Wrapping */
AxiBurstFixed = 1 /* Fixed address */
```

The following code fragment demonstrates how to extract this information from the SubCommand field:

```
BurstType=((tWord8)(pBusTransaction.fwdarw.Subcommand &
AxiSubCommandBurstTypeMask))>>AxiSubCommandBurstTypeOffset;
```

Not all slave device models may be able to process all type of transactions. It is dependent upon the individual device specification as to what action to take when the burst type has been established.

3.10 AXI Burst Length

In accordance with an embodiment of the invention, the final piece of AXI burst information contained in the SubCommand field is the AXI burst length. These enumerated values are listed below.

```
AxiBurstLength1 = 0,
AxiBurstLength2 = 1,
AxiBurstLength3 = 2,
AxiBurstLength4 = 3,
AxiBurstLength5 = 4,
AxiBurstLength6 = 5,
AxiBurstLength7 = 6,
AxiBurstLength8 = 7,
AxiBurstLength9 = 8,
AxiBurstLength10 = 9,
AxiBurstLength11 = 10,
AxiBurstLength12 = 11,
AxiBurstLength13 = 12,
AxiBurstLength14 = 13,
AxiBurstLength15 = 14,
AxiBurstLength16 = 15
```

The following code fragment demonstrates how to extract this information from the SubCommand field:

```
NumBeats=1+((tWord8)(pBusTransaction.fwdarw.SubCommand &
AxiSubCommnandBurstLengthMask))>>AxiSubCommandBurstLength
Offset;
```

3.11 Burst Transactions, Beats and Slave Access Widths

In one embodiment, the burst length and transfer size per beat of the burst are used to determine the timing of the bus transaction. For example, if the burst length is AxiBurstLength4 (e.g., there are 4 beats in the burst) and if the transfer size per beat of the burst is AxbSize32 Bit (e.g., 4 Byte size of each beat), then the total amount of ticks used by the device for this bus transaction is 4 cycles (assuming that each data phase takes 1 cycle). This also assumes that the StdBus net, to which the slave device StdBus port is attached, has a data width connection which is no smaller than 4 bytes wide. This is because in one embodiment, the burst size is not allowed to exceed the physical bus width.

3.12 Timed Slave Transaction Handling

The AXI protocol defines 5 independent channels used to transfer data and control information between master and slave devices. The channels are:

read address (master to slave); read data (slave to master); write address (master to slave); write data (master to slave); and write response (slave to master).

According to an embodiment, each channel uses a simple VALID/READY handshaking sequence to transfer the address/data/response information between the two devices. For example, for the write data Channel, the AXI master drives the write data and the write data Valid signals. The AXI slave asserts the write data Ready signal to indicate that the write data has been received—the master is now free to drive the next beat of data onto the Channel.

In another embodiment, StdBus for AXI virtualizes this process using callback functions registered by the master/slave in the StdBus transaction data structure. It also allows the aggregation of data beats into one or more data Payloads, each including one or more data beats. Table 2 shows the relationship between the AXI protocol valid/ready signals, and the StdBus AXI callback function of one implementation.

| Relationship between AXI protocol valid/ready signals and the StdBus AXI callback function | | |
|---|---|---|
| Signal Name | Callback function (OWNER) | Called By |
| Read address VALID | Read bus access registered function (slave) | SBPE |
| Read address READY | pBusTransCommandUsed (master) | Slave |
| Read data VALID | pBusTransDataAvailable (master) | Slave |
| Read data READY | pBusTransDataUsed (slave) | master |
| Write address VALID | write bus access registered function (slave) | SBPE |
| Write address READY | pBusTransCommandUsed (master) | Slave |
| Write data VALID | Write bus access registered function (slave) and/or pBusTransDataAvailable (slave) | Master |
| Write data READY | pBusTransDataUsed (slave) | Slave |
| Write response VALID | pBusTransResponseAvailable (master) | Slave |
| Write response READY | pBusTransResponseUsed (slave) | master |

In the AXI protocol, all AXI transactions are treated as burst transactions, with a single data transfer represented as a burst with a single beat in the burst.

3.13 Slave Read Access

Figure 12:
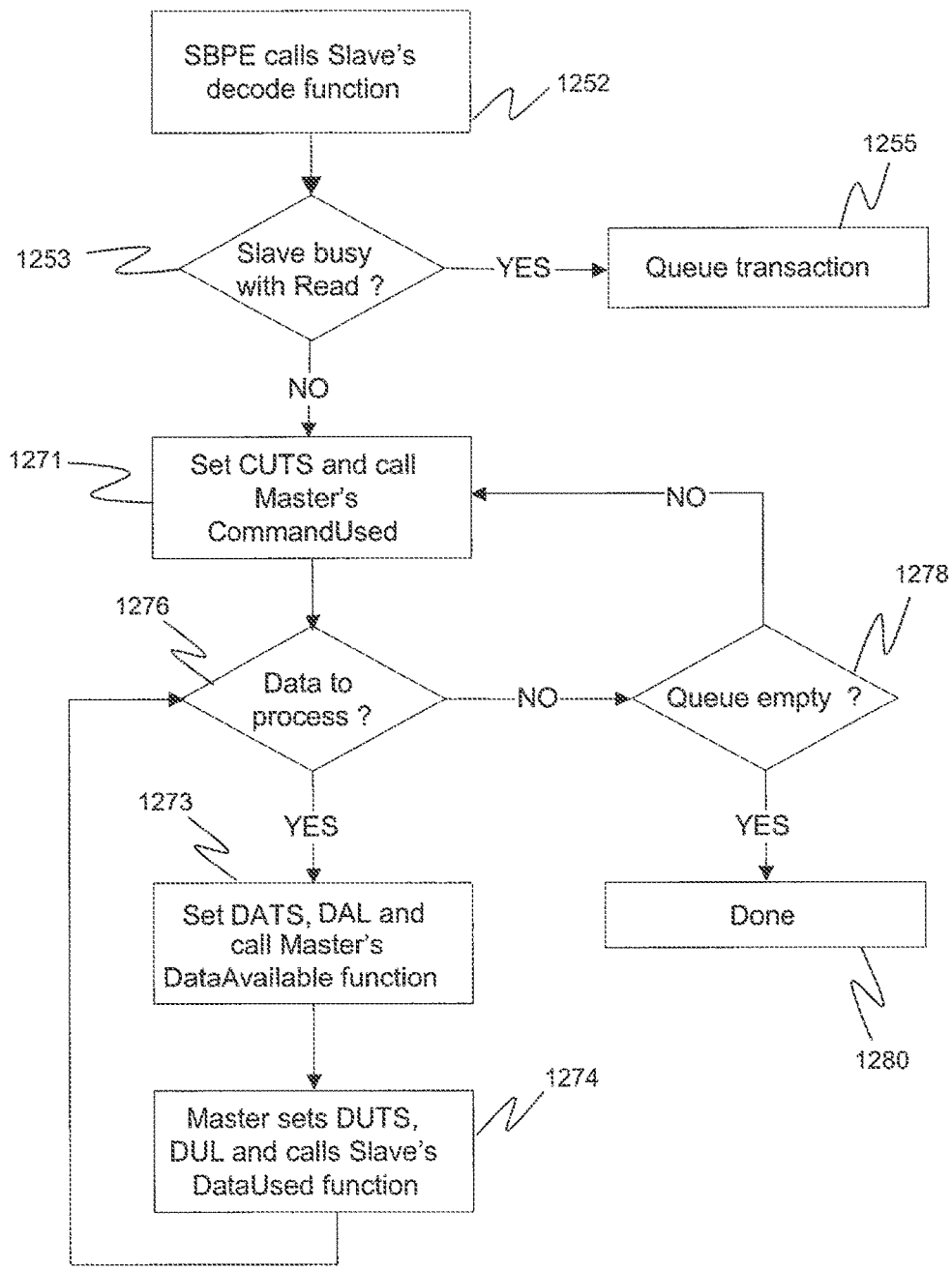
FIG. 12 is a flowchart illustrating steps by which an AXI slave can process read transactions, according to an embodiment of the present invention.

The following describes how in one embodiment, as will be further described with respect to FIG. 12, an AXI slave processes a timed read transaction:

The master issues transaction; it is decoded by the SBPE, and routed to the slave's read bus port by calling the slave's registered read access function. The master has set the CommandAvailableTickStamp (CATS) to indicate the time at which the transaction was initiated, or in AXI terms, the clock edge at which read command valid signal is asserted. This marks the start of the address phase.

If the slave cannot process the transaction at this time, for example, if it is busy with a previous transaction, then the transaction is queued. The queuing mechanism is the slave's responsibility. The slave will not receive another transaction through its read slave port until it calls pBusTransCommandUsed for this transaction.

When the slave is ready to process the transaction, it sets Command UsedTickStamp (CUTS) to indicate the time at which the transaction was accepted. This marks the end of the address phase.

The slave calls pBusTransCommandUsed (CommandUsed) for this transaction. This, together with the CUTS, represents the sampling of the READY signal on the AXI read address channel, and indicates to the master that the channel is free, and the slave's read port is ready to accept another transaction. Slaves must not call CommandUsed until they can process another transaction on the slave's read port. Within the CommandUsed callback, the master may issue another transaction, which would be routed to the slave before the original CommandUsed function returned.

The slave sets pSourceBuffer to point to the data to be returned, and sets pBusTransDataUsed to point to the slave's DataUsed callback function.

The slave considers whether the (remaining) data will be delivered as one or more payloads, and sets the length of the data payload to be returned. Each payload can represent one or more data beats.

The slave increments DataAvailableLength by the new data payload length, updates DataAvailableTickStamp, sets Status in the transaction data structure and calls pBusTransDataAvailable. The DataAvailableTickStamp should be set to the clock edge at which the first beat in the new data payload is made available.

The master reads slave response (Status), reads the new data from pSourceBuffer, sets DataUsedLength=DataAvailableLength, sets DataUsedTickStamp, and calls pBusTransDataUsed. If no more data is to be transferred, for example, in the case of a single data payload, the transaction is now complete. Otherwise, the slave repeats Steps 6 and 7 and the master repeats Step 8 for each of the remaining payloads in the transaction.

The slave may have received another transaction from the master as soon as CommandUsed was called, that is, before the original transaction was completed. It is up to the slave to ensure that transactions are buffered or queued appropriately.

The AXI protocol allows the slave to return a different response for each beat in a read burst transaction. For example, for a burst of 4 beats, the slave may return OKAY for 3 beats, and SLVERR (indicating, "slave error") for one beat. Each time the slave calls the master's DataAvailable function, it can set the Status field in the transaction data structure to indicate the desired response. If returning more than one data beat in a data payload with differing responses, the slave device should either split the data payloads according to the different responses, or return each beat as a separate payload with each response signaled individually.

In one embodiment, and as per the AXI protocol, even if an error occurs in the middle of a burst, the slave must continue with the burst until all beats have been processed. For example, if in a 16 beat transfer, an error occurs after beat 6, the slave must continue with the transfer for the remaining 10 beats (setting Status to SLVERR for each, or returning the remaining beats as one data payload of 10 beats with SLVERR set).

Figure 11:
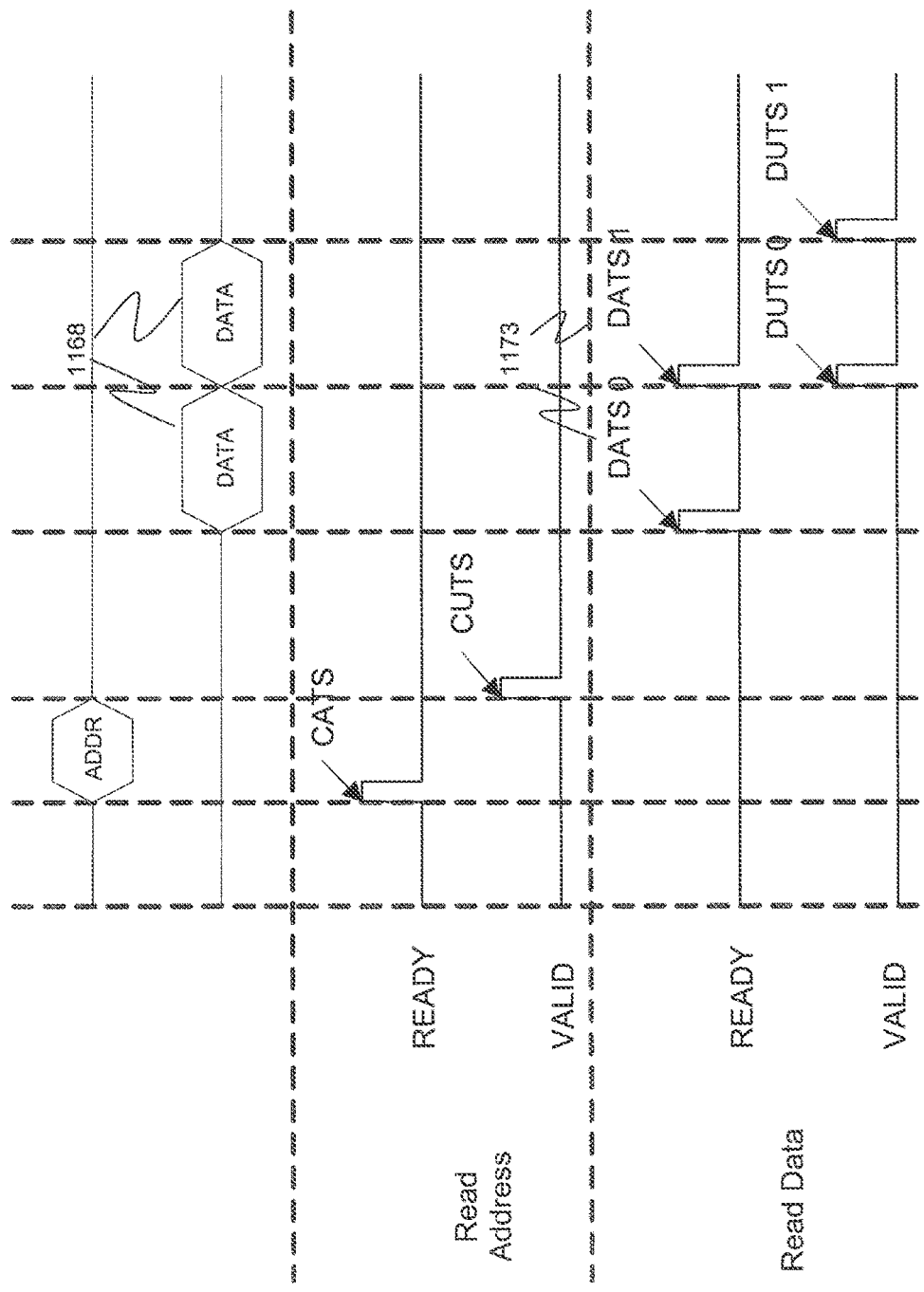
FIG. 11 illustrates the timing of each of the two channels involved in a timed AXI read transaction with two data payloads, according to an embodiment of the present invention.

FIG. 11 shows the timing of each of the two channels involved in a timed AXI read transaction 1100, in accordance with one embodiment of the present invention.

Transaction 1100 has two data payloads 1168. It is up to the slave to determine how many data beats 1173 form a data payload 1168, and to return a payload 1168 each time it invokes the master's DataAvailable function, with the following restrictions:

The start and end of each payload 1168 must either be the start or end bytes of the transaction or at a beat-aligned boundary in-between.

The slave must limit the data payload length to correspond to the number of beats of data it can guarantee that it is capable of delivering on contiguous clock cycles. For example, if the slave needs to insert a delay between beats, it must limit each data payload 1168 to one data beat and return each payload separately (i.e., with successive calls to pTransDataAvailable).

FIG. 12 provides a flowchart 1200 describing a simple example implementation of an AXI slave that can process read transactions. Flowchart 1200 includes a transaction queue of size=1.

The process starts at step 1252 where the Standard Bus Protocol Engine (SBPE) calls the slave device's decode function.

In step 1253, it is determined whether the slave device is busy with a read. According to an embodiment, if the slave device is not busy, CUTS will be set and the slave device will call the master device's CommandUsed function in step 1271 as described below, but if the slave device is busy, the transaction is queued in step 1255.

The process continues in step 1271, in which the slave device calls the master device's CommandUsed function.

In step 1276, it is determined whether the slave device has return data to process. According to an embodiment, if the slave device has data to process, DATS and DAL will be set and the slave device will call the master device's DataAvailable function in step 1273 as described below, but if the slave device does not have data to process, the queue is checked in step 1278.

In step 1278, it is determined whether the slave device's queue is empty. According to an embodiment, if the queue is empty, the process ends in step 1280, but if the queue is not empty, control returns to step 1271 where CUTS is set and the master device's CommandUsed function is called again as described above.

In step 1273, the slave device sets DATS and DAL and the slave device calls the master device's DataAvailable function.

After the slave device calls the master device's DataAvailable function in step 1273, the master sets DUTS and DUL and calls the slave device's DataUsed function in step 1274 and control returns to step 1276 to check if there is additional data to process as described above.

The following code example is an implementation of the flowchart of FIG. 12 and shows a simple implementation of AXI slave that can process read transactions.

```
/*
** This function is called by the SBPE when it has decoded a read transaction for
** the slave.
*/
void _slavetimedreadaccess(void *VoidIP, tAmpiStdBusTransaction *pBusCommand)
{
tInstanceData *IP = (tInstanceData*)VoidIP;
/*
** Only process one transaction at a time.
*/
    if (IP->Processingtransaction)
    {
    /*
    ** Queue this transaction.
    */
      IP->QueuedReadTransaction = pBusCommand; return;
    }
IP->Processingtransaction = TRUE;
/*
** Update pSourceBuffer and SlaveData pointer
*/
pBusCommand->pSourceBuffer = (tWord8*)&IP->ReturnBuffer[0];
pBusCommand->pSlaveData = IP;
/*
** Set DataUsed callback.
*/
pBusCommand->pBusTransDataUsed = AxiReadSlaveDataUsed;
/*
** call CommandUsed function.
```

```
*/
  pBusCommand->CommandUsedTickStamp =pBusCommand-
      >CommandAvailableTickStamp + CommandDelay;
  pBusCommand->pBusTransCommandUsed(pBusCommand);
/*
** Init DataUsedTickStamp, then process the first data beat.
*/
  pBusCommand->DataUsedTickStamp =pBusCommand->CommandUsed
TickStamp
      + IP->timing.read; SlaveReadProcessBeat(IP, pBusCommand); }
/*
** This function processes 1 beat of read data.
*/
void SlaveReadProcessBeat(tInstanceData *IP, tAmpiStdBusTransaction
    *pBusCommand)
{
  tWord32 BeatSize;
/*
** Determine beat size in bytes.
*/
  BeatSize = 0x1 << ((pBusCommand->SubCommand & AxiSub
CommandSizeMask)
      >>AxiSubCommandSizeOffset);
/*
** Read data.
*/
Copyreaddata(IP, pBusCommand, BeatSize);
/*
    ** Update DataAvailable length and tick stamp, then call master's
    ** DataAvailable callback.
    */
pBusCommand->DataAvailableLength += BeatSize;
pBusCommand->DataAvailableTickStamp = pBusCommand->DataUsed
TickStamp;
pBusCommand->pBusTransDataAvailable(pBusCommand);
}
/*
** This function is called by the master after a beat of data has been
processed.
*/
void AxiReadSlaveDataUsed(tAmpiStdBusTransaction *pBusCommand)
{
    tInstanceData *IP = (tInstanceData*)pBusCommand->pSlaveData;
/*
** Check if transaction has finished.
*/
if (pBusCommand->DataUsedLength == pBusCommand->Length)
    {
IP->Processingtransaction= FALSE;
ProcessQueuedTransaction (IP);
}
else
{
/*
** next beat.
*/
SlaveReadProcessBeat(IP, pBusCommand);
}
}
/*
** This function is called by the slave after processing both read or write
** transactions. It handles processing the next transaction in the queue,
where
** read transactions are given priority.
*/
void ProcessQueuedTransaction(tInstanceData *IP)
{
tAmpiStdBusTransaction *pBusCommand;
/*
** Process queued transaction.
*/
if (IP->QueuedReadTransaction)
{
pBusCommand = IP->QueuedReadTransaction;
IP->QueuedReadTransaction = NULL;
_slavetimedreadaccess(IP, pBusCommand);
}
else if (IP->QueuedWriteTransaction)
{
```

```
pBusCommand = IP->QueuedWriteTransaction;
IP->QueuedWriteTransaction = NULL;
_slavetimedwriteaccess(IP, pBusCommand);
}
}
```

3.14 Slave Write Access

The following section describes how, in accordance with an embodiment, an AXI slave processes a timed write transaction.

Figure 13:
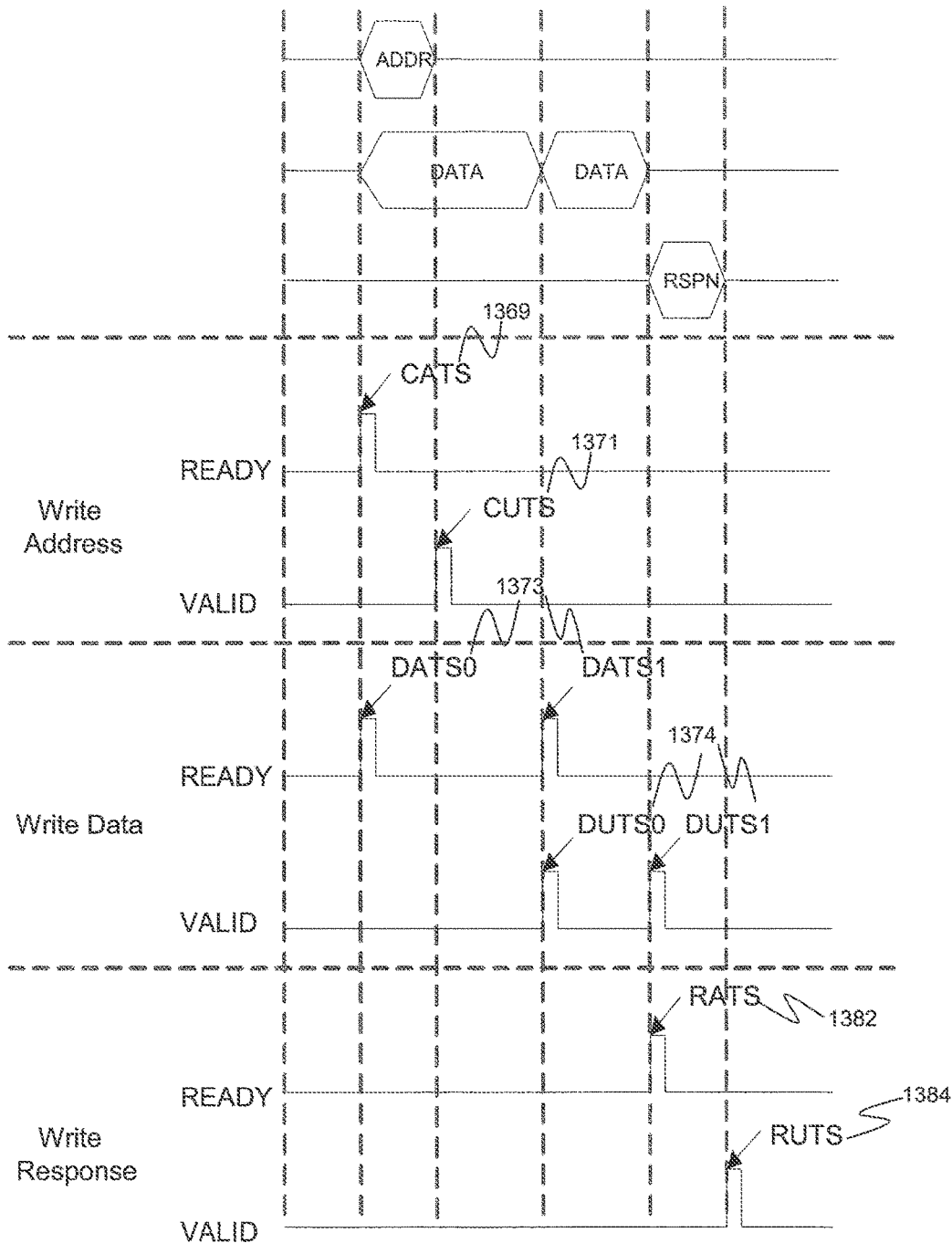
FIG. 13 shows the timing of each channel involved during an AXI write transaction according to an embodiment of the present invention.

FIG. 13 shows the timing 1300 of each channel involved during an AXI write transaction according to one embodiment.

In the example transaction shown in FIG. 13, the master elects to make the first data payload available at the time the transaction was issued onto the bus. This is not compulsory, and the master is free to delay the first data payload by setting DataAvailableLength=0 before it issues the transaction.

As depicted in FIG. 13, the master issues a transaction; it is decoded by the SBPE and routed to the slave's write bus port by calling the slave's registered write access function. The master has set the CommandAvailableTickStamp (CATS) 1369 to indicate the time at which the transaction was initiated, or in AXI terms, the clock edge at which write command valid is asserted. This marks the start of the address phase.

If the slave cannot process the transaction at this time, for example, if it is busy with another write transaction, then the transaction is queued. The queuing mechanism is the slave's responsibility. The slave will not receive another transaction through its write slave port until it calls pBusTransCommandUsed for this transaction.

Next, when the slave is ready to process the transaction, it sets CommandUsedTickStamp (CUTS) 1371 to indicate the time at which the transaction was accepted, and, in case additional data payloads are required, sets pBusTransDataAvailable to point to the slave's DataAvailable callback function. This marks the end of the address phase.

The slave then calls pBusTransCommandUsed (CommandUsed). As for reads, this, together with CUTS 1371, represents the sampling of the READY signal 1373 on the AXI write address channel, and indicates to the master that the channel is free, and the slave's write port is ready to accept another transaction. Slave devices must not call CommandUsed until they can process another transaction on the slave's write port. Within the CommandUsed callback, the master may issue another transaction, which would be routed to the slave before the original CommandUsed function returned.

Next, the slave checks DataAvailableLength. The master may or may not have made the first payload of data available (by setting DataAvailableLength to a non-zero value). If DataAvailableLength is non-zero, the slave can process some or all of the data immediately, otherwise, the slave must wait for the master to call the slave's DataAvailable function.

Then master increments DataAvailableLength and calls the slave's DataAvailable function. The number of bytes to process is given by DataAvailableLength-DataUsedLength.

Each time the master calls DataAvailable, the slave performs the data store, sets DataUsedLength=DataAvailableLength, updates DataUsedTickStamp (DUTS) 1374 and calls pBusTransDataUsed.

After all data has been processed, the slave sets Status in the transaction data structure, sets ResponseAvailableTickStamp, (RATS) 1382, pBusTransResponseUsed, and calls pBusTransResponseAvailable.

The master then reads the slave response (Status), sets ResponseUsedTickStamp (RUTS) 1384 and calls pBusTransResponseUsed. The transaction is now complete.

According to an embodiment, the slave is responsible for processing data as it is made available by the master. According to an embodiment, each time the slave calls pBusTransDataUsed, it sets the DataUsedTickStamp and also sets DataUsedLength=DataAvailableLength.

In one embodiment, for AXI write transactions, only a single response (which applies to the entire burst) is returned by the slave. If any beat in the burst caused an error, the slave must continue with the burst until all data has been processed (the data need not be stored), at which time it can return the error response to the master.

Figure 14:
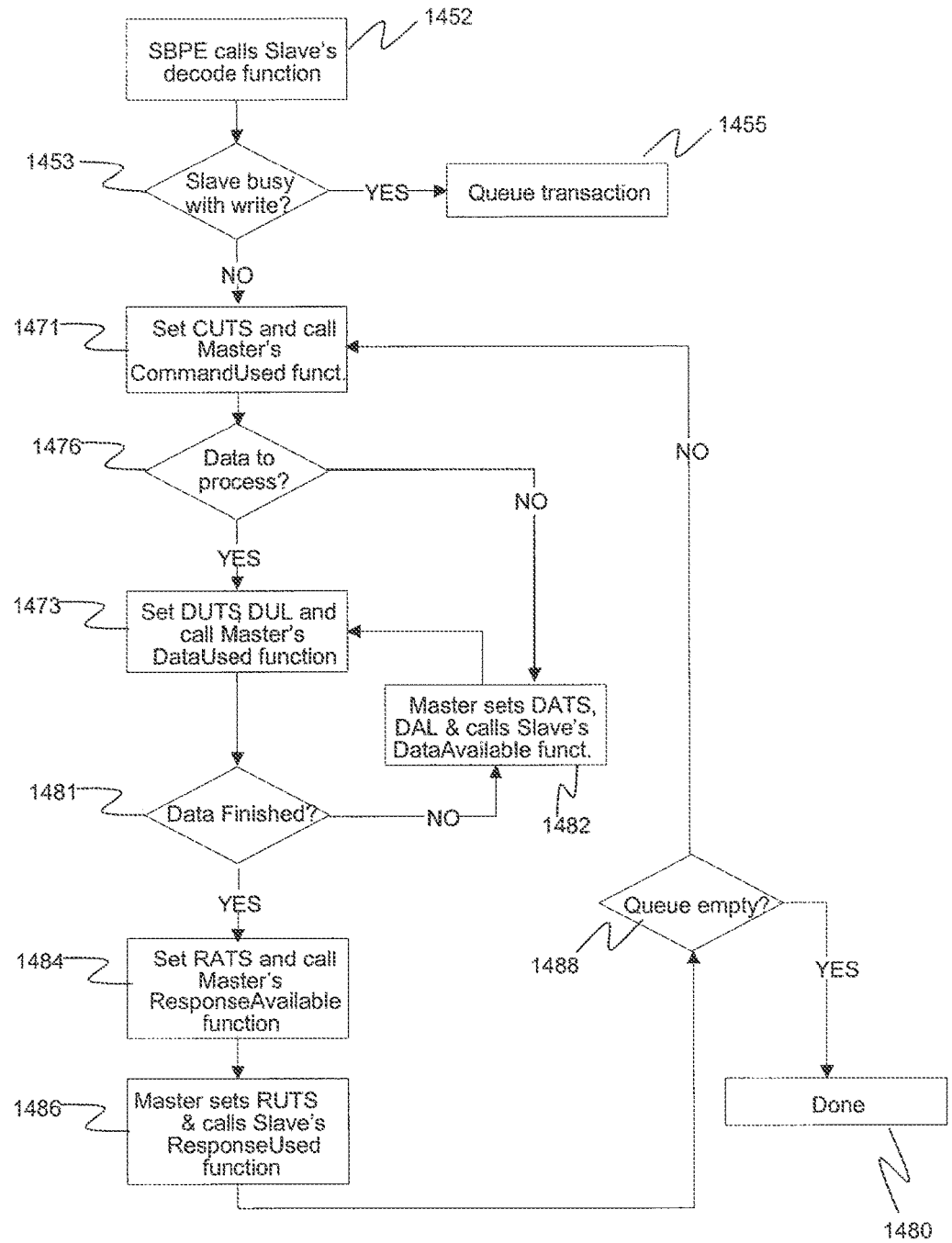
FIG. 14 is a flowchart illustrating steps by which an AXI slave can process write transactions according to an embodiment of the present invention.

FIG. 14 shows a flowchart 1400 of one example of a simple implementation of a process whereby an AXI slave can process write transactions. Flowchart 1400 includes a transaction queue of size=1.

The process starts at step 1452 where the Standard Bus Protocol Engine (SBPE) calls the slave device's decode function.

In step 1453, it is determined if the slave device is busy with a write. According to an embodiment, if the slave device is not busy, CUTS will be set and the slave device will call the master device's CommandUsed function in step 1471 as described below, but if the slave device is busy, the transaction is queued in step 1455.

The process continues in step 1471, the slave device calls the master device's CommandUsed function.

In step 1476, it is determined if the slave device has data to process. According to an embodiment, if the slave device has data to process, DUTS and DUL will be set and the slave device will call the master device's DataUsed function in step 1473 as described below, but if the slave device does not have data to process, the master device sets DATS and DAL and calls the slave device's DataAvailable function in step 1482 as described below.

In step 1473, the slave device sets DUTS and DUL and the slave device calls the master device's DataUsed function.

In step 1481, it is determined if the data is finished. According to an embodiment, if the data is finished, RATS will be set and the slave device will call the master device's ResponseAvailable function in step 1484 as described below, but if the data is not finished, the master device sets DATS and DAL and calls the slave device's DataAvailable function in step 1482 as described below.

In step 1482 the master device sets DATS and DAL and calls the slave device's DataAvailable function and control returns to step 1473, where the slave device sets DUTS and DUL and calls the master device's DataUsed function as described above.

In step 1484, RATS is set and the slave device calls the master device's ResponseAvailable function.

After completing step 1484, the method continues to step 1486 where the master device sets RUTS and calls the slave device's ResponseUsed function. When step 1484 has been completed, the method continues with step 1488 where the queue is checked as described below.

In step 1488, it is determined if the slave device's queue is empty. According to an embodiment, if the queue is empty, the process ends in step 1480, but if the queue is not empty, control returns to step 1486 where the master device sets RUTS and the master device calls the slave device's ResponseUsed function in step 1486.

The following code example shows a simple implementation of an AXI slave that can process write transactions as shown in the flowchart of FIG. 14.

```
/*
** This function is called by the SBPE when it has decoded a write transaction for
** the slave.
*/
    void _slavetimedwriteaccess(void *VoidIP, tAmpiStdBusTransaction *pBusCommand)
    {
    tInstanceData *IP = (tInstanceData*)VoidIP;
/*
    ** Only process one transaction at a time.
*/
    if (IP->Processingtransaction)
    {
/*
    ** Queue this transaction.
*/
        IP->QueuedWriteTransaction = pBusCommand; return;
    }
    IP->Processingtransaction = TRUE;
/*
    ** Update SlaveData pointer
*/
    pBusCommand->pSlaveData = IP;
/*
    ** Set DataAvailable and ResponseUsed callbacks.
*/
    pBusCommand->pBusTransDataAvailable = AxiWriteSlaveDataAvailable;
    pBusCommand->pBusTransResponseUsed = AxiWriteSlaveResponseUsed;
/*
    ** call CommandUsed function.
*/
        pBusCommand->CommandUsedTickStamp = pBusCommand
            >CommandAvailableTickStamp + CommandDelay;
    pBusCommand->pBusTransCommandUsed(pBusCommand);
/*
    ** Process any data available.
```

```
*/
   pBusCommand->DataUsedLength = 0;
if (pBusCommand->DataAvailableLength > 0) AxiWriteSlaveDataAvailable
     (pBusCommand);
}
/*
 ** This function is called by the master when new write data is available.
 */
   void AxiWriteSlaveDataAvailable(tAmpiStdBusTransaction *pBusCommand)
{
   tInstanceData *IP = (tInstanceData*)pBusCommand->pSlaveData;
tWord32   Index;
tWord32 NumBeats;
/*
 ** Store data.
 */
   NumBeats = Copywritedata(IP, pBusCommand);
/*
 ** Update DataUsed length and tick stamp, then call master's DataUsed callback.
 */
pBusCommand->DataUsedLength = pBusCommand->DataAvailableLength;
pBusCommand->DataUsedTickStamp = pBusCommand->DataAvailableTickStamp +IP-
     >timing.write *NumBeats;
pBusCommand->pBusTransDataUsed(pBusCommand);
/*
 ** Check if transaction has finished.
 */
   if (pBusCommand->DataUsedLength == pBusCommand->Length)
{
/*
 ** Issue response to master.
 */
   pBusCommand->Status = StdBus2StatusOkay;
pBusCommand->ResponseAvailableTickStamp =pBusCommand->DataUsedTickStamp;
pBusCommand->pBusTransResponseAvailable(pBusCommand);
}
}
/*
 ** This function is called by the master after it has read the slave write response.
 */
   void AxiWriteSlaveResponseUsed(tAmpiStdBusTransaction *pBusCommand)
{
   tInstanceData *IP = (tInstanceDate*)pBusCommand->pSlaveData;
/*
 ** transaction has finished.
 */
IP->Processingtransaction = FALSE; ProcessQueuedTransaction(IP);
}
```

3.15 Byte Enables

According to an embodiment, the StdBus AXI protocol is settable to optionally support byte enables on write transactions. In accordance with an embodiment of the invention, the Byte Enable array is set up by masters and used by slaves to indicate which bytes of a write transfer are to take place. A value of NULL indicates that the entire write transfer is to take place. When not NULL, in an embodiment, pTransByteEnables must point to an array of bytes of length Length. A value of 0xFF in a byte of the array is used to indicate that the respective byte is to be accessed. A value of 0x00 indicates that it is not accessed.

According to an embodiment of the present invention, the Byte Enable array must be the length of the entire transaction data, such that the DAL and DUL act as offsets (relative to CwfOffset) into both the Byte Enable array (if the pointer is not NULL) and the pSourceBuffer data array.

According to an embodiment, the array is intended to be used as a data mask when writing data as shown below:

```
tWord8 Mask = pBusCommand->pTransByteEnable[Index];
IP->MyData[Index] &= (~Mask);
IP->MyData[Index] |= (pBusCommand->pSourceBuffer[Index]& Mask)
```

3.16 Critical Word First Offset

According to an embodiment of the invention, the CwfQffset field in the transaction data structure indicates the index of the first beat to be processed in the transaction. Normally, for slave device accesses, caching is not enabled, so the CwfOffset field in the transaction is set to 0. For cached accesses, a VPM may set this field to a non-zero value to indicate that the first beat of a transaction is not the address of the actual transaction, but offset from the start of the transaction by CwfOffset beats. This is how a wrapping burst transaction is differentiated from an incrementing burst transaction. In this case, the first byte to be transferred is determined by CwfOffset*BeatSize. This field is only non-zero for wrapping AXI bursts, and is significant for slave devices when using DataAvailableLength and DataUsedLength as offsets into pSourceBuffer.

At any time, according to an embodiment, DataAvailableLength indicates the total number of bytes available in pSourceBuffer starting at CwfOffset. For example, if CwfOffset=1, BeatSize=2 and DataAvailableLength=6, the byte offsets 2, 3, 4, 5, 6 and 7 are available in pSourceBuffer, and other byte offsets are not available in this data payload.

In one embodiment, the Length field defines the total number of bytes to be transferred in this transaction, and hence the size of the data buffer pointed to by pSourceBuffer. It is important therefore to wrap offsets into pSourceBuffer to avoid accessing beyond the end of the buffer. For example, if CwfOffset=7, BeatSize=1, Length=16 and DataAvailableLength=12, the byte offsets 7, 8, 9, 10, 11, 12, 13, 14, 15, 0, 1 and 2 are available in the buffer.

DataUsedLength indicates the number of bytes already processed, and is also indexed relative to CwfOffset.

Figure 15:
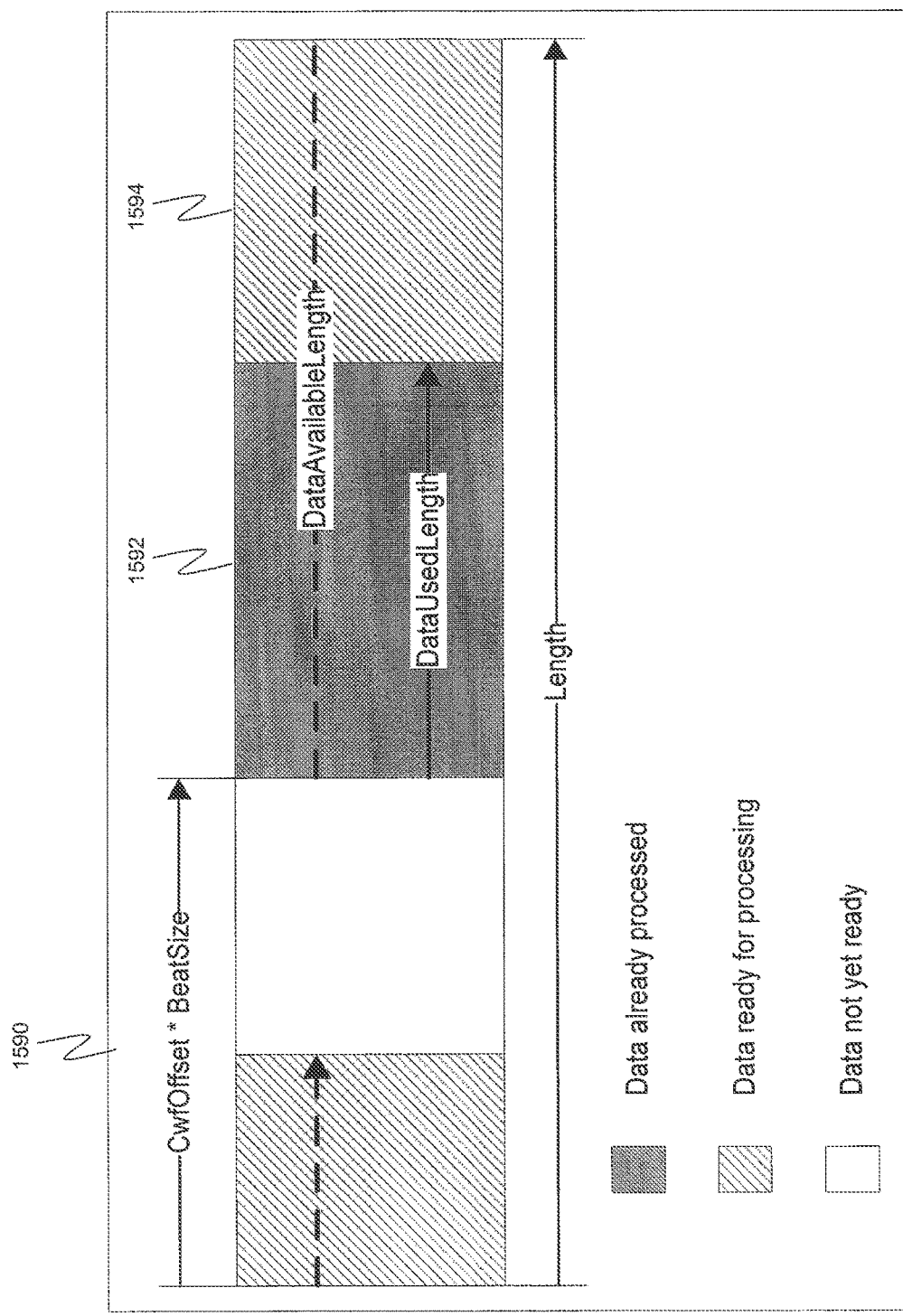
FIG. 15 shows each of the transaction data structure fields with respect to the pSourceBuffer data buffer according to an embodiment of the present invention.

FIG. 15 shows, in accordance with an embodiment, each of the transaction data structure fields with respect to the pSourceBuffer data buffer 1500. Data already processed 1592 and data ready for processing 1594 are part of data buffer 1500.

The following is an example of code that, in the example infrastructure described herein, is arranged for copying data from pSourceBuffer that makes use of CwfOffset 1590 depicted in FIG. 15.

```
tWord32 Offset;
tWord32 Count = pBusTransaction->DataAvailableLength − pBusTransaction-
>DataUsedLength;
tWord32 Start = (pBusTransaction->CwfOffset*BeatSize) + pBusTransaction-
>DataUsedLength; for (Offset = 0; Offset < Count; Offset++)
{
  /*
  ** Determine wrapped byte index, then copy data.
  */
  tWord32 Index = (Start + Offset) % pBusTransaction->Length;
  DestBuffer[Index]= pBusTransaction->pSourceBuffer[Index];
}
```

As wrapping burst accesses are typically only generated by VPMs performing cached read or fetch accesses, the StdBus AXI protocol does not support unaligned wrapping burst accesses. If the CwfOffset field 1590 depicted in FIG. 15 is non-zero, then the transaction address must be aligned to the beat size.

3.18 Exclusive Accesses

In accordance with an embodiment of the present invention, the StdBus AXI protocol supports exclusive read and write operations through use of the BusCycleAttributes field in the transaction data structure. According to an embodiment of the invention, slaves can check for an exclusive access using the following example code:

```
if (pBusTransaction->BusCycleAttributes & CycleExclusiveAttributeMask)
{
/* Exclusive access */
}
else
{
  /* Normal access */
}
```

In an embodiment, if the exclusive read or write is successful, the slave sets Status in the transaction data structure to StdBus2StatusExOkay. If the exclusive Transfer fails, the slave returns a Status of StdBus2StatusOkay.

If the slave device does not support exclusive accesses, exclusive write transactions always update the device location, however, both exclusive reads and writes will return with Status StdBus2StatusOkay. This indicates to the master that the exclusive transfer failed.

3.19 Locked Accesses

In accordance with an embodiment of the invention applicable to the AXI protocol, locked transfers require that no other master is allowed to access the locked slave region until an unlocked transfer from the same master completes.

According to an embodiment, device models with a single slave port (one read, one write) do not require any additional processing for locked transfers (other than to pass on the locked attribute if acting as a bridge)—it is up to the connected master device to ensure that the locked slave region is respected.

In accordance with an embodiment, for device models with multiple slave bus ports (e.g., multi-port bridge or interconnect devices), the device itself must ensure that the locked slave region or downstream master read/write bus ports are not allocated to any other slave until the locked access has completed. This is achieved in one embodiment by buffering other transactions inside the device until the locked access has completed (by delaying the call to pTransCommandUsed).

Some VPM embodiments may issue locked reads and locked writes on the same bus port (e.g., the read port) when connected to a StdBus protocol net for a traditional (non-AXI) bus.

Unaligned Transfers

In accordance with an embodiment of the invention, the StdBus AXI protocol requires that each data payload is aligned to the start or end bytes of the transaction, or a beat boundary in-between. For example, if an AXI slave receives a transaction on an 8-byte bus, a burst write of 9 beats, where the size is 4 bytes, the start address is an odd (8 n+1) Address, and the Length is 32, then, DataAvailableLength, and DataUsedLength can only take the values of 0, 3, 7, 11, 15, 19, 23, 27, 31 or 32.

In such an embodiment, the transaction can still be modeled as a single data payload, or, broken into sets of individual beats, so long as the DAL and DUL use the above values, that is, they are beat-aligned.

AXI Transaction Timing

In accordance with an embodiment of the present invention, the basis of timing within a transaction is fully described in terms of what is referred to herein as TickStamps. These TickStamps are contained within the transaction data structure passed to the slave device in the pre-registered bus access function. TickStamps may be of type tInt32, NOT tWord64 or tWord32, and their value is always relative to the clock that is driving the StdBus connection. On their own, TickStamps are meaningless, however, in accordance with an embodiment, when the "now" TickStamp of the StdBus connection is subtracted from a TickStamp, the resultant tInt32 value represents the number of clock cycles by which the respective event is ahead or behind the current clock edge. According to an embodiment of the present invention, all TickStamps therefore must be changed and/or measured, relative to the TickStamps within the transaction.

In accordance with an embodiment, the first TickStamp visible to the slave device is the CommandAvailableTickStamp, which is set by the master prior to issuing the transaction. This indicates the start of the address/control phase of the transfer. It is up to the slave to determine when it can process the transaction, and set CommandUsedTickStamp accordingly.

According to an embodiment of the present invention, for read transactions, the slave determines the time required to deliver the read data based on the burst length, beat size, bus width etc. This value is set in DataAvailableTickStamp, and passed to the master via the pBusTransDataAvailable callback function. It is up to the slave how much data to pass each time pBusTransDataAvailable is invoked. However, the master's timing in invoking pBusTransData Used must allow for at least the number of beats in the data payload. For example, a master receiving a data payload cannot process more than a single bus width of data in one clock cycle.

In accordance with an embodiment of the present invention, for write transactions, the start of each data phase is determined by the master, who is responsible for setting DataAvailableTickStamp. The slave then determines the time required to process DataAvailableLength bytes (using the beat size, bus width etc) and sets DataUsedTickStamp as required. The slave's timing in invoking pBusTransDataUsed must allow for at least the number of beats in the data payload. For example, a slave receiving a data payload cannot process more than a single bus width of data in one clock cycle. When all data has been transferred, the slave sets ResponseAvailableTickStamp to indicate to the master the clock edge at which the slave response is asserted.

By interrogating the TickStamp values, in an embodiment, the slave device can establish when in time it is being called and knows when data is available in the case of a write. By manipulating the TickStamp values, it is able to report when data has been made available in the case of a read operation.

In one embodiment, TickStamp values should never be compared to other TickStamp values. Instead, they should be subtracted from each other and compared to 0. They have been specifically typed as tInt32 to permit the difference to produce a positive or negative result relative to the current 64 bit clock count, whilst only using 32 bit arithmetic.

Synchronization

When using one embodiment for modeling a slave device, there may be times that the read or write operation will have to be synchronized with an event which has to occur before valid data can be written or read. The following example is a situation which may occur in a modeling scenario using an embodiment of the present invention:

A master device decides to read data from a slave device register. The slave device can only provide this data if another hardware function within the device has completed. For example, in order to read an I/O pin the data has to be returned to the master with the current value which is valid at the end of the transaction time. As the slave device is ahead of time in terms of the transaction, it must schedule a callback to itself to bring the simulation time to a valid point where the I/O pin can be sampled. If this is the case, the slave device has the responsibility to update the NowTickStamp field within the transaction structure when the callback to itself returns, remembering that whenever control is passed from one subsystem to another, the NowTickStamp must be updated to reflect the current time in bus ticks. Time has then effectively moved on to a point where the I/O pin can be read.

In an embodiment, synchronization can only be performed to a point in time ahead of the NowTickStamp within the transaction structure, since time cannot go backwards. Under all circumstances, when a transaction is first passed to a slave device, the CommandAvailableTickStamp (CATS), which marks the beginning of the command/address phase, will be at or ahead of the NowTickStamp (NTS) time. If these tick stamps are not equal, that is, the transaction is ahead of current time, then, the difference (CATS-NTS) is greater than zero and indicates the number of clock ticks ahead of current time. The slave device model may want to schedule a callback to the beginning or end of the command, or, the first data phase of the transaction. This ensures that the data read or written by the slave is done at the appropriate time within the data phase of the transaction.

Data Handling

In another embodiment, data which is passed to a slave device (write) and data which is presented to a master device (read) can be handled via buffers.

For a write transaction, in an embodiment, the master merely provides a pointer (pSourceBuffer) to the data to be transferred. This may be a pointer to 8-bit data, and is stored in the bus transaction data structure. It points to the first (or only, in the case of a single byte transfer) byte in the transaction. It is the Length variable in the bus transaction data structure which informs the slave device of the (total) size of the data buffer required for the transfer.

The DataUsedLength field gives the current offset into pSourceBuffer, and the number of bytes available is given by DataAvailableLength-DataUsedLength. For a write transaction, the slave device can extract the data from the buffer pointed to by pSourceBuffer and store the variable if required or take action on that data as appropriate. The data must be used prior to invoking pBusTransDataUsed.

According to an embodiment of the invention, for a read transaction a data buffer is usually either declared in the instance structure of the slave, or, allocated on the stack of the slave callback function which is to perform the read access and invoke the master's pBusTransDataAvailable callback. Unless all of the data is made available to the master in a single call to pBusTransDataAvailable, it is recommended that the slave declare the data buffer in its instance structure. As it is a read transaction, according to an embodiment, it is the responsibility of the slave device to provide the pointer to the data it is about to return, therefore the pSourceBuffer variable must be updated to reflect this. The alignment of the buffer in physical memory must match the 32-bit alignment of the accessed transaction data.

For example, if the access is of Length 32 bytes and aligned to a 32 bit address, then it would be incorrect to provide a buffer pointer with an address which is not 32-bit aligned (see Buffered data Handling Alignment below).

When the slave device has processed a block of data, according to an embodiment, it must indicate to the master how much data has been processed. This is reflected in the DataAvailableLength variable for reads, or the DataUsedLength for writes, of the bus transaction data structure.

```
pBusCommand->DataAvailableLength += BytesProcessed; // read
pBusCommand->DataUsedLength = // write pBusCommand-> Data
AvailableLength;
   //write
```

Buffered Data Handling Alignment

In most cases, when designing a slave interface using an embodiment of the present invention, it is necessary to buffer data in the interface itself. Since, in an embodiment, for performance reasons, the data itself is not passed back and forth in a bus transaction it is only a pointer to the data which is passed. Because of this, a static read buffer can be set up for the slave interface which can then be used to pass the pointer back along the transaction structure. Since in one embodiment this buffer is a tWord8 pointer the storage element should type-cast to this variable type. Even though this is a tWord8 pointer, care should be taken to ensure that this buffer is aligned on an n-byte boundary (where n is the data size of the storage element). If the data buffer is an array of bytes, the following code describes one example approach that can be taken. Of course, this may not be necessary in a different implementation.

```
struct sInstanceData
{
tWord32    BufferToBeusedForBustransactions[8];
};
```

When the assignment is made for a read, the pSourceBuffer is type cast to the array as such.

```
pBusTransaction.fwdarw.pSourceBuffer=(tWord8*)&IP ->
BufferToBeusedForBustransactions[0];
```

This means that the pSourceBuffer will inherit the alignment of 4 bytes as set by the tWord32 declaration.

Partial/Complete Callbacks

Unlike for simulating transaction for other bus protocols (e.g., non-AXI protocols such as traditional AMBA bus, AHB, AHB_Lite, etc), according to an embodiment, StdBus AXI slave devices do not call the master's partial or complete callback functions.

Slave Device Aborts

In an embodiment, the StdBus AXI protocol does not allow either the master or the slave to abort a transaction. All beats in the transfer must occur, even if the data is ignored (for example, if there is an error in the slave).

3.17 Untimed Transactions

In one embodiment, to support access to a debugger of a target processor being simulated, slave devices register callback functions for untimed read and write transactions. In the implementation described herein, untimed transactions are protocol independent—they do not use the AXI available/ready handshaking mechanism, nor do they use the partial/complete callbacks like for simulating other, e.g., conventional non-AXI bus protocols.

The following code example implements a slave that can process untimed read and write transactions using the infrastructure described herein and according to one embodiment. In the example, this slave contains a number of 4-byte registers, so untimed transactions that are not aligned to a 4-byte boundary, or that exceed 4 bytes, are broken up into multiple register accesses as required.

```
void _slaveuntimedreadaccess(void *VoidIP,
     tAmpiStdBusTransaction*pBusCommand)
}
   tInstanceData *IP = (tInstanceData *)VoidIP;
tWord64      Address;
tWord8       *pData;
tWord32      Length;
tWord32      Offset;
tWord32      ByteNum;
tWord32      Index;
tWord32      Reg Data;
/*
** Initialize the done length.
*/
   pBusCommand->DoneLength = 0;
/*
** Set up the bus source data buffer, using a buffer set up in the
** instance data structure. This assumes a maximum of 4 byte reads.
*/
   pBusCommand->pSourceBuffer = (tWord8 *)&IP->ReturnData;
/*
** Check the read length. Currently, only support up to 4-byte reads.
*/
   if (pBusCommand->Length > 4)
}
   AmpiStreamPrintf(ERROR_MSG, "Untimed read access greater than
   4 bytes\n");
       IP->ReturnData = 0;
return;
}
/*
** Sets up the local variables.
*/
Address = pBusCommand->Address;
Length = pBusCommand->Length;
pData = pBusCommand->pSourceBuffer;
/*
** Calculate the 4-byte aligned offset address of the register.
*/
   Offset = ((tWord32) (Address - IP->StartAddress)) & ~(sizeof
   (tWord32) - 1);
/*
** Calculate the byte number required.
*/
   ByteNum = ((tWord32) (Address - IP->StartAddress)) - Offset;
/*
** Check if there are any leading bytes that are not aligned to a 4-byte
** boundary to read. This will fall into part of a register.
*/
   if (ByteNum)
{
  RegData = _readregister32(IP, Address);
for (Index = ByteNum; Index < sizeof(tWord32) && Length > 0;
Index++)
{
   *pData++ = ((tWord8 *)&RegData)[Index];
--Length;
++Address;
}
}
/*
** Address is now aligned to a 4-byte boundary.
** read the remaining bytes.
*/
   if (Length > 0)
{
   RegData = _readregister32(IP, Address); for (Index = 0; Index <
   Length; Index++)
{
   *pData++ = ((tWord8 *)&RegData)[Index];
}
}
   pBusCommand->DoneLength = pBusCommand->Length;
}
   void_slaveuntimedwriteaccess(void *VoidIP, tAmpiStdBus
   Transaction
      *pBusCommand)
```

```
{
  tInstanceData *IP = (tInstanceData *)VoidIP;
  tWord32    CurrentData;
  tWord32    Offset;
  tWord32    ByteNum;
  tWord32    Index;

tWord64    CurrentAddress;
  tWord64    Address;
  tWord32    Length;
  tWord8     *pData;
  /*
  ** Prepare details for the write to the register.
  */
  Address =pBusCommand->Address;
  Length = pBusCommand->Length;
  pData = pBusCommand->pSourceBuffer;
  /*
  ** Calculate the 4-byte aligned offset address of the register.
  */
  Offset = ((tWord32) (Address - IP->StartAddress)) & ~(sizeof
    (tWord32) - 1);
  /*
  ** Calculate the byte number required.
  */
  ByteNum = ((tWord32) (Address - IP->StartAddress)) - Offset;
  /*
  ** Check if there are any leading bytes that are not aligned to a 4-byte
  ** boundary to write. This will fall into part of a register.
  */
  if (ByteNum)
  {
    CurrentAddress = Address;
    CurrentData = _readregister32(IP, CurrentAddress);
    for (Index = ByteNum; Index < sizeof(tWord32) && Length > 0;
    Index ++)
    {
      ((tWord8 *)&CurrentData)[Index] = *pData++;
      --Length;
      ++Address;
    }
    _writeregister32(IP, CurrentAddress, CurrentData);
  }
  /*
  ** Address is now aligned to a 4-byte boundary.
  ** Now write all the 4-byte aligned values in 4-byte chunks.
  */
  while (Length >= sizeof(tWord32))
  {
    _writeregister32(IP, Address, *((tWord32 *) pData)++);
    Address += sizeof(tWord32);
    Length -= sizeof(tWord32);
  }
  /*
  ** Deal with any trailing bytes that are less than 4 bytes long.
  ** This will fall into part of a register.
  */
  if (Length)
  {
    CurrentAddress= Address;
    CurrentData = _readregister32(IP, CurrentAddress);
    for (Index = 0; Index < sizeof(tWord32) && Length > 0; Index ++)
    {
      ((tWord8 *)&CurrentData)[Index] = *pData++;
      --Length;
    }
    _writeregister32(IP, CurrentAddress, CurrentData);
  }
  /*
  ** Set the done length to the specified length.
  */
  pBusCommand->DoneLength = pBusCommand->Length;
}
```

Responsibilities of the Slave Device

In one embodiment, any slave device model connected to the StdBus the model has certain mandatory responsibilities in connecting to, and carrying out the bus transactions. Of course these are implementation dependent, and these mandatory responsibilities apply to the embodiments described herein. The following is a list of the exemplary slave responsibilities discussed in this section.

Initialization:

Declare handles to the bus connection ports

Provide timing parameters for transactions

Store the handles to the bus connection ports

Register the connection type to the SBPE

Register callbacks for each type of transaction (read, write, fetch etc), both timed and untimed, to be handled by the slave.

Register the decoder Range of the device.

Timed Transaction Processing

Update CommandUsedTickStamp and call the master's pBusTransCommandUsed function only once the slave is capable of receiving another transaction.

Update the pBusTransDataAvailable, pBusTransDataUsed, and pBusTransResponseUsed function callback pointers as required by the transaction direction (read/fetch or write).

For reads, update DataAvailableLength, DataAvailableTickStamp and call the master's pBusTransDataAvailable function to pass data back to the master.

For writes, update DataUsedLength, DataUsedTickStamp and call the master's pBusTransDataUsed function.

Update NowTickStamp prior to each time control is passed back to the master.

For writes, update ResponseAvailableTickStamp and call the master's pBusTransResponseAvailable function when the transaction is complete.

Untimed Transaction Processing (for Debugger Support)

Provide access for all Lengths of transactions available from the target Code debugger. Update DoneLength to reflect how much data was processed.

4.0 StdBus AXI Master Device Modeling

This section describes how, with one embodiment of the invention, one can create a bus interface on a master device model. Described herein are the steps from initialization through to the API function registration and the callback mechanisms involved.

Figure 16:
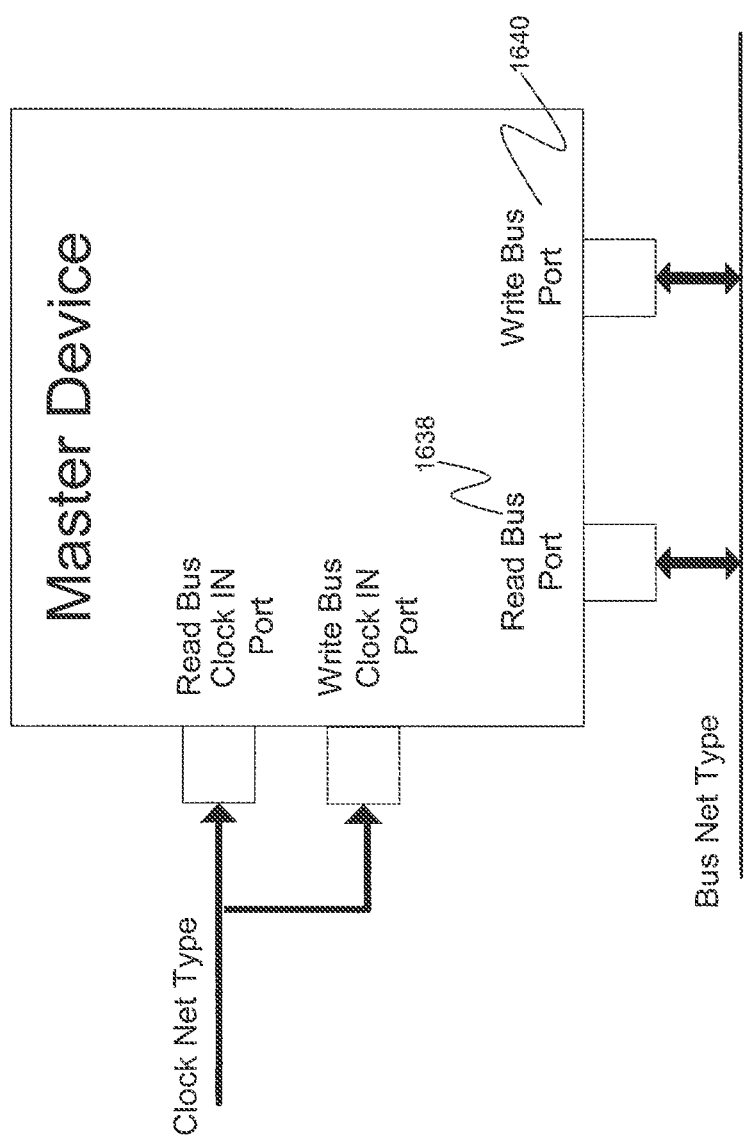
FIG. 16 depicts a master device representation showing the architecture modeling API port connections used to achieve communications with the StdBus AXI protocol engine, according to an embodiment of the present invention.

FIG. 16 shows a typical master device representation 1600 showing the architecture modeling API port connections 1638 and 1640 used to achieve communications with the StdBus AXI protocol engine embodiment described herein.

4.1 Master Device Bus Interface

Figure 17:
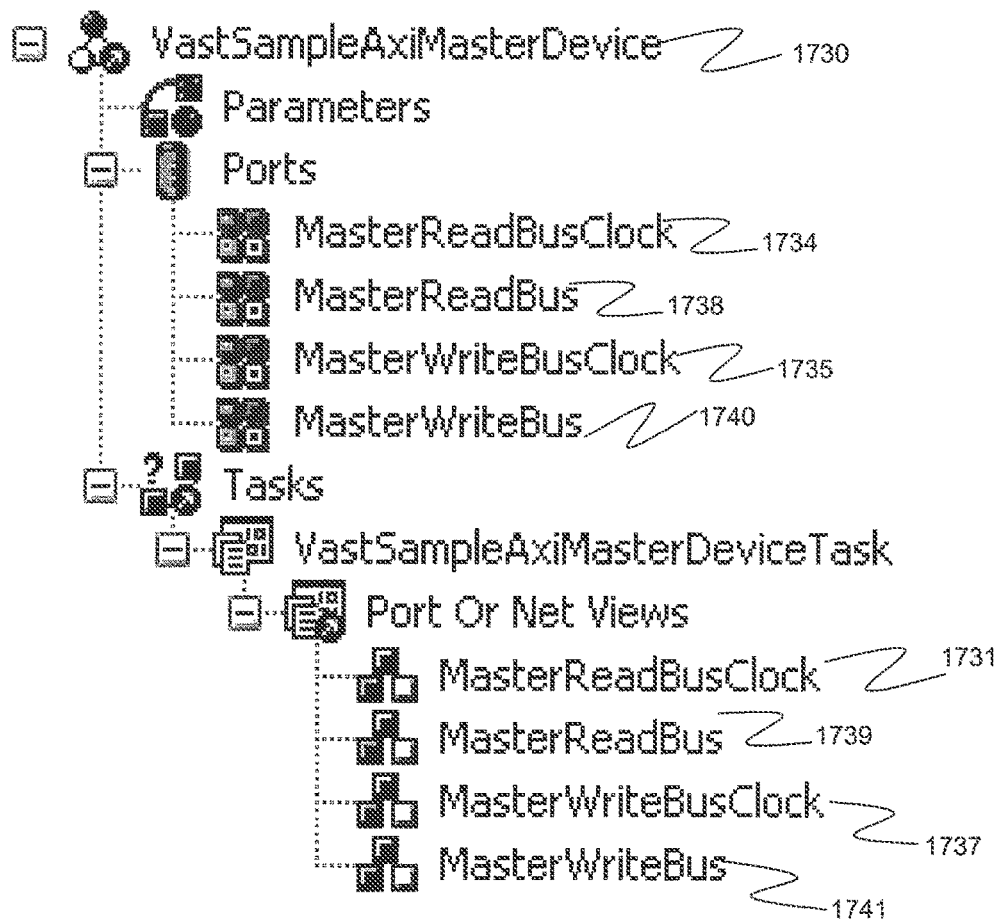
FIG. 17 shows a master device bus interface in the form of a high level view of the connections available to other modules as seen in the COMET System Engineering Environment (SEE) framework, according to an embodiment of the present invention.

FIG. 17 shows a master device bus interface in the form of a high level view 1700 of the connections available to other modules as seen in the COMET System Engineering Environment (SEE) framework used in the examples herein. FIG. 17 shows connections and properties of an example master device 1730. This is for demonstration purposes only.

The following list describes elements included in master device 1730 and depicted in FIG. 17. The list below and elements depicted in FIG. 17 are not comprehensive. Furthermore, not all master devices such as master device 1730 need to have all elements depicted in FIG. 17 and listed below.

Ports:

MasterReadBusclock 1734: user-defined name of the input used for the master read bus clock signal.

MasterReadBus 1738: user-defined name of the master read bus connection to the StdBus net type signal.

MasterWriteBusClock 1735: user-defined name of the input used for the master write bus clock signal.

MasterWriteBus 1740: user-defined name of the master write bus connection to the StdBus net type signal.

Tasks:

MasterReadBusclock 1731: Declaration of the slave view on the read bus clock net input port. MasterReadBus 1739: Declaration of the master view on the read bus StdBus net port.

MasterWriteBusClock 1737: Declaration of the slave view on the write bus clock net input port. MasterWriteBus 1741: Declaration of the master view on the write bus StdBus net port.

4.2 Master Device Instance Structure

As part of the module modeling methodology used in the example embodiments described herein, a model has an instance structure associated with it. This instance structure represents a view of the device and data storage elements. In one embodiment, it is in this instance structure, that handles are created and stored for each of the architecture modeling API ports on the module interface. An example of this is shown below.

tion data structure. These are owned by the master device instance and are used to initiate transactions through their issue to the StdBus protocol engine. In the above coded example, two transaction structures are defined—one is used for read transactions and the other is used for write transactions.

4.3 Initialization

As has been stated in the previous section, in an embodiment, initialization of the model is in essence where the connection is made between the user-defined software handle and the user-defined architecture modeling API port names that represent the hardware connections. According to an embodiment of the invention, the initialization of the module task is defined in the model function: <modelname>InitTaskInstance. The following example shows how the handles can connect to the hardware variable name.

```
IP->pMasterReadBusclock = AmpiClockInitSlavePortView("MasterReadBusclock",
    "All");
IP->pMasterWriteBusClock = AmpiClockInitSlavePortView("MasterWriteBusClock",
    "All");
IP->pMasterReadBus = AmpiStdBusInitMasterPortView("MasterReadBus", "All");
IP->pMasterWriteBus = AmpiStdBusInitMasterPortView("MasterWriteBus", "All");
```

The first two lines use the architecture modeling API function, AmpiClockInitSlavePortView, to define the clock as an input to the master device for the read and write buses. The actual name of the hardware architecture modeling API port defined in the model structure is used to reference the handle in the instance structure. The third and fourth lines use the architecture modeling API function, AmpiStdBusInitMasterPortView, to define the read and write buses as master connections to the master device and the actual name of the hardware architecture modeling API port defined in the model structure is used to reference the handle which is then stored in the instance structure. Only some architecture modeling API functions are described herein.

4.4 Registration of StdBus Master Connection

In one embodiment, in order to connect to a StdBus, information is gathered about the bus connections available.

```
/*
** instance data structure
*/
struct sInstanceData
{
....
....
tWord32                              MasterReadBusDataWidth:
  tWord32                            MasterWriteBusDataWidth:
  tWord32                            MasterReadBusAddressBits:
  tWord32                            MasterWriteBusAddressBits:
  const tAmpiClockHandleSlave        *pMasterReadBusclock:
  const tAmpiStdBusHandleMaster      *pMasterReadBus:
  const tAmpiClockHandleSlave        *pMasterWriteBusClock:
  const tAmpiStdBusHandleMaster      *pMasterWriteBus:
  tAmpiStdBusTransaction             ReadTransaction:
      tAmpiStdBusTransaction         WriteTransaction:
  tWord8                             DataBuffer[MAX_BURST_LENGTH]:
    tVastSampleAxiMasterDeviceParameters Config:
}:
```

In an embodiment, the handles created and stored in the instance structure are then used in the model as references to the bus connections.

In one embodiment, this instance structure also provides access to or contains at least two copies of the bus transac- When connected in a platform, it is possible, for example, to establish the address and data widths of the master port StdBus connections using the following example architecture modeling API function calls.

```
IP->MasterReadBusDataWidth =AmpiStd BusMasterGetDataWidth(IP-
    >pMasterReadBus) / 8;
IP->MasterWriteBusDataWidth = AmpiStdBusMasterGetDataWidth(IP-
    >pMasterWriteBus) / 8;
IP->MasterReadBusAddressBits= AmpiStdBusMasterGetAddressWidth(IP-
    >pMasterReadBus);
IP->MasterWriteBusAddressBits = AmpiStdBusMasterGetAddressWidth(IP-
    >pMasterWriteBus);
```

In another embodiment, this can be used by the model to establish valid connection parameters or to calculate timing for multiple data phase transactions. In the case of the example above, the function will return the bit width of the data portion of the buses and the user parameters MasterReadBusDataWidth and MasterWriteBusDataWidth will store the data width of the buses in bytes, and MasterReadBusAddressBits and MasterWriteBusAddressBits will store the address width of the buses in bits.

According to an embodiment, the AXI master connects to the bus using the correct type (read or write) and data width. The following code demonstrates the use of the AmpiStdBusMasterSetConnectType architecture modeling API function call to connect the read and write buses.

```
AmpiStdBusMasterSetConnectType(pMasterReadBus, AxireadD32V1connecttype);
AmpiStdBusMasterSetConnectType(pMasterWriteBus, AxiwriteD32V1connecttype);
```

This example assumes that the bus data width is set to 4 bytes. For master devices that can connect to a number of different bus widths and protocols, code similar to that used in the slave as described in Section 3 can be used. Of course, other code also could be used, as would be clear to those in the art.

4.5 Timed Master Transaction Handling

As described above, in an embodiment, the transaction data structure used to represent a StdBus AXI read or write operation is "owned" by the master device. The master is responsible for initializing the transaction data structure prior to issuing it on the appropriate bus port.

According to an embodiment of the invention, some elements of the transaction data structure are not normally changed throughout the life of a master device, and may be initialized once the StdBus connection has been made. The following example demonstrates one version of initialization of the master owned read and write transaction structures. All other fields are initialized to 0, or NULL, by the use of the calloc function to create the transaction record as a part of the instance data. Additional fields are set prior to issuing the transaction on the bus.

For details on each of the fields being set below, see section 6 below, titled "DETAILS OF ELEMENTS OF THE STDBUS TRANSACTION DATA STRUCTURE."

```
/*
** Initialize read transaction structure.
*/
IP->ReadTransaction.pMasterData = (void *)IP;
IP->ReadTransaction.TransProtocol = AxiProtocol;
IP->ReadTransaction.pNetMasterHandle = IP->pMasterReadBus;
IP->ReadTransaction.pBusClock = IP->pMasterReadBusclock;
IP->ReadTransaction.InterfaceVersion = StdBusInterfaceV2v0;
IP->ReadTransaction.StructureVersion = CompiledWithStdBusInterfaceVersion;
IP->ReadTransaction.MasterEndianness = MasterEndianDefault;
IP->ReadTransaction.Command = readOp;
IP->ReadTransaction.Decoder = readdecode;
/*
** Initialize write transaction structure.
*/
IP->WriteTransaction.pMasterData = (void *)IP;
IP->WriteTransaction.TransProtocol = AxiProtocol;
```

```
IP->WriteTransaction.pNetMasterHandle = IP->pMasterWriteBus;
IP->WriteTransaction.pBusClock = IP->pMasterWriteBusClock;
IP->WriteTransaction.InterfaceVersion = StdBusInterfaceV2v0;
IP->WriteTransaction.StructureVersion= CompiledWithStdBusInterfaceVersion;
IP->WriteTransaction.MasterEndianness = MasterEndianDefault;
IP->WriteTransaction.Command = writeOp;
IP->WriteTransaction.Decoder = writedecode;
```

The above example assumes that the master device is connected to an instance of StdBus set to AXI protocol (TransProtocol=AxiProtocol;). Master devices that can connect to different protocol StdBus nets are responsible for setting the appropriate value of TransProtocol.

The following sections describe how in some embodiments of the invention, an AXI master device issues and processes a timed AXI read or write transaction.

Master Read Access

The following section describes the steps involved for an AXI master to issue and process a timed AXI read transaction, according to one embodiment of the invention.

First, the master initializes the transaction data structure, in particular, setting the Address, Length, DataUsedLength and Command32 fields as well as the pBusTransCommandUsed and pBusTransDataAvailable callbacks.

Next, the master sets CommandAvailableTickStamp, CommandUsedTickStamp, and NowTickStamp, and then issues the transaction on the appropriate master bus port.

Then, the SBPE routes the transaction to the appropriate slave port, and calls the slave's registered decode function.

The slave then updates CommandUsedTickStamp and calls the master's pBusTransCommandUsed function. The master is now free to issue another transaction of this type on the bus.

The slave then sets its pBusTransDataUsed callback function and determines how many bytes to provide in each data payload and for each, sets DataAvailableLength, DataAvailableTickStamp and calls the master's DataAvailable function.

For each data payload provided by the slave, the master processes the data, updates DataUsedLength, DataUsedTickStamp and calls the slave's DataUsed function. The master is also responsible for collecting and processing each of the Status responses set by the slave for each data payload.

For read transactions, according to an embodiment, the slave determines how many beats to provide in each data payload (i.e. in each call to the master's data available function). For write transactions, according to an embodiment, it is the master that determines the number of beats in each data payload.

The following code shows a simple example implementation of a master device that issues 16 byte, 32-bit aligned, non-wrapping, AXI burst read transactions on to a 4 byte wide AXI bus.

```
void Issue16ByteReadTransaction(tWord64 Address)
{
tInt32 NowBusTickStamp;
/*
** Set up the read transaction.
*/
IP->ReadTransaction.Length = 16;
IP->ReadTransaction.Address = Address & {circumflex over ( )}0x07;
IP->ReadTransaction.DataUsedLength = 0;
IP->ReadTransaction.Command = readOp;
IP->ReadTransaction.SubCommand =
            (AxiBurstIncrOrWrap <<AxiSubCommandBurstTypeOffset) |
            (AxiSize32Bits << AxiSubCommandSizeOffset) |
            (AxiBurstLength4 << AxiSubCommandBurstLengthOffset);
IP->ReadTransaction.CwfOffset = 0;
IP->ReadTransaction.Decoder = readdecode;
IP->ReadTransaction.pBusTransCommandUsed = AxiMasterReadBusCommandUsed;
IP->ReadTransaction.pBuspTransDataAvailable = AxiMasterReadBusDataAvailable;
/*
** Set tick stamps.
*/
NowBusTickStamp = AmpiClockGetNowTickStamp(IP->pMasterReadBusclock);
IP->ReadTransaction.NowTickStamp = NowBusTickStamp;
IP->ReadTransaction.CommandAvailableTickStamp = NowBusTickStamp;
IP->ReadTransaction.CommandUsedTickStamp =
            IP->ReadTransaction.CommandAvailableTickStamp;
/*
** Issue the read transaction on the bus.
*/
AmpiStdBusRequest(IP->pMasterReadBus, &IP->ReadTransaction);
}
```

The initialization of the transaction data structure in the above example is for a 4 beat, 4 bytes per beat incrementing address read transfer. Wrapping transfers have non-zero values of CwfOffset and are not generated by this example embodiment.

The master is also responsible for setting the pBusTransCommandUsed and pBuspTransDataAvailable callbacks. These will be called by the slave to accept the command, and provide data payloads, respectively.

CommandUsedTickStamp is set to CommandAvailableTickStamp to indicate that the command has not yet been accepted by the slave. This example issues the bus transaction at the current bus time. Transactions can also be issued at future times (by setting both tick stamps to NowTickStamp+TicksInFuture).

The following code example shows how a command channel is freed so that another read transaction can be issued.

```
void AxiMasterReadBusCommandUsed(tAmpiStdBusTransaction*pBusCommand)
{
/*
** The command channel is now free, so another read transaction could be
** issued at this point, however the read transaction structure is still in use,
** so a second read transaction structure would have to be utilized.
*/
}
```

In this example, a simple master device does not perform any processing after the slave calls the CommandUsed function. However, a more complex device may issue further read transactions once the command channel has been freed. tWord32 GetNumBeatsInPayload (tAmpiStdBusTransaction*pBusCommand)

```
{
tWord32 AxiSize;
tWord32 TransferSize;
tWord32 NumBeats;
/*
** Determine the number of beats available in pSourceBuffer.
*/
AxiSize = ((tWord8) (pBusCommand->SubCommand & AxiSubCommandSizeMask))
    >> AxiSubCommandSizeOffset;
TransferSize = 1 << AxiSize;
Num Beats =(pBusCommand->DataAvailableLength - pBusCommand-
    >DataUsedLength) / TransferSize;
return NumBeats;
}
```

This utility function is used to retrieve the number of beats available for processing in the transaction buffer and has only been coded to deal with the aligned transfers which the preceding example master code is capable of generating. The number of beats is used to determine the correct DataUsedTickStamp value.

```
void AxiMasterReadBusDataAvailable(tAmpiStdBusTransaction*pBusCommand)
{
 tInstanceData *IP = (tInstanceData *) (pBusCommand->pMasterData);
   tWord32 NumBeats;
/*
** Check if received transaction is valid
*/
 if (&(IP->ReadTransaction) != pBusCommand)
 {
 AmpiStreamPrintf(ERROR_EXIT_MSG, "Invalid read transaction\n");
 }
/*
** Check whether there is data to read
*/
 NumBeats = GetNumBeatsInPayload(pBusCommand);
   if (NumBeats == 0)
 {
 AmpiStreamPrintf(WARNING_MSG, "read transaction - No data to read!\n");
return;
 }
/*
** Check read response.
*/
 if ((pBusCommand->Status != StdBus2StatusSlvErr) &&
      (pBusCommand->Status != StdBus2StatusDecErr))
 {
/*
** Copy the data to the transaction buffer
*/
while (pBusCommand>DataAvailableLength != pBusCommand-
>DataUsedLength)
 {
IP->DataBuffer[pBusCommand->DataUsedLength] = pBusCommand-
>pSourceBuffer[pBusCommand->DataUsedLength];
pBusCommand->DataUsedLength++;
 }
 }
 else
 {
/*
** slave error - ignore the data in the buffer.
*/
AmpiStreamPrintf(WARNING_MSG, "read transaction - slave Error!\n");
 pBusCommand->DataUsedLength = pBusCommand->DataAvailableLength;
 }
/*
** Set DataUsedTickStamp - note that DataUsed must not be called until the
master
** has finished processing the data.
*/
pBusCommand->DataUsedTickStamp =pBusCommand-
>DataAvailableTickStamp + 1*NumBeats;
/*
**call DataUsed. */ pBusCommand->pBusTransDataUsed(pBusCommand);
/*
** Check to see if the transaction is finished
*/
 if(pBusCommand->Length == pBusCommand->DataUsedLength)
 {
/*
** All data has been transferred - transaction is complete
** The read transaction structure can be marked free for re-use.
*/
 }
 }
```

In another embodiment, the DataAvailable callback function handles: 1) processing the data in the transaction buffer, 2) checking the read response returned by the slave; and 3) setting the DataUsedTickStamp value and signaling DataUsed. For this device, no additional master processing is required after the transaction has completed. If there were processing required, it should be performed before the DataUsed is signaled as it may cause a re-entry of the DataAvailable callback.

Master Write Access

The following outlines how in one embodiment an AXI master issues and processes a timed AXI write transaction:

Master initializes the transaction data structure, in particular, setting the Address, Length, and Command32 fields as well as the pBusTransCommandUsed pBusTransDataUsed and pBusTransResponseAvailable callbacks.

Master sets CommandAvailableTickStamp, CommandUsedTickStamp, NowTickStamp, DataAvailableLength, DataAvailableTickStamp, and sets DataUsedLength=0, then issues the transaction on the appropriate bus port. It is up to the master whether to make the first data payload available at this time (by setting DataAvailableLength and DataAvailableTickStamp). If the master provides the first data payload at this time (that is, DataAvailableLength is non-zero), it should not call pBusTransDataAvailable for this payload but it must later be invoked for any subsequent payloads. The pBusTransDataAvailable callback in the transaction is not valid until after the transaction has been issued to the slave port.

The SBPE routes the transaction to the appropriate slave port, and calls the slave's registered decode function.

The slave sets pBusTransDataAvailable and then either returns or sets the CommandUsedTickStamp and calls the master's CommandUsed function. If the slave returns then it must later update the transaction NowTickStamp, set the CommandUsedTickStamp and invoke the master's CommandUsed function. The master is now free to issue another transaction of this type on the bus.

The master reads the slave response, then sets ResponseUsedTickStamp and calls the slave's pBusTransResponseUsed function.

In accordance with the AXI protocol, in this embodiment, only one slave response is returned, and this response applies to the entire write transaction. There is no way for the master to determine at which point in a burst transaction that an error occurred.

The following code example shows a simple implementation of an AXI master that issues AXI write transactions.

```
void Issue32ByteWriteTransaction (tWord64 Address, tWord8 *pData)
{
  tInt32 NowBusTickStamp;
  /*
  ** Set up the write transaction.
  */
  IP->WriteTransaction.Length = 32;
  IP->WriteTransaction.Address = Address;
  IP->WriteTransaction.DataUsedLength = 0;
  IP->WriteTransaction.Command = writeOp;
  IP->WriteTransaction.SubCommand =
      (AxiBurstIncrOrWrap << AxiSubCommandBurstTypeOffset) |
      (AxiSize32Bits << AxiSubCommandSizeOffset) |
      (AxiBurstLength8 << AxiSubCommandBurstLengthOffset);
  IP->WriteTransaction.CwfOffset = 0;
  IP->WriteTransaction.Decoder = writedecode;
  IP->WriteTransaction.pBusTransCommandUsed = AxiMasterWriteBusCommandUsed;
  IP->WriteTransaction.pBusTransDataUsed = AxiMasterWriteBusDataUsed;
  IP->WriteTransaction.pBusTransResponseAvailable =
      AxiMasterWriteBusResponseAvailable;
  /*
  ** Set tick stamps.
  */
  NowBusTickStamp = AmpiClockGetNowTickStamp(IP->pMasterWriteBusClock);
  IP->WriteTransaction.NowTickStamp = NowBusTickStamp;
  IP->WriteTransaction.CommandAvailableTickStamp = NowBusTickStamp;
  IP->WriteTransaction.CommandUsedTickStamp =
      IP->WriteTransaction.CommandAvailableTickStamp;
  /*
  ** Make the first data payload available.
  */
  IP->WriteTransaction.pSourceBuffer = pData;
  IP->WriteTransaction.DataAvailableLength = 32;
  IP->WriteTransaction.DataAvailableTickStamp = NowBusTickStamp;
  /*
  ** Issue the write transaction on the bus.
  */
  AmpiStdBusRequest(IP->pMasterWriteBus, &IP->WriteTransaction);
}
```

If the master made the first data payload available (that is, DataAvailableLength is non-zero), the slave processes the data as below, otherwise, the slave waits for the master to call pBusTransDataAvailable.

For each data payload (other than the first, if the master made a payload available at the point of issuing the transaction), the master sets DataAvailableLength, DataAvailableTickStamp and calls the slave's DataAvailable function.

For each data payload provided by the master, the slave sets DataUsedTickStamp, sets DataUsedLength=DataAvailableLength, and if necessary, updates the NowTickStamp then calls the master's pBusTransDataUsed function.

When all of the data has been processed, the slave sets its pBusTransResponseUsed callback function and sets the Status field for the entire transaction, sets the ResponseAvailableTickStamp and if necessary, updates the NowTickStamp then calls the master's pBusTransResponseAvailable function.

The initialization of the transaction data structure in the above example is for an 8 beat, 4 bytes per beat incrementing address write transfer. Wrapping transfers have non-zero values of CwfOffset and are not generated by this example.

In one embodiment, the master is also responsible for setting the pBusTransCommandUsed, pBusTransDataUsed and pBusTransResponseAvailable callbacks. These will be called by the slave to accept the command, indicate data payloads have been processed, and provide the write response respectively.

In accordance with an embodiment of the invention, this master device makes the first data payload available to the slave at the time the transaction is issued. This is not compulsory, and the master is free to set DataAvailableLength=0, and call the slave's pBusTransDataAvailable function after the command has been issued.

If not providing the first data payload early, as in this example, the master typically does not wait until pBus- TransCommandUsed has been called to issue the data, as the slave may be waiting for all data to be issued before issuing this command used acknowledgement.

CommandUsedTickStamp is set to CommandAvailableTickStamp to indicate that the command has yet been accepted by the slave. This example issues the bus transaction at the current bus time. Transactions can also be issued at future times (by setting both tick stamps to NowTickStamp+TicksInFuture).

Consider the following code example:

```
void AxiMasterWriteBusCommandUsed(tAmpiStdBusTransaction*pBusCommand)
{
/*
** The command channel is now free, so another write transaction could be
** issued at this point, however the write transaction structure is still in use,
** so a second write transaction structure would have to be utilized.
*/
}
void AxiMasterWriteBusDataUsed(tAmpiStdBusTransaction *pBusCommand)
{
/*
** data payload has been processed - additional payloads can be made
** available here by setting DATS, DAL and calling pBusTransDataAvailable.
*/
}
```

The simple master device in this example transfers all of the write data in a single payload. The StdBus AXI protocol allows master devices to determine how many beats to transfer in a single payload. Each payload, other than possibly the first payload which can be issued with the transaction command, is transferred by calling the slave's pBusTransDataAvailable function.

```
void AxiMasterWriteBusResponseAvailable(tAmpiStdBusTransaction*pBusTransaction)
{
tInstanceData *IID = (tInstanceData *) (pBusTransaction->pMasterData);
/*
** Set ResponseUsedTickStamp and invoke ResponseUsed.
*/
pBusTransaction->ResponseUsedTickStamp =
    pBusTransaction->ResponseAvailableTickStamp + 1;
pBusTransaction->pBusTransResponseUsed(pBusTransaction);
/*
** Check if write was successful.
*/
if ((pBusTransaction->Status == StdBus2StatusOkay) ||
    (pBusTransaction->Status == StdBus2StatusExOkay))
{
/*
** Check that all data payloads have been sampled.
*/
if(pBusTransaction->Length == pBusTransaction->DataUsedLength)
{
/*
** write transaction is complete.
*/
}
}
else if (pBusTransaction->Status == StdBus2StatusSlvErr)
{
/*
** write failed - attempt the transaction again.
*/
AmpiStreamPrintf(WARNING_MSG, "write transaction - slave error!\n");
IssueWriteTransaction(pBusTransaction->Address, pBusTransaction->Length);
}
else if (pBusTransaction->Status == StdBus2StatusDecErr)
{
AmpiStreamPrintf(ERROR_EXIT_MSG, "write transaction - slave decode error!\n");
}
/*
** All data has been transferred - transaction is complete
** The write transaction structure can be marked free for re-use.
*/
}
```

In one embodiment, the AxiMasterWriteBusResponseAvailable callback function handles: 1) checking the write response returned by the slave; and 2) setting the ResponseUsedTickStamp value and calling the slave's pBusTransResponseUsed callback function. For this device, no additional master processing is required after the transaction has completed.

AXI Transaction Timing

In this description, it is assumed there are five independent channels in the StdBus AXI protocol: read command, write command, read data, write data, and write response. Each channel uses bus tick stamps to indicate the transaction timing, and callback functions to handle the VALID/READY handshaking between the master and slave devices.

In another embodiment, for the read and write command channels, the master device sets the CommandAvailableTickStamp (CATS), which indicates the clock edge at which a command payload is made available. In the AXI protocol, this corresponds to the clock edge at which command valid is asserted.

In one embodiment, the slave device is responsible for setting the CommandUsedTickStamp (CUTS). In AXI protocol, the CUTS indicates the clock edge at which both command valid and command ready are sampled as asserted. This edge may be well ahead of the NowTickStamp (NTS). For checking purposes, the CUTS is initialized by the master to be equal to the CATS before the transaction is issued, indicating that the command has not yet been accepted.

According to an embodiment of the invention, for the read data channel, the slave sets the DataAvailableTickStamp (DATS), which indicates the clock edge at which the data payload is made available (corresponding to the clock edge at which valid is asserted on the read data channel for the first data beat contained within the data payload).

When the master has processed the read data, it sets DataUsedTickStamp (DUTS), which corresponds to the clock edge at which both read data valid and read data ready are sampled as asserted for the last data beat within the data payload.

In one embodiment, the write data channel works in a similar manner to the read data channel except in the reverse direction, that is, the master sets the DATS and the slave sets the DUTS.

The fifth channel is the write response channel. In another embodiment, this channel is only used for write transactions, and in this case, the slave sets the ResponseAvailableTickStamp (RATS), and the master sets the ResponseUsedTickStamp (RUTS). In AXI protocol terms the RATS corresponds to the edge at which write response valid is asserted, and, the RUTS corresponds to the edge at which both write response valid and write response ready are sampled as asserted.

Untimed Transactions

Untimed transactions are protocol independent. An AXI master device issues an untimed transaction in the same way as a StdBus1 protocol device. Neither the StdBus type 1 protocol Grant, Partial and Complete callback functions, nor the various StdBus type 2 protocol Available and Used callback functions are used for untimed transactions. An example of issuing an untimed 16 byte read transaction is as follows:

```
tWord32                 Index;
tWord8                  MyData[16];
tAmpiStdBusTransaction  BusTransaction;
/*
** Initialize transaction data structure
*/
BusTransaction.InterfaceVersion = StdBusInterfaceV1v1;
BusTransaction.StructureVersion = CompiledWithStdBusInterfaceVersion;
BusTransaction.TransProtocol = IP->MasterProtocol;
BusTransaction.Length = 16;
BusTransaction.Address = 0x1000000;
BusTransaction.Command32 = UNTIMED_READ_OP.
BusTransaction.DoneLength = 0;
/*
** Issue Untimed read transaction
*/
AmpiStdBusUntimedCommand(IP->pMasterReadBus,&BusTransaction);
/*
** Check that transaction succeeded
*/
if (BusTransaction.DoneLength != BusTransaction.Length)
{
AmpiStreamPrintf(ERROR_MSG, "Untimed read failed!\n");
}
else
{
/*
** Process read data
*/
for (Index = 0;
Index < BusTransaction.Length; Index++)
{
MyData[Index] = BusTransaction.pSourceBuffer[Index];
}
}
```

Because untimed transactions return directly, that is, no scheduling occurs between issuing the command and when it completes, the transaction data structure can be allocated on the stack of the calling task.

Byte Enables

The StdBus AXI protocol optionally supports byte enables on write transactions. An AXI master can set pTransByteEnables to NULL to indicate that the entire write transfer is to take place. When not NULL, pTransByteEnables must point to an array of bytes of length Length, the total data length of the transfer. A value of 0xFF in a byte of the array indicates that the respective byte is to be accessed, whilst a value of 0x00 indicates that it is not accessed.

Figure 18:
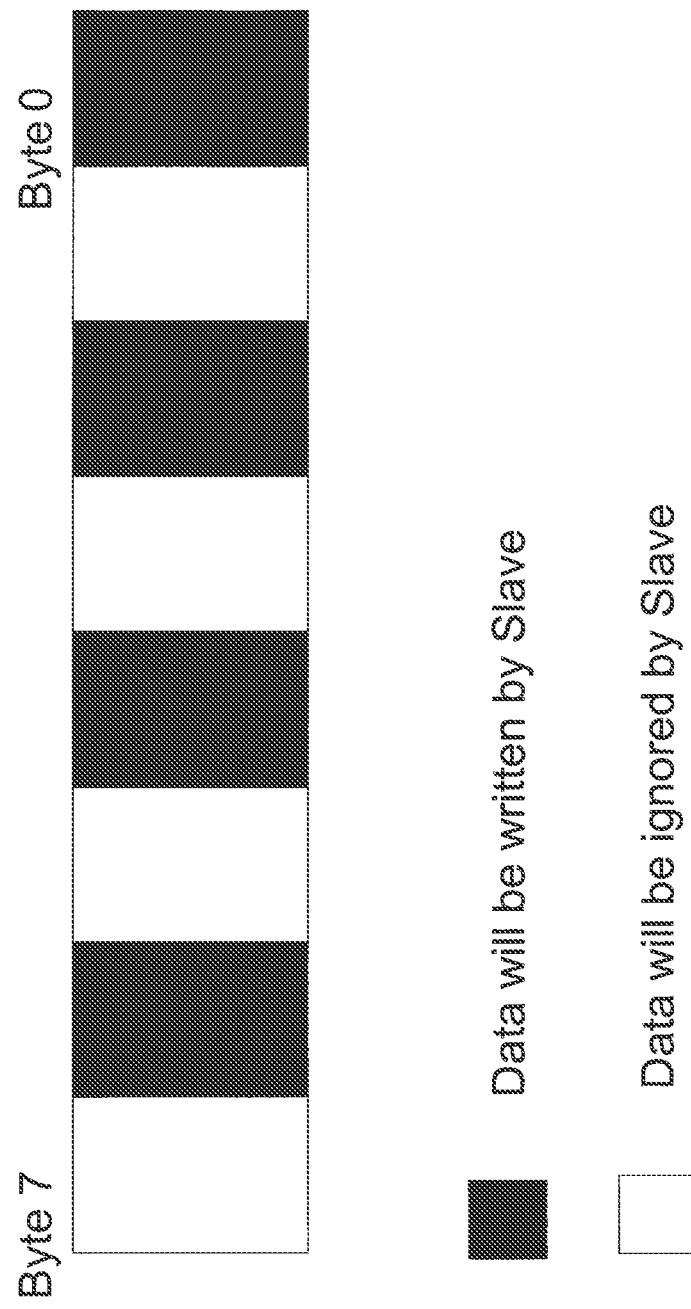
FIG. 18 illustrates how a byte enable array can be set-up to ignore odd bytes and write only even numbered bytes in a transfer, according to an embodiment of the present invention.

Other byte values are not supported. FIG. 18 shows how a byte enable array 1800 can be set-up, in an embodiment, to ignore odd bytes, and write only even numbered bytes in the transfer.

The following code example shows how the byte enable array 1800 can be set up to ignore odd bytes, and write only even numbered bytes in the transfer.

```
tWord32    Index;
tWord8     ByteEnableArray[8];
/*
** Set the byte array to only store even bytes
*/
for (Index = 0; Index < 8; Index+=2)
{
 ByteEnableArray[Index] = 0xFF;
}
/*
** Set the odd bytes to be ignored.
*/
for (Index = 1; Index < 8; Index+=2)
{
ByteEnableArray[Index] = 0x00; }
/*
** Set the byte enable array in the bus transaction.
*/
IP->BusTransaction.Length = 8;
IP->BusTransaction.pTransByteEnable = ByteEnableArray;
```

In one embodiment, the Byte Enable array must be the length of the entire transaction data, such that the DAL and DUL act as offsets, relative to CwfOffset beat, into both the Byte Enable array (if the pointer is not NULL) and the pSourceBuffer data array.

In another embodiment, the array is intended to be used as a data mask when writing data as shown in the following code.

```
tWord8 Mask = pBusCommand->pTransByteEnable[Index];
IP->MyData[Index] &= (~Mask);
IP->MyData[Index] |= (pBusCommand->pSourceBuffer[Index]& Mask);
```

Critical Word First Offset

In accordance with an embodiment of the present invention, the CwfOffset field in the transaction data structure indicates the index of the first beat to be processed in the transaction. This field is only non-zero for wrapping AXI bursts, and for most AXI master devices, it can be set to 0.

When this field is non-zero, using the DataAvailableLength and DataUsedLength fields as offsets into the data buffer is as detailed in Section 3.

In one embodiment, wrapping burst accesses are typically only generated by VPMs performing cached read or fetch accesses. The StdBus AXI protocol in the embodiment described herein does not support unaligned wrapping burst accesses. If the CwfOffset field is non-zero, then, in an embodiment, the transaction address must be aligned to the beat size.

The code example below demonstrates setting up a wrapping AXI burst, where CwfOffset is set to 2 and hence the 3.sup.rd beat is the first beat to be processed.

```
/*
** Set up a 4 beat, wrapping burst of 4 bytes per beat.
*/
IP->BusTransaction.SubCommand = (AxiBurstIncrOrWrap <<
AxiSubCommandBurstTypeOffset) |
(AxiSize32Bits << AxiSubCommandSizeOffset) |
(AxiBurstLength4 << AxiSubCommandBurstLengthOffset);
/*
** Transfer beat 2 (third beat) first.
*/
IP->BusTransaction.CwfOffset = 2;
```

In this example, the beats will be processed in this order: 2, 3, 0, 1.

Exclusive Accesses

In another embodiment, the StdBus AXI protocol supports exclusive read and write operations through use of the BusCycleAttributes field in the transaction data structure. Master devices indicate that a particular transaction is exclusive by setting the ExclusiveAttribute bit prior to issuing the transaction as shown below.

IP→BusTransaction.BusCycleAttributes|=
    CycleExclusiveAttributeMask

In an embodiment, if the exclusive read or write is successful, the slave sets Status in the transaction data structure to StdBus2StatusExOkay. If the exclusive transfer fails, the slave sets Status to StdBus2StatusOkay.

Locked Accesses

According to an embodiment of the present invention, the StdBus AXI protocol supports locked read and write operations through use of the BusCycleAttributes field in the transaction data structure. Master devices indicate that a particular transaction is locked by setting the LockedAttribute bit prior to issuing the transaction as shown below.

IP→BusTransaction.BusCycleAttributes|=
    CycleLockedAttributeMask

In one embodiment, master devices are responsible for releasing the lock by completing an unlocked transfer (that is, one with the LockedAttribute bit cleared) at the end of the locked transfer.

Partial/Complete Callbacks

According to an embodiment of the invention, StdBus AXI master devices do not set the partial or complete callbacks in the transaction data structure. All communication with the slave device occurs via the various Available and Used callback functions. The Partial and Complete callbacks are only used in embodiments for more conventional buses, e.g., StdBus type 1 protocols such as AHB, AHB_Lite protocols, etc.

Master Device Aborts

In one particular implementation, the StdBus AXI protocol does not allow either the master or the slave to abort a transaction. All data beats, or sets of beats in the form of one or more data payloads, in the transfer must take place, even if the data is ignored (for example, if there is an error in the slave).

5.0 StdBus Features

The StdBus model within the COMET 5 Framework can be configured in a variety of ways to allow the user to alter the functionality and behavior of the model. These parameters can be altered via the COMET 5 Framework GUI in the platform configuration file. The parameters that are discussed in the paragraphs below include: arbitration and arbitration reporting; configuration of bus data and address width; protocol selection and timing; bus monitoring and VCD waveform output; and checking and tracing.

These features and configuration parameters apply to the particular example embodiment described herein using the COMET framework. Other embodiments may or may not includes these features and/or parameters, or use other mechanisms.

5.1 Arbitration and Arbitration Reporting

In an embodiment, StdBus for AXI model supports only a single master connected to each instance of the SBPE, so the Arbitration and BusArbitrationReport parameters in one version are set to Disabled when using AXI protocol.

In another embodiment, the Fixed PriorityArbitration.OverwriteDefaultPriorityIdle and Fixed PriorityArbitration.OverwriteDefaultPriorityActive parameters are also ignored and should be left to the default setting (0).

5.2 Configuration of Bus Data and Address Width

In accordance with an embodiment of the present invention, a BusWidth parameter sets the width of the data bus of the respective StdBus instance in Bytes. In one embodiment, this parameter is interrogated by the master and slave devices connected to the bus instance in order to determine their respective timing and behavior.

In another embodiment, an AddressBits parameter sets the width of the address bus of the respective StdBus instance in Bits. This parameter may be interrogated by the master and slave devices connected to the bus instance in order to determine their respective timing and behavior.

5.3 Protocol Selection and Timing

In accordance with an embodiment of the invention, a BusProtocol parameter selects the bus protocol. For StdBus AXI protocol selection, this parameter should be set to AXI. The protocol selection affects the timing and behavior of the respective bus instance.

In one embodiment, when AXI protocol is selected, the Timing.RequestLatency parameter is ignored, and should be set to the default (1).

a. Bus Monitoring and Trace Waveform Output

In versions of the bus model for more conventional, non-AXI buses, a trace is output for waveform display. Because in one embodiment, Arbitration is set to Disabled for StdBus AXI, no trace is output. This is because, according to an embodiment, with Arbitration set to Disabled, no simulation time synchronization is performed by the StdBus. Each transaction is processed when it is received and only the timing values are updated. Simulation time is not advanced in relation to the transaction. Because in some embodiments, any waveform trace output is in a format that is in a linearly increasing time order, the embodiments described herein StdBus cannot effectively create values in a waveform trace file in such a format ahead or behind current time.

According to an embodiment, BusMonitoring is set to Disabled for AXI bus modeling.

5.5 Checking and Tracing

In accordance with an embodiment of the present invention, the StdBus model is capable of checking compliance with the protocol, e.g., the AXI protocol during the simulation. This is importance for complex bus protocols such as AXI.

In one embodiment, the model is also capable of generating detailed tracing information which may be useful for debugging.

The following parameters may be used to control protocol checking and tracing within the StdBus model, and apply to the particular example embodiment described herein, e.g., using the COMET framework. Other embodiments may or may not includes these features and/or parameters, or use other mechanisms.

WarningLevel: This parameter controls the level of warnings that are generated by the StdBus model. When set to CriticalOnly, only the most serious problems will cause a warning message to be displayed. When set to All, the StdBus model will output warnings for any inconsistent or incorrect behavior (for example, the issuing of transactions with the bus clock stopped, timing discrepancies, and other anomalies).

CheckingAndTracing.ProtocolChecking: When set to Enabled, the StdBus model intercepts master and slave callback functions to ensure that the order and timing of the callbacks is consistent with the StdBus AXI protocol. Warnings or errors are generated when non-compliant behavior is encountered (For example, bad tickstamps or callbacks out of order). Protocol checking will have an adverse effect on simulation performance, but is useful when developing a new device. When set to Disabled, no protocol checking is performed. This option may be used when the user is confident that the device is operating correctly.

CheckingAndTracing.ProtocolTracing: When set to Enabled, the StdBus model generates protocol trace information that may be useful when debugging device behavior. Tracing output may be controlled using TracingSampleRate and TracingTrigger.

CheckingAndTracing.ProtocolErrorForcesExit: When set to Enabled, a protocol error causes the simulation to exit. If this parameter is Disabled, the simulation will not exit, but a warning may be issued. This parameter is only in effect if protocol checking is enabled.

CheckingAndTracing.TracingSampleRate: This parameter determines the frequency and quantity of transaction information which is output by the bus and is only in effect if protocol tracing is also enabled. For example, if set to 1, abbreviated details of every transaction processed by the StdBus model may be displayed; if set to 2, abbreviated details of every second transaction may be displayed. Full transaction tracing is enabled by setting this parameter to 0.

CheckingAndTracing.TracingTrigger: This parameter allows the user to enable tracing at a certain point in the simulation and is only in effect if protocol tracing is also enabled. For example, if set to 100, full or abbreviated tracing (see TracingSampleRate above) is only enabled after 100 transactions have been processed by the StdBus model. Setting this parameter to 0 causes tracing to be enabled as soon as the simulation starts. From the point at which full tracing is commenced, protocol checking is also enabled regardless of the state of the ProtocolChecking parameter.

5.6 Example of Write Cycle Timing

Included herein is an example of a StdBus AXI write transaction. included are typical timing waveforms, a step-by-step analysis of the timing waveform, and an example operational flowchart including actual function calls and detailed explanations.

Figure 19:
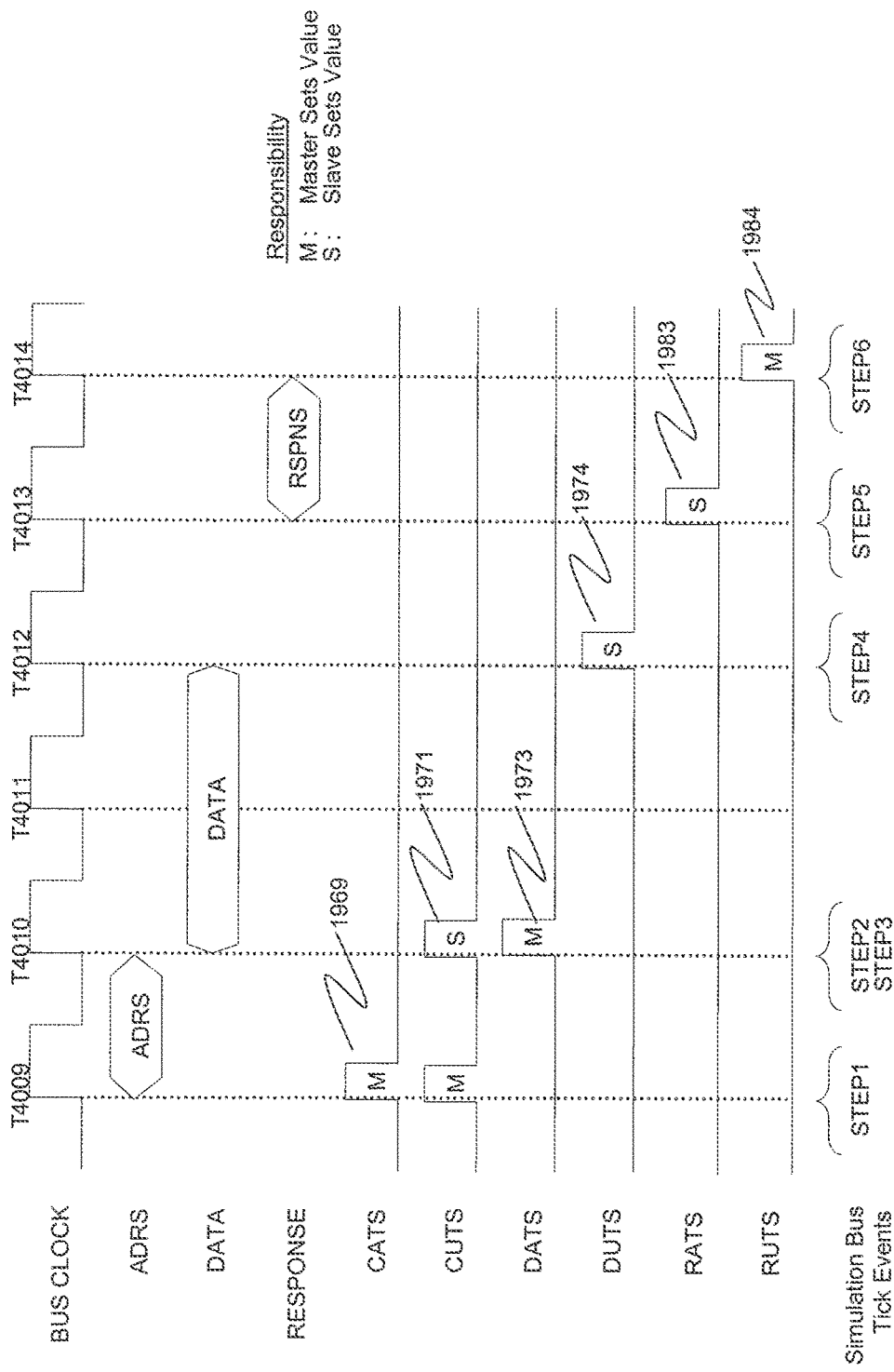
FIG. 19 shows typical timing for a write transaction which is requested to a StdBus instance with the protocol set to AXI, according to an embodiment of the present invention.

FIG. 19 shows typical timing 1900 for a write transaction which is requested to a StdBus instance with protocol set to AXI. The width of the pulses shown are not representative of the clock Cycle. The rising edge of each pulse is used to indicate the active clock edge of the bus event in relation to the bus clock and hence its corresponding tick stamp.

This example assumes that the slave is not processing any other transaction when the master makes the request. The slave timing in this case is 1 clock tick for command and response channel processing, and two clock ticks for data channel processing.

A tickstamp, called NowTickStamp (NTS) is not depicted in FIG. 19. In an embodiment, it is the responsibility of the master and slave devices invoking each function to ensure that the NTS is updated whenever a synchronization event has occurred and the transaction is to be passed from one to the other. For example, if the write transaction is to be buffered and a buffer is available, then no synchronization may be necessary and the NTS may stay at the same value for the entire transaction.

Table 3 shows details of the example depicted in FIG. 19.

TABLE 3

|      | STEP1       | STEP2                        | STEP3         | STEP4       | STEP5                   | STEP6         |
|------|-------------|------------------------------|---------------|-------------|-------------------------|---------------|
| CATS | M:4009-1969 | 4009                         | 4009          | 4009        | 4009                    | 4009          |
| CUTS | M:4009      | S:4010 (CATS+1)-1971         | 4010          | 4010        | 4010                    | 4010          |
| DATS | undefined   | undefined                    | M:4010-1973   | 4010        | 4010                    | 4010          |
| DUTS | undefined   | undefined                    | undefined     | S:4012-1974 | 4012                    | 4012          |
| RATS | undefined   | undefined                    | undefined     | undefined   | S:4013(DUTS+1)-1983     | 4013          |
| RUTS | undefined   | undefined                    | undefined     | undefined   | undefined               | M:4014-1984   |

Figure 20:
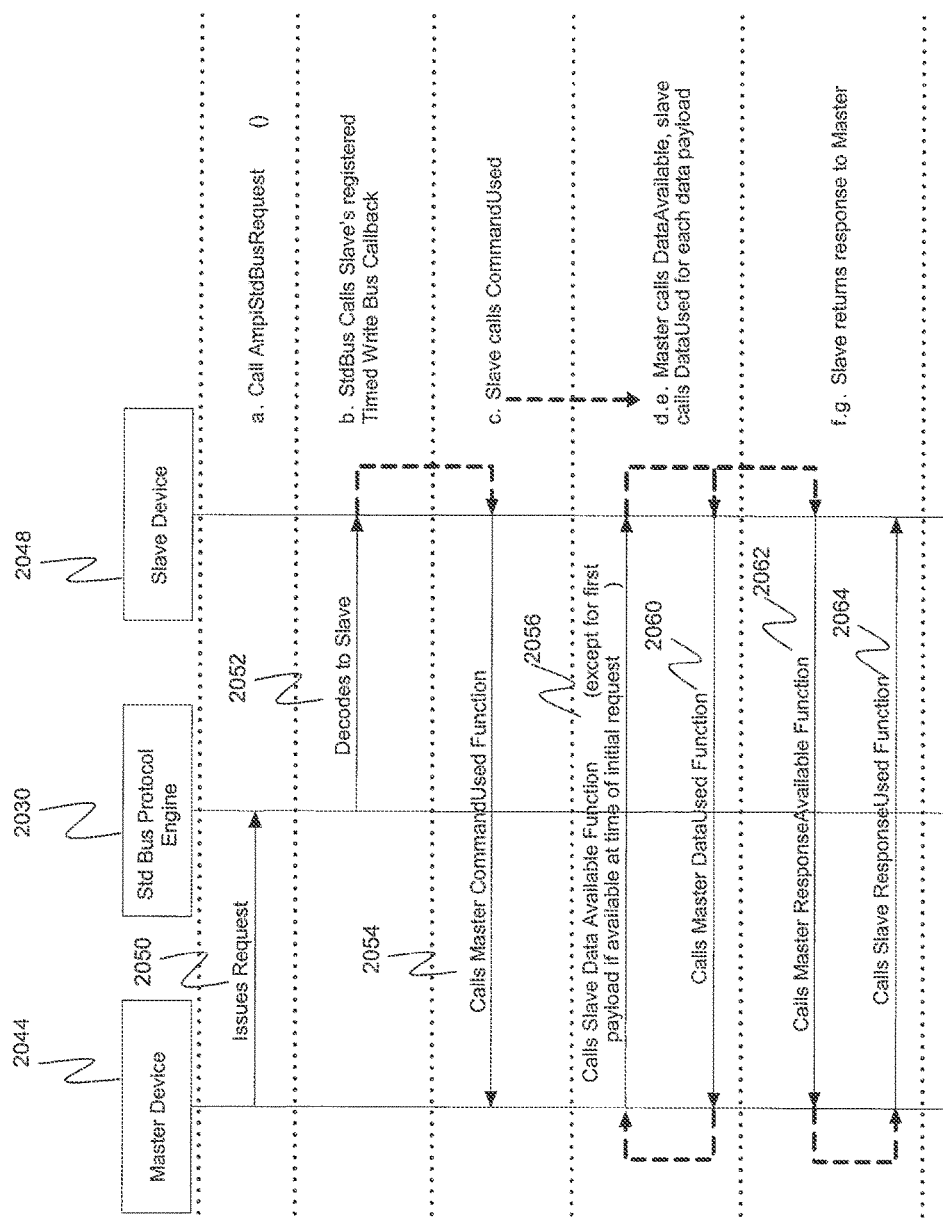
FIG. 20 illustrates the communication that occurs between the various models: master device, StdBus (the bus model), and the slave device; for an AXI write transaction according to an embodiment of the present invention.

FIG. 20 illustrates the communication 2000 that occurs between the various models: master device, StdBus (the bus model), and the slave device.

As shown in FIG. 20, master device 2044 issues request 2050 on StdBus 2030 and sets CATS and CUTS to indicate the tick when the command is available to slave device 2048 and the NowTickStamp to indicate the current tick in step a.

StdBus 2030 calls slave device's 2048 timed write callback function in step b.

The slave device sets CUTS to CATS+command timing, then calls the master's pBusTransCommandUsed function 2054 in step c.

Slave device 2048 then checks if data is available (by checking DAL 2056), and if so, processes it. If no data is available, slave device 2048 waits for master device 2044 to set DAL and DATS and call the slave's pBusTransDataAvailable function in step d. Master device 2044 is not permitted to invoke this function from within the pBusTransCommandUsed callback as this may lead to a deadlock and, for this same reason, is not permitted by the AMBA AXI specification.

When slave device 2048 has processed a data payload, it sets DUL=DAL, and sets the DUTS, and calls the master's pBusTransDataUsed function 2060 in step e. Steps d & e continue until all data has been processed.

After all data has been processed, the slave device sets the appropriate value in the transaction data structure's Status field (For example, StdBus2StatusOkay), updates RATS, and then calls the master's pBusTransResponseAvailable function 2062 in step f.

The master device sets the RUTS, then calls the slave's pBusTransResponseUsed function 2064 in step g.

5.7 Example of Read Cycle Timing

Included herein is an example of a StdBus AXI read transaction. Included are typical timing waveforms, a step-by-step analysis of the timing waveform, and an example operational flowchart including actual function calls and detailed explanations.

Figure 21:
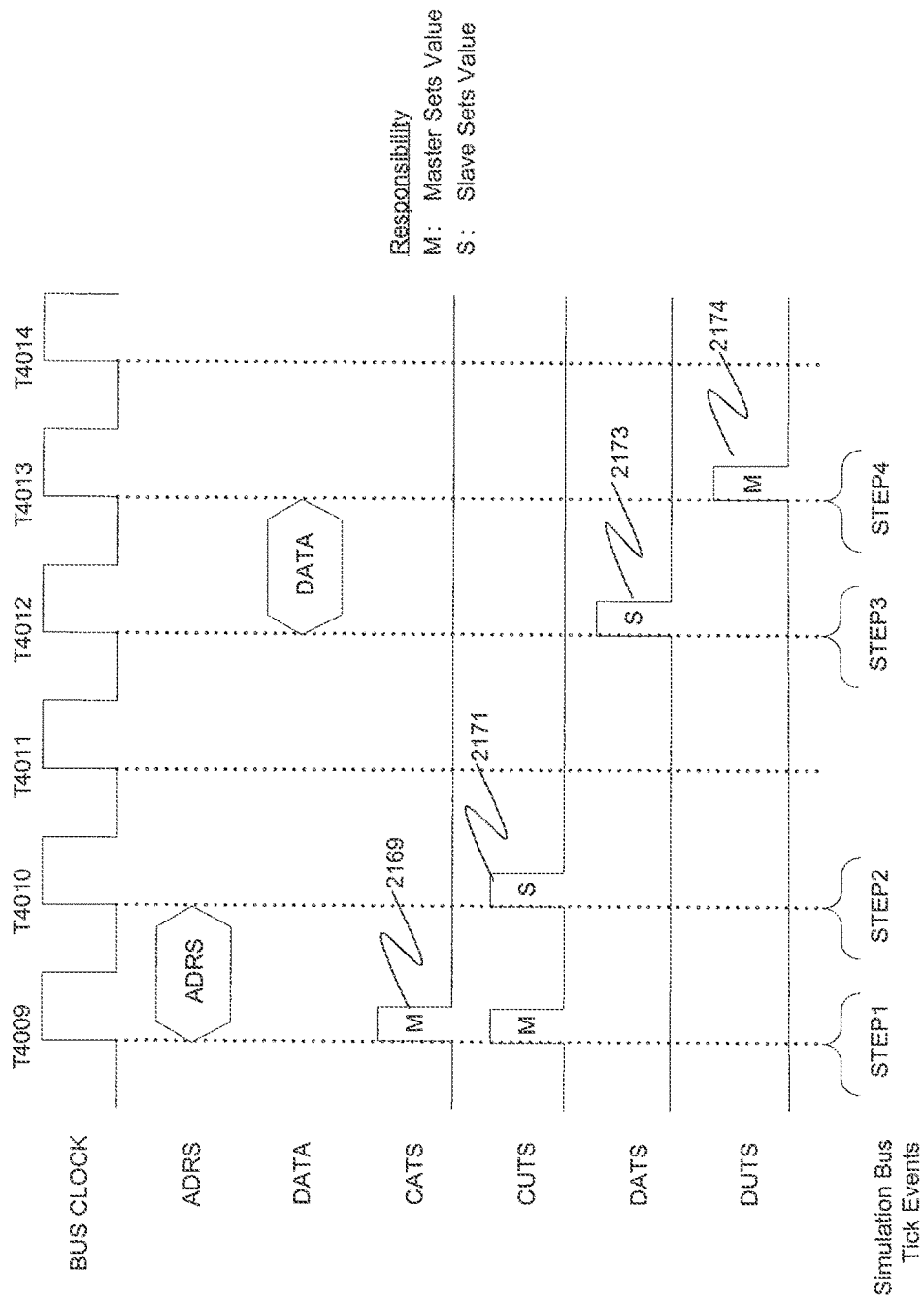
FIG. 21 shows an example timing diagram for a read transaction which is requested to a StdBus instance with the protocol set to AXI, according to an embodiment of the present invention.

FIG. 21 shows an example timing diagram 2100 for a read transaction which is requested to a StdBus instance with protocol set to AXI. The width of the pulses shown are not representative of the clock cycle. The rising edge of each pulse is used to indicate the active clock edge of the bus event in relation to the bus clock and hence its corresponding tick stamp.

This example assumes that the slave is not processing any other transaction when the master makes the request. The slave timing in this case is one clock tick for command channel processing, and two clock ticks for data channel payload availability and one clock tick for data channel processing.

The NowTickStamp (NTS) is not shown in FIG. 21. It is the responsibility of the master and slave devices invoking each function to ensure that the NTS is updated whenever a synchronization event has occurred and the transaction is to be passed from one to the other. For example, if the read transaction is immediately available, then no synchronization may be necessary and the NTS may stay at the same value for the entire transaction.

Table 4 shows details of the example depicted in FIG. 21.

TABLE 4

|      | STEP1              | STEP2                       | STEP3                 | STEP4         |
|------|--------------------|-----------------------------|-----------------------|---------------|
| CATS | M: 4009-2169       | 4009                        | 4009                  | 4009          |
| CUTS | M: 4009            | S: 4010 (CATS + 1)-2171     | 4010                  | 4010          |
| DATS | undefined          | undefined                   | S: 4012 (CUTS + 2)-2173 | 4012        |
| DUTS | undefined          | undefined                   | undefined             | M: 4013-2174  |

Figure 22:
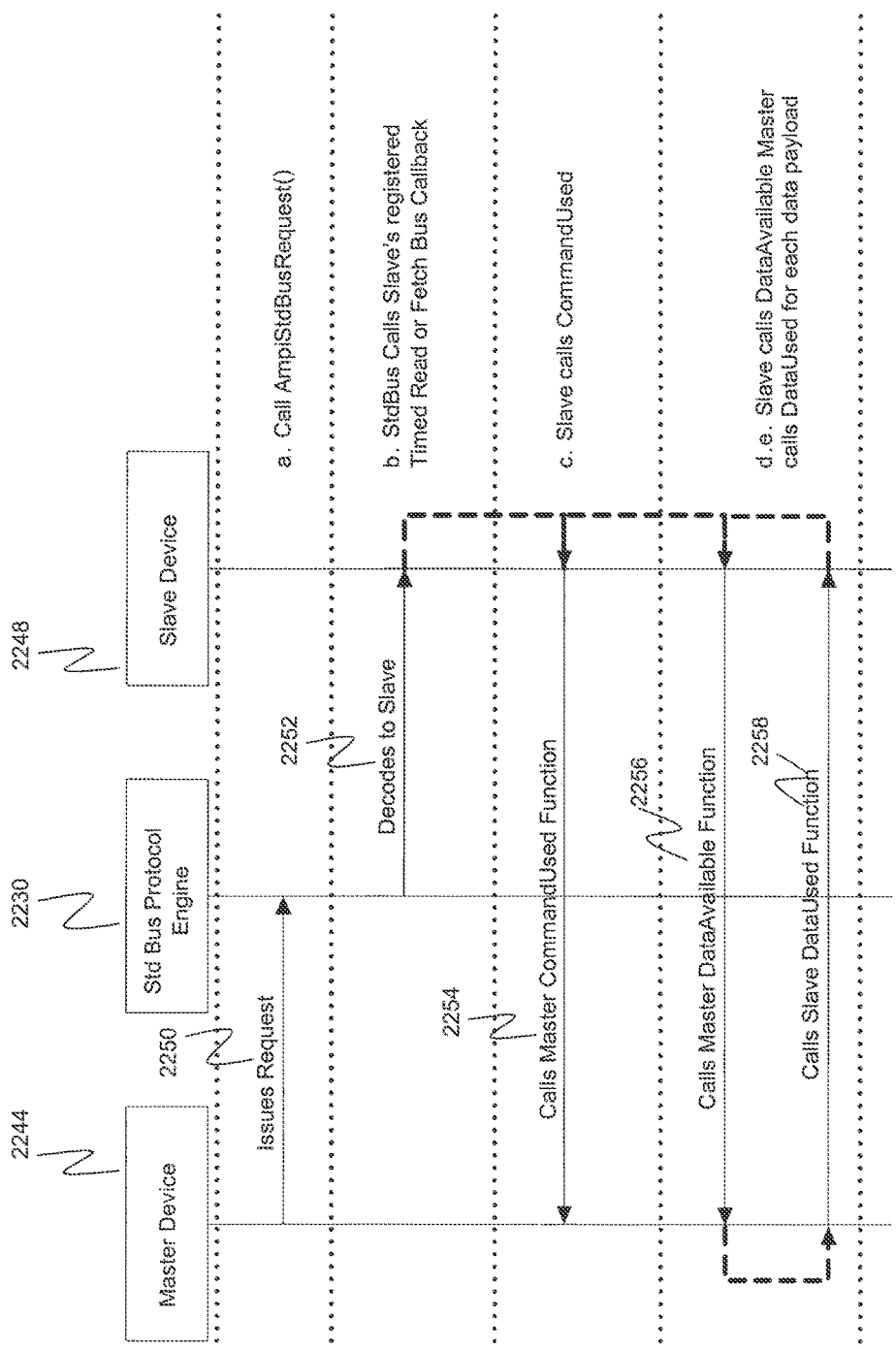
FIG. 22 shows the communication that occurs between the various models: master device, StdBus (the bus model), and the slave device; for an AXI read transaction according to an embodiment of the present invention.

FIG. 22 shows the communication 2200 that occurs between the various models: master device 2244, StdBus 2230 (the bus model), and slave device 2248.

As depicted in FIG. 22, master device 2244 issues request 2250 on StdBus 2230 and sets the CATS and CUTS to indicate the tick when the command is available to the slave and the NowTickStamp to indicate the current tick in step a.

StdBus calls slave device's 2248 registered timed read or fetch callback function 2252 in step b.

Slave device 2248 sets the CUTS to CATS+command timing, then calls the master's pBusTransCommandUsed function 2254 in step c.

Slave device 2248 sets the DAL to indicate the data payload length, sets the appropriate value in the transaction data structure's Status field (For example, StdBus2StatusOkay), and sets the DATS to CUTS+read availability timing, then calls the master's pBusTransDataAvailable function 2256 in step d.

Master device 2244 processes the read data, sets the DUL=DAL, and sets the DUTS, then calls the slave's pBusTransData Used function 2258 in step e.

Steps d & e repeat for each data payload until all the data has been read.

6. Details of Elements of the StdBus Transaction Data Structure

This section provides, by way of example, details of the elements and structures used in one embodiment of the StdBus model for AXI, for use with the COMET framework. Other embodiments may or may not include these features and/or parameters, or use other mechanisms.

tAmpiStdBusTransaction *pNext: This field acts as a link to allow this structure to be placed in single or double linked queues. Links must be ignored once transactions are passed between modules, e.g., 'unlinked' before passing to next module. This field should only be used by AXI protocol master devices to keep track of inactive transaction records, and by AXI protocol slave devices to keep track of active AXI commands. Use of this field is optional.

tAmpiStdBusTransaction *pPrev: This field acts as a link to allow this structure to be placed in single or double linked queues. Links must be ignored once transactions are passed between modules, e.g., 'unlinked' before passing to next module. This field should only be used by AXI protocol master devices to keep track of inactive transaction records, and by AXI protocol slave devices to keep track of active AXI commands. Use of this field is optional.

void *pMasterData: This field is used by the bus master device to store a pointer to its own instance data structure so it can be accessed from within the bus transaction data structure. See also pSlaveData below.

tAmpiStdBusGrant pBusGrant: This field should not be used by AXI protocol master and slave devices. It should automatically be initialized to NULL at the time of allocation of the transaction structure.

tInt32 NowTickStamp: This field indicates the TickStamp for 'Now' which is the TickStamp for current simulation time. Whenever control is passed from one subsystem to another, the NowTickStamp must be updated to reflect the current simulation time in bus ticks.

tInt32 RequestTickStamp: This field should not be used by AXI protocol master and slave devices. It should automatically be initialized to NULL at the time of allocation of the transaction structure.

tInt32 GrantTickStamp: This field should not be used by AXI protocol master and slave devices. It should automatically be initialized to NULL at the time of allocation of the transaction structure.

tInt32 InProgressTickStamp: This field should not be used by AXI protocol master and slave devices. It should automatically be initialized to NULL at the time of allocation of the transaction structure.

tInt32 CompletedTickStamp: This field should not be used by AXI protocol master and slave devices. It should automatically be initialized to NULL at the time of allocation of the transaction structure.

tWord32 Command32: This field indicates the bus transaction command type, e.g., READ_OP, WRITE_OP, FETCH_OP etc. This provides the StdBus protocol engine with the information it needs to call the appropriate registered callback function in the slave module.

Figure 23:
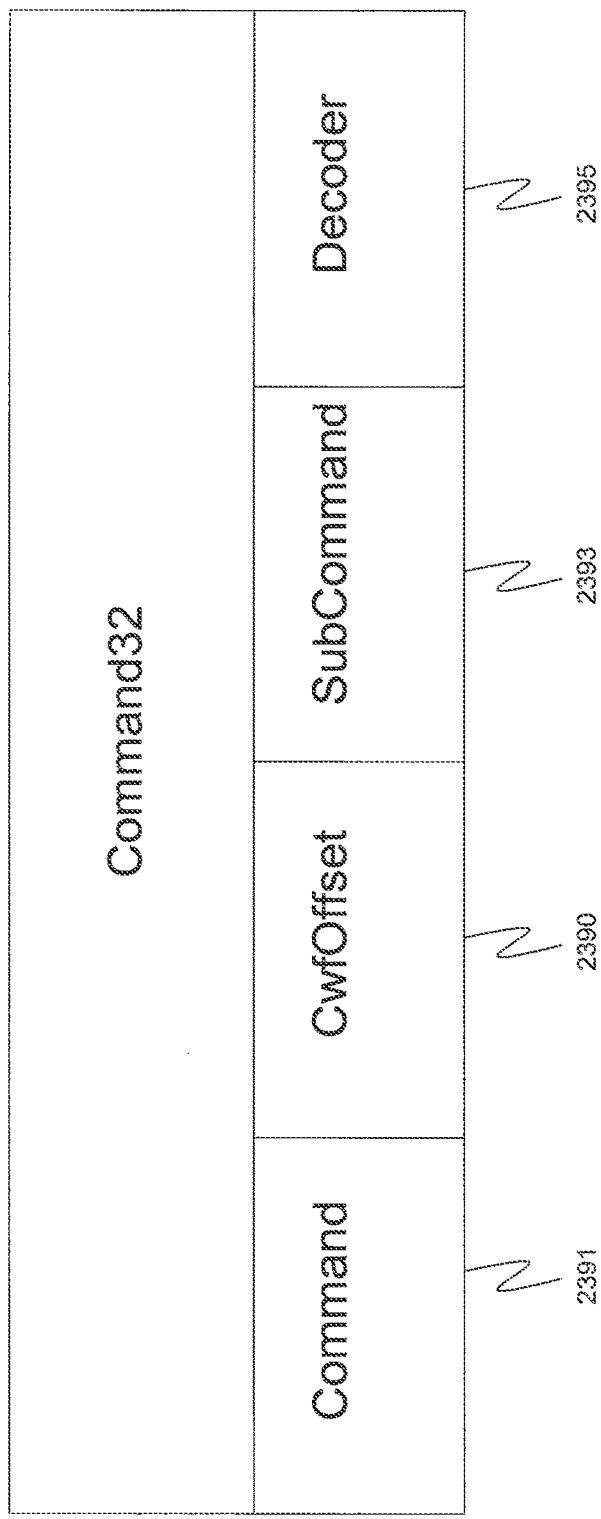
FIG. 23 illustrates how the Command32 field is comprised of 4 single byte sub-fields in accordance with an embodiment of the present invention.

FIG. 23 shows how the Command32 field 2300 is actually made up of 4 single byte sub-fields. As shown in FIG. 23, Command32 field 2300 is comprised of Command 2391, CwfOffset 2390, SubCommand 2393, and Decoder 2395. Devices can access the sub-fields directly, or use the Command32 field 2300 to access all 4 bytes at once. The four sub-fields depicted in FIG. 23 are described in greater detail below.

tWord8 Command 2391: This sub-field specifies the enumerated operation code for this transaction, for example, readOp, writeOp, fetchOp or other operations.

tWord8 SubCommand 2393: This sub-field contains protocol specific transaction information set by the master device. For the AXI protocol, it specifies the Beat Size, Number of Beats and Burst Type of the transaction. AXI-specific details on this sub-field are provided in section 3.

tWord8 CwfOffset 2390: This sub-field indicates the index, starting at 0, of the first beat to be accessed by the slave. For AXI protocol master and slave devices which support critical word first accesses, it must be taken into account when using DataAvailableLength and DataUsedLength as offsets into pSourceBuffer. AXI specific details on this sub-field can be found in Section 3.

tWord8 Decoder 2395: This sub-field specifies the decoder to be used for this transaction, for example, readdecode, writedecode, fetchdecode or other decoders.

tWord8*pSourceBuffer: This field contains a pointer to the source of data for the transaction. It is supplied by a master device for write transactions, and, by the responding slave device for read transactions. The pointer value must share the same alignment as the transaction address to within the beat size. For example, if the transaction address is 4 byte aligned, but the beat size is 2 bytes, then the pSourceBuffer value must be at least 2 byte aligned.

tWord32 BusCycleAttributes: This field indicates the StdBus Attributes for the bus transaction as set by the master device. These attributes are not protocol dependant and may be used by various particular protocols to determine other actions.

The 32 bit BusCycleAttributes transaction field definition is as follows.

| Bitfield name | #Bits | Description |
| --- | --- | --- |
| OuterPageAttribute | 4 | Outer L2 cache page attributes |
| InnerPageAttribute | 4 | Inner L1 cache page attributes |
| Shared | 1 | 1 = shared, 0 = non-shared. |
| Locked | 1 | 1 = next access is locked, 0 = next access is not locked |
| Exclusive | 1 | 1 = exclusive access, 0 non-exclusive access. |
| PrivilegedMode | 1 | 1 = privilege mode access, 0 = user mode access. |
| DataAccess | 1 | 1 = data access, 0 = instruction access. |
| SecurityAccess | 1 | 1 = security mode access, 0 = non-security mode access. |
| Unused | 18 | Reserved | tWord64 Address: This field indicates the physical address of the numerically lowest addressed byte for the bus transaction. The address must always be represented as a little endian address in order to match the natural little endian mode of the underlying X86 host system, regardless of the endian mode of operation of the master device issuing the transaction.

tWord32 Length: The Length field is set by the master device to the total number of bytes for the transaction counted from the Start address to the End address inclusively. For protocols which allow sparse byte enables, inactive bytes are included in this count. For transactions with non-contiguous (sparse) byte enables, byte enables must be defined using the pTransByteEnable field.

tInt32 Status: This field is used to return the progress status of the transaction. For the AXI protocol read transactions, the Status value is set by the slave prior to calling the master's pBusTransDataAvailable callback function for each data payload. AXI slaves return a response to the master for each beat of a read transaction, so the slave must split the transaction into multiple payloads if the responses differ. All of the beats in any payload are assumed to have the same response.

For the AXI protocol write transactions, it is set prior to invoking the master's pBusTransResponseAvailable callback function. It is used to indicate the transaction success/failure type to the master.

tWord32 DoneLength: This field should be set by slave devices for un-timed transactions to indicate the total length of the transfer (Length) which has taken place. This field should not be used for timed transactions by AXI protocol master and slave devices. For timed transactions it should be set to 0 by the master device.

const tAmpiStdBusHandleMaster *pNetMasterHandle: This field is set up by the bus protocol engine at the time the transaction is requested to contain the bus master handle for this transaction. This field must not to be modified by the bus master or slave devices.

Void *pTransExtend: This field contains additional data for specific commands and is used only by virtual processor model master devices.

When implementing bus bridges or memory controllers, this field should be copied from slave port transactions to master port transactions on issue of the transaction, and from master port transactions to slave port transactions for the first data payload or response returned from the master port. If, for example on a subordinate bus, the one input transaction must be broken into a sequence of transactions in order to satisfy protocol requirements, then, the field must be updated from the value returned from the first transaction.

const tAmpiClockHandleSlave *pBusClock: This field contains the bus's slave clock handle and is set up by the bus protocol engine at the time the transaction is requested. AXI master and slave devices should ignore this field as it is primarily for debugging use by a debugging module.

tAmpiStdBusTrans pBusTransComplete: This field should not be used by AXI protocol master and slave devices. It should automatically be initialized to NULL at the time of allocation of the transaction structure.

tAmpiStdBusTrans pBusTransPartial: This field should not be used by AXI protocol master and slave devices. It should automatically be initialized to NULL at the time of allocation of the transaction structure.

tAmpiStdBusVersion StructureVersion: This field specifies the transaction structure version number and is used for checking purposes only. It should be initialized to CompiledWithStdBusInterfaceVersion by the master device.

tAmpiStdBusVersion InterfaceVersion: This field specifies the transaction interface version number and may be used for conversion purposes if required. For the AXI protocol, it should be initialized by the master device to the actual StdBus interface Version used by the AXI master.

tInt32 WriteDataDelayTicks: This field should not be used by AXI protocol master and slave devices. It should automatically be initialized to NULL at the time of allocation of the transaction structure.

void *pTransByteEnables: This field optionally points to an array of Byte Enables, which is set up by master devices and, used by slave devices. In AXI protocol, it is used to indicate which bytes of a write transfer are to take place. A pointer value of NULL indicates that the entire write transfer is to take place. When not NULL, pTransByteEnables must point to an array of bytes of length Length. A value of 0xFF in a byte of the array indicates that the respective byte is to be written. A value of 0x00 indicates that it is not written. This field should be initialized to NULL by a master if not used. See Section 3 for more details.

tWord32 TransMasterindex: This field should not be used by AXI protocol master and slave devices. It should automatically be initialized to NULL at the time of allocation of the transaction structure.

tWord32 TransProtection: This field should not be used by AXI protocol master and slave devices. It should automatically be initialized to NULL at the time of allocation of the transaction structure.

tAmpiStdBusProtocol TransProtocol: The TransProtocol field is set up by master devices and may be used by slaves to identify the transaction protocol in use by the master device. For the AXI protocol master devices it should be initialized to AxiProtocol.

tWord32 UntimedCommandExtend: This field should not be used by AXI protocol master and slave devices. It should automatically be initialized to NULL at the time of allocation of the transaction structure.

tWord32 UntimedCmdExtendMasterDataBuffer: This field should not be used by AXI protocol master and slave devices. It should automatically be initialized to NULL at the time of allocation of the transaction structure.

tWord32 UntimedCmdExtendSlaveDataBuffer: This field should not be used by AXI protocol master and slave devices. It should automatically be initialized to NULL at the time of allocation of the transaction structure.

tWord32 MasterEndianness: The MasterEndianness field in a StdBus transaction is used to communicate the endian mode of the master device's access to the bus. The transaction address is always specified as little endian, and, that when decoding accesses within a device which are less than the width of a specified big endian type, then a reverse endian transformation of the transaction address may be required.

tWord32 TunnelStatus: This field should not be used by AXI protocol master and slave devices. It should automatically be initialized to NULL at the time of allocation of the transaction structure.

tWord64 TunnelStartAddress: This field should not be used by AXI protocol master and slave devices. It should automatically be initialized to NULL at the time of allocation of the transaction structure.

tWord64 TunnelEndAddress: This field should not be used by AXI protocol master and slave devices. It should automatically be initialized to NULL at the time of allocation of the transaction structure.

tWord32 ProtocolSideband: This field should not be used by AXI protocol master and slave devices. It should automatically be initialized to NULL at the time of allocation of the transaction structure.

tWord8 IdlePriorityLevel: This field should not be used by AXI protocol master and slave devices. It should automatically be initialized to NULL at the time of allocation of the transaction structure.

tWord8 ActivePriorityLevel: This field should not be used by AXI protocol master and slave devices. It should automatically be initialized to NULL at the time of allocation of the transaction structure.

tWord16 UnusedPadding1: This field should not be used by AXI protocol master and slave devices. It should automatically be initialized to NULL at the time of allocation of the transaction structure.

void *pSlaveData: This field is used by the decoded bus slave device to store a pointer to its own instance data structure so it can be accessed from within the bus transaction data structure. See also pMasterData above.

tInt32 CommandAvailableTickStamp: For the AXI protocol, this field indicates the tick stamp at which the command valid signal is first asserted. It is set by the master device to indicate the time at which the transaction was issued to the bus. This TickStamp commonly represents the start of the command, or address, phase of a transaction on a bus. For checking purposes, the CommandUsedTickStamp is initialized by the master at command Request time to be equal to the CommandAvailableTickStamp, indicating that the command has not yet been Accepted.

tInt32 CommandUsedTickStamp: For the AXI protocol, this field indicates the tick stamp at which the command valid and ready signals are sampled asserted. It is set by the slave device to indicate the time at which the command was processed. This TickStamp commonly represents the end of the command, or address, phase of a transaction on a bus.

tAmpiStdBusTrans pBusTransCommandUsed: This field points to a callback function which is initialized by the master device and is invoked by the slave device. The slave invokes this function after the current command has been processed or buffered and the slave is ready to accept the next command. The data for this transaction may not yet have been processed, and that when the slave invokes this callback, it is to inform that master that it may issue the next command.

tWord32 DataAvailableLength: For the AXI protocol, this field indicates the total number of valid bytes currently in pSourceBuffer. This may be less than the total transaction length if the master or slave device processes the data in multiple payloads. This value accumulates as each payload in a burst transaction is processed. When the CwfOffset field is zero, that is, the transaction is not wrapping, then the first DataAvailableLength number of bytes pointed to by pSourceBuffer are valid. When the CwfOffset field is non zero, that is, the transaction is wrapping, then the DataAvailableLength number of bytes pointed to by pSourceBuffer and offset from the start by the CwfOffset beat and wrapping through to the beginning of the buffer are valid. In either case, all data has been made available when DataAvailableLength is equal to Length. The value of this field can only be 0, Length, or an intermediate, beat-aligned number of bytes.

tWord32 DataUsedLength: For the AXI protocol, this field indicates the total number of bytes processed so far. At any time, the difference between DataUsedLength and DataAvailableLength gives the number of bytes yet to be processed in the current data payload. This value is set to DataAvailableLength when the current data payload is processed. All data has been processed when DataUsedLength is equal to Length. The value of this field can only be 0, Length, or an intermediate, beat-aligned number of bytes. It must always be set less than or equal to DataAvailableLength.

tInt32 DataAvailableTickStamp: For the AXI protocol, this field indicates the tick stamp at which new data is made available in pSourceBuffer for processing. It is set by slave devices, for read transactions, or master devices, for write transactions. This tick stamp represents the point at which the AXI data valid signal is first asserted for the first beat of the new data payload which is being made available. This first data beat can therefore be sampled, or acted upon, one tick later. A transaction may include one or more data payloads, each including one or more data beats.

tInt32 DataUsedTickStamp: For the AXI protocol, this field indicates the tick stamp at which processing of a payload of data was completed. It is set by slave devices, for write transactions, or master devices, for read transactions. This tick stamp represents the point at which the AXI data valid and ready signals are sampled asserted for the last beat of a data payload. A transaction may include one or more data payloads, each including one or more data beats.

tAmpiStdBusTrans pBusTransDataAvailable: This field points to a callback function which is initialized by the master device, for read transactions, or, the slave device, for write transactions. It is invoked by the slave device, for read transactions, or, the master device, for write transactions. Its invocation is used to indicate that a new data payload, contained within the buffer pointed to by pSourceBuffer, is available for processing. If the CwfOffset field is zero, that is, the transaction is not wrapping, then DataUsedLength gives the current offset into the buffer to the next unprocessed byte, and the number of unprocessed bytes available in the data payload is given by DataAvailableLength-DataUsedLength. For write transactions, data availability is automatically signaled by a master device if the DataAvailableLength is non-zero at the time at which the transaction is requested to the StdBus protocol engine. It is the responsibility of the slave device to check DataAvailableLength at the time the write transaction is received and process any data payload which may exist at that time.

tAmpiStdBusTrans pBusTransDataUsed: This field points to a callback function which is initialized by the slave device, for read transactions, or the master device, for write transactions. It is invoked by the master device, for read transactions, or, the slave device, for write transactions. Its invocation is used to indicate that a data payload has been processed. It must be invoked with DataUsedLength set equal to DataAvailableLength.

tInt32 ResponseAvailableTickStamp: For the AXI protocol, this field indicates the tick stamp at which the write response was made available. This tick stamp represents the point at which the AXI response valid signal is first asserted. This write response, in Status, can therefore be sampled, or acted upon, one tick later.

tInt32 ResponseUsedTickStamp: For the AXI protocol, this field indicates the tick stamp at which processing of the write response from the slave was completed. This tick stamp represents the point at which the AXI response valid and ready signals are sampled asserted.

tAmpiStdBusTrans pBusTransResponseAvailable: This field points to a callback function which is initialized by the master device and invoked by the slave device on completion of a write transaction. Its invocation indicates to the master device that the Status field of the transaction contains the slave device response.

tAmpiStdBusTrans pBusTransResponseUsed: This field points to a callback function which is initialized by the slave device and invoked by the master once it has processed the write response. Its invocation indicates to the slave device that the write response has been accepted and the next write response may be issued.

tWord32 TransIdentity: The TransIdentity field is set up by a master and used by a slave to identify the transaction as originating from a particular master. In the case of a single identity master device this field should be set to 0. This field corresponds to the AXI protocol master ID bits for either both AXI read, or, all three AXI write channels involved in a particular transfer. Since this field is bound to a particular transaction, it is not time dependent, and is valid for the entire duration of the transaction.

tWord32 UnusedPadding2: This field should not be used by AXI protocol master and slave devices. It should automatically be initialized to NULL at the time of allocation of the transaction structure.

To conclude, the above fields of the data structure are specific to the implementation used in the examples herein. Those in the art will understand that the implementation specific details are provided for completeness only, and should not be construed to limit the application of any of the features of the invention.

Although some of the description presented herein is in the form of a computer programming language similar to C and C++, the present invention is not restricted to a specific computer programming language or constructs used to provide data or programs.

Furthermore, in some cases, an API is mentioned, and several function names used in such API. Alternate embodiments include alternate forms for carrying out this functionality other than function calls. Further, when functions are used, the particular function names and/or formats are not meant to be limiting, but rather illustrative of one exemplary embodiment of the present invention.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, according to an embodiment, performable by a processing system, e.g., the host processing system that includes one or more processors that accept computer-readable (also called machine-readable) code containing a set of instructions that when executed by one or more of the processors carries out at least one of the methods described herein. Any processor capable of executing a set of instructions (sequential or otherwise) that specify actions to be taken are included. Thus, one example is a typical computer processing system that includes one or more processors. Each processor may include one or more of a CPU, a graphics processing unit, and/or a programmable DSP unit.

The processing system further includes a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable storage medium that carries computer-readable code (e.g., software) including a set of instructions to cause performing, when executed by one or more processors, one of more of the methods described herein. When the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable storage medium carrying computer-readable code.

Furthermore, a computer-readable storage medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

7. Computer System Implementation

Figure 24:
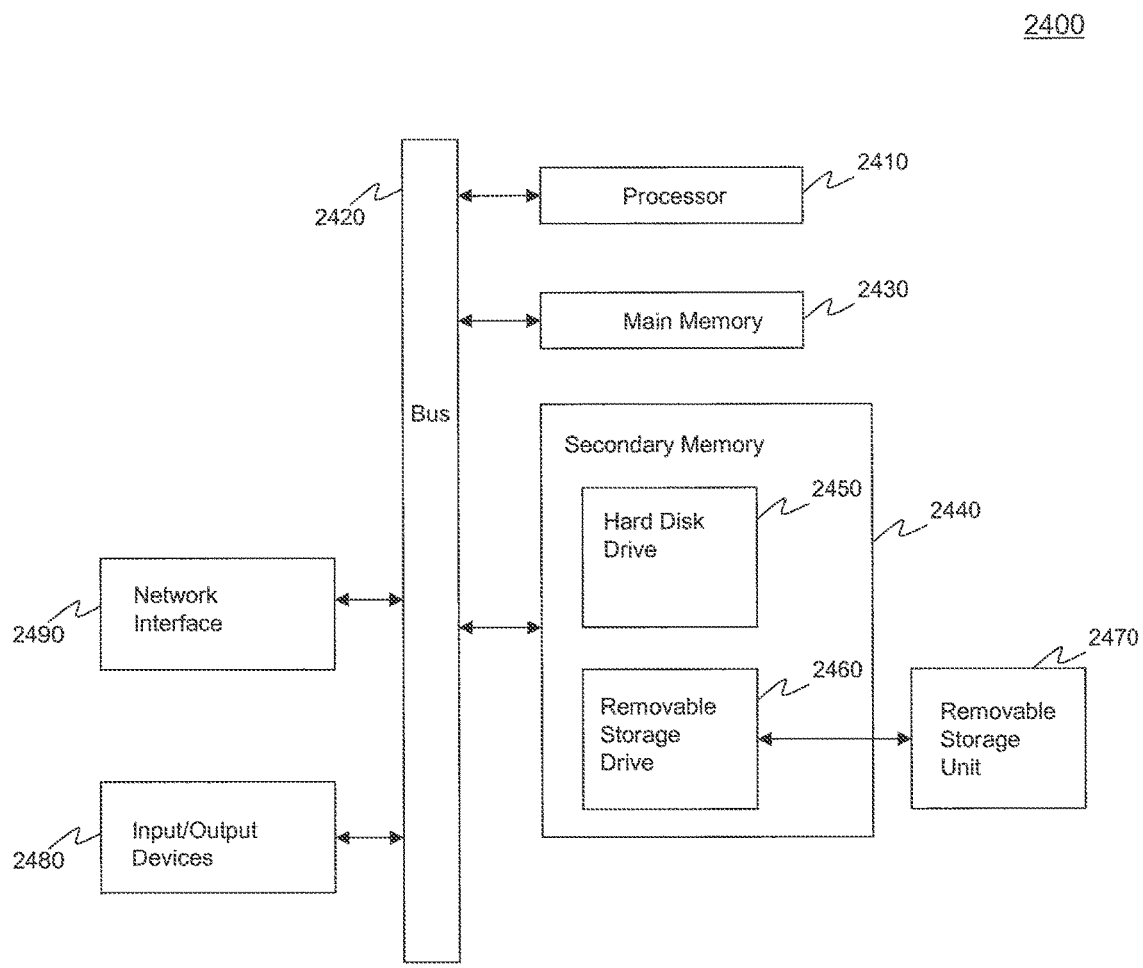
FIG. 24 depicts an example computer system in which the present invention may be implemented.

In an embodiment of the present invention, the methods and systems of the present invention described herein are implemented using well known computers, such as a computer 2400 shown in FIG. 24. The computer 2400 can be any commercially available and well known computer or server capable of performing the functions described herein, such as computers available from Gateway, Apple, Sun, HP, Dell, Cray, etc.

Computer 2400 includes one or more processors (also called central processing units, or CPUs), such as processor 2410. Processor 2400 is connected to communication bus 2420. Computer 2400 also includes a main or primary memory 2430, preferably random access memory (RAM). Primary memory 2430 has stored therein control logic (computer software), and data.

Computer 2400 may also include one or more secondary storage devices 2440. Secondary storage devices 2440 include, for example, hard disk drive 2450 and/or removable storage device or drive 2460. Removable storage drive 2460 represents a floppy disk drive, a magnetic tape drive, a compact disk drive, an optical storage device, tape backup, etc.

Removable storage drive 2460 interacts with removable storage unit 2470. As will be appreciated, removable storage unit 2460 includes a computer usable or readable storage medium having stored therein computer software (control logic) and/or data. Removable storage drive 2460 reads from and/or writes to the removable storage unit 2470 in a well known manner.

Removable storage unit 2470, also called a program storage device or a computer program product, represents a floppy disk, magnetic tape, compact disk, optical storage disk, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 2400, or multiple computer 2400s to perform any combination of the functions described herein.

Computer programs (also called computer control logic) are stored in main memory 2430 and/or the secondary storage devices 2440. Such computer programs, when executed, direct computer 2400 to perform the functions of the present invention as discussed herein. In particular, the computer programs, when executed, enable processor 2410 to perform the functions of the present invention. Accordingly, such computer programs represent controllers of the computer 2400.

Computer 2400 also includes input/output/display devices 2480, such as monitors, keyboards, pointing devices, etc.

Computer 2400 further includes a communication or network interface 2490. Network interface 2490 enables computer 2400 to communicate with remote devices. For example, network interface 2490 allows computer 2400 to communicate over communication networks, such as LANs, WANs, the Internet, etc. Network interface 2490 may interface with remote sites or networks via wired or wireless connections. Computer 2400 receives data and/or computer programs via network interface 2490. The electrical/magnetic signals having contained therein data and/or computer programs received or transmitted by the computer 2400 via interface 2490 also represent computer program product(s).

8. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents. It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

The invention claimed is:

1. A software device for simulating a plurality of devices and a connecting simulated bus, implemented as software performed by a processor of a computer system, comprising:
a plurality of device models stored in a memory of the computer system;
a virtual bus model stored in the memory of the computer system, modeling communication on a simulated bus, in simulated time, between the plurality of device models, wherein communications on the simulated bus comprises one or more bursts of a plurality of data beats;
a simulator in the computer system to simulate communication between the device models on the simulated bus described by the virtual bus model, the simulation communicating one or more bursts of a plurality of data beats between the device models over the simulated bus;
a compliance indicator configurable to generate warnings or errors when non-compliant behavior is encountered in the simulator, thereby allowing debugging of the device models, wherein the debugging of device models allows verification of one or more of an interim design before a final design has been implemented; and
releasing the device model as a final device model and generating a physical circuit layout according to the final design model, wherein the physical circuit layout generated in accordance with the virtual bus model is in conformance with a protocol of the simulated bus.

2. The software device of claim 1, wherein the simulated time does not correspond to actual time.

3. The software device of claim 1, wherein the plurality of device models comprises a master device and a slave device.

4. The software device of claim 3, wherein the slave device is a sender device.

5. The software device of claim 1, wherein the simulated bus is an AXI protocol bus.

6. The software device of claim 1, wherein one of the plurality of device models is a sender device and one of the plurality of device models is a receiver device, further comprising:
in the simulator, the sender device sending to the receiver device on the bus model:
data indicating a number of committed beats of data,
the specified number of committed beats of data, and
a clock edge at which the first committed beat is made available by the sender device.

7. The software device of claim 1, wherein one of the plurality of device models is a sender device and one of the plurality of device models is a receiver device, further comprising:
in the simulator, the receiver device sender to the sender device on the bus model:
acceptance of a received number of committed beats of data, and
a clock edge at which the last committed beat was accepted by the receiver device.

8. A software device for simulating a plurality of devices and a connecting simulated bus, implemented as software performed by a processor of a computer system, comprising:
a sender model and a receiver model stored in a memory of the computer system; and
a virtual bus model stored in the memory of the computer system, modeling communication on a simulated bus, in simulated time, between the sender model and the receiver model, wherein communications on the simulated bus comprises one or more bursts of a plurality of data beats,
wherein the sender model sends to the receiver model on the bus model:
data indicating a number of committed beats of data,
the specified number of committed beats of data, and a clock edge at which the first committed beat is made available by the sender device, and wherein the receiver model sends to the sender model:

acceptance of a received number of committed beats of data, and a clock edge at which the last committed beat is was accepted by the receiver model; and releasing the device model as a final device model and generating a physical circuit layout according to the final design model, wherein the physical circuit layout generated in accordance with the virtual bus model is in conformance with a protocol of the simulated bus.

9. The software device of claim 8, wherein the simulated time does not correspond to actual time.

10. The software device of claim 8, wherein the sender and receiver models comprises a master device and a slave device.

11. The software device of claim 10, wherein the sender model is the slave device.

12. The software device of claim 8, wherein the simulated bus is an AXI protocol bus.

13. A method for simulating a plurality of devices and a connecting simulated bus, implemented as software performed by a processor of a computer system, comprising:

providing a sender model and a receiver model in a memory of the computer system; and providing a virtual bus model in the memory of the computer system, modeling communication on a simulated bus, in simulated time, between the sender model and the receiver model, wherein communications on the simulated bus comprises one or more bursts of a plurality of data beats, sending by the sender model to the receiver model on the bus model:

data indicating a number of committed beats of data, the specified number of committed beats of data, and a clock edge at which the first committed beat is made available by the sender device, and sending by the receiver model to the sender model:

acceptance of a received number of committed beats of data, and a clock edge at which the last committed beat is was accepted by the receiver model;

releasing the virtual bus model as part of a device model and generating a physical circuit layout according to the device model, wherein the physical circuit layout generated in accordance with the virtual bus model is in conformance with a protocol of the simulated bus.

14. The method of claim 13, wherein the simulated time does not correspond to actual time.

15. The software device of claim 13, wherein the sender and receiver models comprises a master device and a slave device.

16. The software device of claim 15, wherein the sender model is the slave device.

17. The software device of claim 13, wherein the simulated bus is an AXI protocol bus.

\* \* \* \* \*